(12) United States Patent
Fischer et al.

(10) Patent No.: US 12,326,508 B2
(45) Date of Patent: Jun. 10, 2025

(54) METHOD AND APPARATUS FOR POSITIONING OF A USER EQUIPMENT IN AN INACTIVE STATE

(71) Applicant: QUALCOMM Incorporated, San Diego, CA (US)

(72) Inventors: Sven Fischer, Nuremberg (DE); Stephen William Edge, Escondido, CA (US)

(73) Assignee: QUALCOMM Incorporated, San Diego, CA (US)

(*) Notice: Subject to any disclaimer, the term of this patent is extended or adjusted under 35 U.S.C. 154(b) by 367 days.

(21) Appl. No.: 17/810,158

(22) Filed: Jun. 30, 2022

(65) Prior Publication Data

US 2023/0221396 A1    Jul. 13, 2023

Related U.S. Application Data

(60) Provisional application No. 63/297,674, filed on Jan. 7, 2022, provisional application No. 63/324,568, filed on Mar. 28, 2022.

(51) Int. Cl.
*H04W 76/20* (2018.01)
*G01S 5/00* (2006.01)
(Continued)

(52) U.S. Cl.
CPC .......... *G01S 5/0036* (2013.01); *H04L 5/0051* (2013.01); *H04W 76/19* (2018.02); *H04W 76/20* (2018.02); *H04W 76/30* (2018.02)

(58) Field of Classification Search
CPC .... G01S 5/0036; G01S 5/0009; G01S 5/0236; H04L 5/0051; H04L 5/0069;
(Continued)

(56) References Cited

U.S. PATENT DOCUMENTS

| 2022/0120842 A1* | 4/2022 | Edge | H04W 76/19 |
| 2022/0369069 A1* | 11/2022 | Busin | H04W 4/029 |

FOREIGN PATENT DOCUMENTS

WO    2022098480 A2    5/2022

OTHER PUBLICATIONS

Huawei, et al., "[AT115-e] [615] [POS] UL and UL DL Positioning in RRC_Inactive", 3GPP TSG-RAN WG2 Meeting #115-e, R2-2108946, 3rd Generation Partnership Project (3GPP), Mobile Competence Centre, 650, Route Des Lucioles, F-06921 Sophia-Antipolis Cedex, France, vol. Ran WG2, No. Electronic, Aug. 9, 2021-Aug. 27, 2021, Aug. 24, 2021, XP052043011, 29 Pages, Section 3 and 4-4.3.2, pp. 16-19, pp. 22-24.

(Continued)

*Primary Examiner* — Chuong A Ngo
(74) *Attorney, Agent, or Firm* — Thien T. Nguyen

(57) ABSTRACT

Positioning of a UE is supported in a Radio Resource Control (RRC) Inactive state. The UE receives from a location server a request for periodic or triggered location and an indication of whether uplink, downlink, or uplink and downlink positioning will be used for subsequent location reporting events when the UE is in the RRC Inactive state. When an event is detected, the UE sends a first event report and a second event report to the location server to report the event and enable UE location while the UE is in the RRC Inactive state. The event reports are each sent with Small Data Transmission (SDT). The first event report may include a Request Assistance Data message indicating a request for an uplink (UL) Positioning Reference Signal (PRS) configuration and the second event report may include location measurement performed by the UE.

56 Claims, 15 Drawing Sheets

(51) Int. Cl.
*H04L 5/00* (2006.01)
*H04W 76/19* (2018.01)
*H04W 76/30* (2018.01)

(58) Field of Classification Search
CPC ... H04L 5/0026; H04L 5/0048; H04L 5/0091; H04L 5/001; H04L 5/0033; H04W 76/19; H04W 76/20; H04W 76/30; H04W 8/24; H04W 64/00; H04W 76/27
See application file for complete search history.

(56) References Cited

OTHER PUBLICATIONS

International Search Report and Written Opinion—PCT/US2022/078908—ISA/EPO—Feb. 20, 2023.
Qualcomm Incorporated (Moderator): "Summary of [Post114-e] [602] [POS] Stage 2 Procedure for Deferred MT-LR in RRC_Inactive", 3GPP TSG-RAN WG2 Meeting #115-e, R2-2108383, 3rd Generation Partnership Project (3GPP), Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 11, 2021, XP052042910, 71 Pages, Sections 6.4.2, 6.4.3 and Annexes A and E, pp. 9, 20, 42-44, 65-69.
Qualcomm Incorporated: "Positioning of UEs in RRC Inactive State", 3GPP TSG-RAN WG2 Meeting #114-e, R2-2106083, 3rd Generation Partnership Project (3GPP), Mobile Competence Centre, 650, Route Des Lucioles, F-06921 Sophia-Antipolis Cedex, France, vol. RAN WG2, No. Electronic, May 19, 2021-May 27, 2021, May 11, 2021, XP052007453, 9 Pages, Section 3, The Whole Document.
Huawei, et al., "Way-forward for RRC_Inactive Positioning", R2-2110174, 3GPP TSG-RAN WG2 Meeting #116-e, Electronic, Nov. 1-12, 2021, pp. 1-10.
OPPO: "Summary for AI 8.11.3 on positioning in RRC_Inactive", R2-2111251, 3GPP TSG-RAN WG2 Meeting #116-e, Electronic, Nov. 1-12, 2021, pp. 1-29.
Qualcomm Incorporated: "Remaining issues for positioning of UEs in RRC_Inactive State", R2-2203443, 3GPP TSG-RAN WG2 Meeting #117-e, Electronic, Feb. 21-Mar. 3, 2022, pp. 1-15.
RAN2: "LS on Positioning in RRC_Inactive State", R2-2203949, 3GPP TSG-RAN WG2 Meeting #117-e, Electronic, Feb. 21-Mar. 3, 2022, 8 Pages.

* cited by examiner

METHOD AND APPARATUS FOR POSITIONING OF A USER EQUIPMENT IN AN INACTIVE STATE

CROSS-REFERENCE TO RELATED APPLICATIONS

This application claims the benefit of and priority to U.S. Provisional Application No. 63/297,674, filed Jan. 7, 2022, entitled "METHOD AND APPARATUS FOR UPLINK AND UPLINK PLUS DOWNLINK POSITIONING OF A USER EQUIPMENT IN AN INACTIVE STATE," and U.S. Provisional Application No. 63/324,568, filed Mar. 28, 2022, entitled "METHOD AND APPARATUS FOR UPLINK AND UPLINK PLUS DOWNLINK POSITIONING OF A USER EQUIPMENT IN AN INACTIVE STATE," both of which are assigned to the assignee hereof and are incorporated herein by reference in their entireties.

BACKGROUND OF THE DISCLOSURE

Field of the Disclosure

The present disclosure relates generally to communication, and more specifically to techniques for supporting location services for user equipments (UEs).

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication system. For example, locating a mobile device may be needed for such applications as navigation assistance, public safety support, asset tracking, and management of moving objects in a factory or warehouse. For some applications and/or for certain types of mobile device, it may be desirable to locate a mobile device with reduced power consumption by the mobile device and/or with reduced latency. Methods and systems to achieve reduced power consumption and/or reduced latency may therefore be beneficial.

SUMMARY

Positioning of a UE is supported in a Radio Resource Control (RRC) Inactive state. The UE receives from a location server a request for periodic or triggered location and an indication of whether uplink, downlink, or uplink and downlink positioning will be used for subsequent location reporting events when the UE is in the RRC Inactive state. When an event is detected when the UE is in the RRC Inactive state, the UE sends a first event report and a second event report to the location server to report the event and enable UE location while the UE is in the RRC Inactive state. The event reports are each sent with Small Data Transmission (SDT). The first event report may include a Request Assistance Data message indicating a request for an uplink (UL) Positioning Reference Signal (PRS) configuration and the second event report may include location measurement performed by the UE.

In one implementation, method performed by a User Equipment (UE) for supporting location of the UE in a Radio Resource Control (RRC) Inactive state, includes receiving a request to perform periodic or triggered location; receiving an indication of whether uplink positioning, downlink positioning, or uplink and downlink positioning will be used for subsequent location reporting events when the UE is in the RRC Inactive state; detecting an event while in the RRC Inactive state; and sending a first event report and a second event report to report the event and enable UE location while the UE is in the RRC Inactive state, wherein the first event report and the second event report are each sent with Small Data Transmission (SDT).

In one implementation, User Equipment (UE) configured for supporting location of the UE in a Radio Resource Control (RRC) Inactive state, includes a wireless transceiver configured to wirelessly communicate with entities in a wireless network; at least one memory; at least one processor coupled to the wireless transceiver and the at least one memory, wherein the at least one processor is configured to: receive, via the wireless transceiver, a request to perform periodic or triggered location; receive, via the wireless transceiver, an indication of whether uplink positioning, downlink positioning, or uplink and downlink positioning will be used for subsequent location reporting events when the UE is in the RRC Inactive state; detect an event while in the RRC Inactive state; and send, via the wireless transceiver, a first event report and a second event report to report the event and enable UE location while the UE is in the RRC Inactive state, wherein the first event report and the second event report are each sent with Small Data Transmission (SDT).

In one implementation, User Equipment (UE) configured for supporting location of the UE in a Radio Resource Control (RRC) Inactive state, includes means for receiving a request to perform periodic or triggered location; means for receiving an indication of whether uplink positioning, downlink positioning, or uplink and downlink positioning will be used for subsequent location reporting events when the UE is in the RRC Inactive state; means for detecting an event while in the RRC Inactive state; and means for sending a first event report and a second event report to report the event and enable UE location while the UE is in the RRC Inactive state, wherein the first event report and the second event report are each sent with Small Data Transmission (SDT).

In one implementation, non-transitory storage medium including program code stored thereon, the program code is operable to configure at least one processor in a User Equipment (UE) for supporting location of the UE in a Radio Resource Control (RRC) Inactive state, the program code comprising instructions to: receive a request to perform periodic or triggered location; receive an indication of whether uplink positioning, downlink positioning, or uplink and downlink positioning will be used for subsequent location reporting events when the UE is in the RRC Inactive state; detect an event while in the RRC Inactive state; and send a first event report and a second event report to report the event and enable UE location while the UE is in the RRC Inactive state, wherein the first event report and the second event report are each sent with Small Data Transmission (SDT).

In one implementation, method performed by a location server for supporting location of a User Equipment (UE) in a Radio Resource Control (RRC) Inactive state, includes sending a request to perform periodic or triggered location to the UE; sending an indication to the UE of whether uplink positioning, downlink positioning, or uplink and downlink positioning will be used for subsequent location reporting events when the UE is in the RRC Inactive state; and receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

In one implementation, location server configured for supporting location of a User Equipment (UE) in a Radio Resource Control (RRC) Inactive state, includes an external interface configured to wirelessly communicate with entities in a wireless network; at least one memory; at least one processor coupled to the external interface and the at least one memory, wherein the at least one processor is configured to: send, via the external interface, a request to perform periodic or triggered location to the UE; send, via the external interface, an indication to the UE of whether uplink positioning, downlink positioning, or uplink and downlink positioning will be used for subsequent location reporting events when the UE is in the RRC Inactive state; and receive, via the external interface, a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

In one implementation, location server configured for supporting location of a User Equipment (UE) in a Radio Resource Control (RRC) Inactive state, includes means for sending a request to perform periodic or triggered location to the UE; means for sending an indication to the UE of whether uplink positioning, downlink positioning, or uplink and downlink positioning will be used for subsequent location reporting events when the UE is in the RRC Inactive state; and means for receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

In one implementation, non-transitory storage medium including program code stored thereon, the program code is operable to configure at least one processor in a location server for supporting location of a User Equipment (UE) in a Radio Resource Control (RRC) Inactive state, the program code comprising instructions to: send a request to perform periodic or triggered location to the UE; send an indication to the UE of whether uplink positioning, downlink positioning, or uplink and downlink positioning will be used for subsequent location reporting events when the UE is in the RRC Inactive state; and receive a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

BRIEF DESCRIPTION OF THE DRAWINGS

The accompanying drawings are presented to aid in the description of various aspects of the disclosure and are provided solely for illustration of the aspects and not limitation thereof.

FIG. 4B-1 and FIG. 4B-2, shows a signaling flow that illustrates various messages sent between components of a communication system for initiation and reporting of location events for a deferred MT-LR procedure for periodic or triggered location events while a UE is in an RRC Inactive state.

FIG. 4E-1 and FIG. 4E-2, shows a signaling flow that illustrates various messages sent between components of a communication system for initiation and reporting of location events for a deferred MT-LR procedure for periodic or triggered location events while a UE is in an RRC Inactive state and when uplink plus downlink positioning is used for event reporting.

Figure 1:
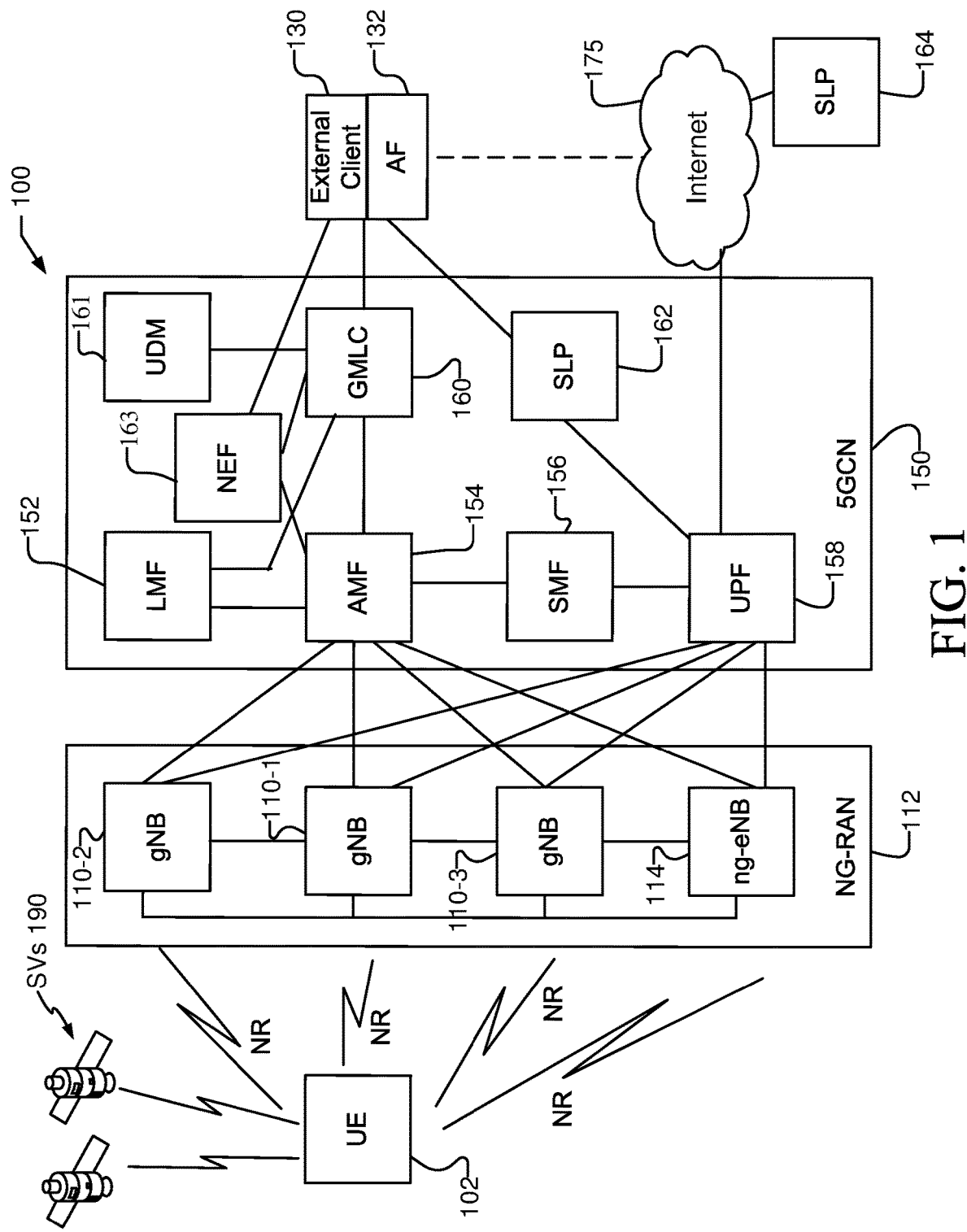
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), Long Term Evolution (LTE) for Fourth Generation (4G), and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE, e.g. for the GNSS, Downlink Time Difference of Arrival (DL-TDOA), AOD, multi-cell RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS configuration in the case of terrestrial positioning using, e.g., DL-TDOA, AOD, multi-cell RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS configuration in the case of terrestrial positioning using, e.g., DL-TDOA, AOD, multi-cell RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

Positioning methods (also referred to as position methods) can be classified as "uplink" (UL), "downlink" (DL) and "uplink and downlink" (UL+DL). A UL position method makes use of UL measurements of signals (e.g. UL PRS, sometimes referred to as SRS for positioning) transmitted by a target UE. Measurements are typically obtained by one or more base stations (e.g. gNBs), access points or other network entities. UL position methods include UL-AOA, UL-TDOA and ECID. A DL position method makes use of DL measurements of signals transmitted by one or more base stations, access points, SVs or other signal sources. Measurements are obtained by the target UE being positioned. DL position methods include DL-AOA, DL-TDOA, DL-AOD, A-GNSS, WLAN (also referred to as WiFi or Wi-Fi) and ECID. A UL+DL position method makes use of both DL measurements obtained by a target UE of signals transmitted by one or more base stations, access points, SVs or other signal sources and UL measurements of signals transmitted by the target UE and obtained by one or more base stations, access points or other entities. UL+DL position methods include RTT and multi-cell RTT.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP), which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB (eNB) for the UE. LPP or LPP/LPPe messages may also be exchanged between a UE and LMF via a serving Access and Mobility Management Function (AMF) and a serving NR Node B (also referred to as gNodeB or gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access or a gNodeB for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (NRPPa) protocol may be used to transfer such messages between a base station that is a gNodeB and a location server that is an LMF.

During a positioning session, the UE may send positioning measurements to the location server infrequently. For example, the location server might not request frequent positioning measurements, e.g., a periodic trigger for positioning measurements may have a long period. In another example, there may be a relatively long period between receipt by the UE of assistance data or a request for positioning measurements and the time when positioning information is sent by the UE. The base station, e.g., the gNB, may not be aware of the timing of the positioning measurements instruction to the UE from the location server and or when the positioning measurements will be prepared or sent by the UE since the positioning related messages between the location server and the UE pass through the base station transparently as LPP messages.

A connection (e.g., an RRC Connection) between the UE and the base station may be released only by the base station. Without information related to the timing of the positioning measurements, the base station may not release the connection with the UE and, according, the UE may remain in a connected state with the base station during the entire positioning measurement session, which may result in additional resource and power consumption by the UE. Moreover, even if the base station releases the connection with the UE, if a positioning measurement is sent by the UE immediately after the release of the connection, a new connection may need to be initiated, which will consume additional power and time.

For example, a GNSS fix may take more than 15 seconds, for E911 or a position tracking application. Remaining in a connected state with a base station during such an extended period may result in extra power consumption by a UE.

As discussed herein, the positioning of a User Equipment (UE), including positioning using UL or UL+DL positioning methods, may be supported while the UE is in a Radio Resource Control (RRC) Inactive state. The RRC Inactive state can be used to reduce latency and/or power consumption by the UE and can support faster access by the UE to a serving network or faster access by the serving network to the UE than if the UE was in an Idle state with no RRC Connection.

For UL-only positioning (e.g., UL-TDOA, UL-AOA) or UL+DL positioning (e.g., Multi-RTT) the UE requires an UL PRS configuration (e.g., SRS for positioning). The UL PRS configuration is determined by a serving base station (e.g., gNB) of a target device (e.g., UE). For periodic or triggered deferred MT-LR while the UE is in a Radio Resource Control (RRC) Inactive state, the UE may send an Event Report with location measurements to the location server via the serving base station using Small Data Transmission (SDT). SDT in 3GPP refers to data transmission in an RRC inactive state. Specifically, SDT is a transmission for a short data burst in RRC_INACTIVE state where the UE does not need to establish and teardown connections for the transmission, e.g., used when small amounts of data need to be sent (such as location measurement reports). Generally, a UE is required to perform multiple transmissions and receptions of control signals in order to initiate and maintain a connection with a network. If the payload size of the data is relatively small compared with the amounts of the control signals, making a connection for the small data transmission may be inefficient (e.g., in terms of UE power consumption) due to the control signaling overhead. Accordingly, SDT procedures have been developed in 3GPP to enable data transmission while in an RRC inactive state.

To initiate an SDT procedure, the UE may transmit an RRC Resume Request message and data in parallel instead of transmitting the data after the RRC Resume Request message has been sent and processed by a network. Additional transmissions and/or receptions using SDT may then also happen without the UE entering an RRC_CONNECTED state. The UE performs the SDT procedure without transitioning to the RRC_CONNECTED state.

Since SDT is a UE initiated procedure, it is well suited for DL-only positioning methods (e.g., DL-TDOA), where a target UE performs DL measurements and reports the measurements or the calculated location to a location server while the target UE is in RRC_INACTIVE state. However, current SDT procedures cannot reliably support UL-only and UL+DL positioning methods. For example, in order to transmit UL PRS to one or more base stations, a target UE requires an UL PRS (e.g., SRS for positioning) configuration, which is provided to the UE by the serving base station. For UL-only positioning methods, there are no measurements from the UE to be reported to the location server. For UL+DL positioning methods, the UE can only report the location measurements of the DL PRS after the UE has transmitted UL PRS to one or more base stations.

Therefore, the SDT procedures need to enable both, providing UL PRS configuration information to a target UE and reporting location measurements to a location server. To conform with the SDT procedures and standards, the need for an UL PRS configuration information at a target UE also needs to be triggered by the target UE itself, which however, is currently not possible with the current 3GPP standards for a UE in RRC_INACTIVE state.

With enhanced procedures as described herein, a UE, for example, may receive a request for periodic or triggered location from a location server (e.g. LMF) and may later enter an RRC Inactive state. When an event is detected, the UE sends a first event report with Small Data Transmission (SDT) to a location server (LMF) with an RRC Resume Request, that may include a LPP Request Assistance Data message indicating a request for an UL PRS configuration. The location server sends a NRPPa Positioning Information Request to the serving base station for the UE, which determines UL PRS resources for the UE and sends the UL PRS configuration to the UE, e.g., in a subsequent DL SDT or in an RRC Release message. The UE transmits the UL PRS while remaining in the RRC Inactive state, which are measured by one or more base stations, e.g., after receiving an RRC Release message from the base station. The UE may additionally receive and measure downlink PRS from one or more base stations while remaining in the RRC Inactive state. The UE may then send a second event report with SDT to the location server with an RRC Resume Request, that may include an LPP Provide Location Information message, e.g., with the measurements, while remaining in the RRC Inactive state.

FIG. 1 shows an architecture based on a non-roaming 5G NR network to support UE UL or UL+DL positioning in an RRC Inactive state as discussed herein. FIG. 1 illustrates a communication system 100 that comprises a UE 102, which is sometimes referred to herein as a "target UE", since UE 102 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a next-generation evolved NodeB (ng-eNB) 114, and a 5G Core Network (5GCN) 150 that is in communication with an external client 130. The architecture of a gNB 110 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 110. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the target UE 102 and neighbor gNBs 110-2, 110-3, and ng-eNB 114. A neighbor gNB 110 may be any gNB 110 which is able to receive and measure uplink (UL) signals transmitted by the target UE 102 and/or is able to transmit a downlink (DL) reference signal (RS), e.g., positioning reference signals (PRS), that can be received and measured by the target UE 102.

Entities in the NG-RAN 112 which transmit DL reference signals (RSs) to be measured by a target UE 102 for a particular location session are referred to generically as "Transmission Points" (TPs) and can include one or more of the serving gNB 110-1, and neighbor gNBs 110-2, 110-3, and ng-eNB 114.

Entities in the NG-RAN 112 which receive and measure UL signals (e.g. an RS) transmitted by a target UE 102 for a particular location session are referred to generically as "Reception Points" (RPs) and can include one or more of the serving gNB 110-1, and neighbor gNBs 110-2, 110-3, and ng-eNB 114.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 102, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via the UPF 158 and Internet 175), and/or allow the external client 130 to receive location information regarding the UE 102 (e.g., via the Gateway Mobile Location Center (GMLC) 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 110). UE 102 or a gNB 110-1 or location server (e.g. LMF 152) to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Angle of Departure (AOD), DL Time Difference Of Arrival (DL-TDOA), Round-Trip Time (RTT), multi-cell RTT, WLAN (also referred to as WiFi) positioning, or Enhanced Cell ID (ECID) or combinations thereof. In some of these techniques (e.g. A-GNSS, AFLT, DL-TDOA), pseudoranges or timing differences may be measured at UE 102 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, and may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, AOD, DL-TDOA, multi-cell RTT, and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip time (RTT) for signal propagation between UE 102 and a cellular transceiver (e.g. a gNB 110) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110) in NG-RAN 112 to determine a location for UE 102.

In some implementations, network entities are used to assist in location of a target UE 102. For example, entities in a network such as gNBs 110-1 and 110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1 and 110-2) may then transfer the location measurements to the UE 102 or LMF 152, which may use the measurements to determine or help determine the location of the UE 102. Examples of location measurements that may use UL signals can include an RSSI, RSRP, RSRQ, TOA, Rx-Tx, AOA and RTT.

An estimate of a location of the UE 102 may be referred to as a location, location estimate, location fix, fix, position, position estimate or position fix, and may be geodetic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geodetically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event, or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110-1, 110-2. Access to the 5G network is provided to UE 102 via wireless communication between the UE 102 and one or more of the gNBs 110-1 and 110-2, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughout and bandwidth to UE 102. Some gNBs in FIG. 1 (e.g. gNB 110-2, 110-3, or ng-eNB 114) may be configured to function as positioning-only beacons which may transmit signals (e.g. directional PRS) to assist positioning of UE 102 but may not receive signals from UE 102 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more ng-eNBs 114, which provide LTE wireless access to UE 102 and may connect to entities in 5GCN 150 such as AMF 154.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management. Although not shown in FIG. 1, UDM 161 may be connected to other elements in 5GCN 150 such as AMF 154.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

A Network Exposure Function (NEF) 163 may be connected to the GMLC 160 and the AMF 154. In some implementations, the NEF 163 may be connected to communicate directly with the external client 130 or with an Application Function (AF) 132. The NEF 163 may support secure exposure of capabilities and events concerning 5GCN 150 and UE 102 to an external client 130 or AF 132 and may enable secure provision of information from external client 130 or AF 132 to 5GCN 150. The NEF 163, for example, may also function to obtain a current or last known location for a UE 102, may obtain an indication of a change in location for a UE 102, or an indication of when a UE 102 becomes available (or reachable). An external client 130 or an AF 132 may access NEF 163 in order to obtain location information for UE 102.

The LMF 152 and the gNB 110-1 may communicate using a New Radio Position Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. For example, LPP messages may be transferred between the AMF 154 and the UE 102 using a 5G Non-Access Stratum (NAS) protocol. The LPP protocol may be used to support positioning of UE 102 using DL and UL+DL position methods such as Assisted GNSS (A-GNSS), Real Time Kinematic (RTK), Wireless Local Area Network (WLAN), DL Time Difference of Arrival (DL-TDOA), DL angle of departure (DL-AOD), Round-Trip Time (RTT), multi-cell RTT, and/or Enhanced Cell Identity (ECID). The NRPPa protocol may be used to support positioning of UE 102 using UL and UL+DL position methods such as Uplink (UL) Time Difference of Arrival (UL-TDOA), Uplink (UL) angle of arrival (UL-AOA), multi-cell RTT, or ECID (when used with measurements obtained by or received from a gNB 110-1, 110-2, 110-3, or ng-eNB 114) and/or may be used by LMF 152 to obtain location related information from gNBs 110 such as parameters defining positioning reference signal (PRS) transmission from gNBs 110 for support of DL-TDOA, DL-AOD or multi-cell RTT.

gNBs 110-1, 110-2, 110-3, or ng-eNB 114 may communicate with AMF 154 using a Next Generation Application Protocol (NGAP), e.g. as defined in 3GPP Technical Specification (TS) 38.413. NGAP may enable AMF 154 to request a location of a target UE 102 from a gNB 110-1 for target UE 102 and may enable gNB 110-1 to return a location for UE 102 to the AMF 154.

gNBs 110-1, 110-2, 110-3, or ng-eNB 114 may communicate with one another using an Xn Application Protocol (XnAP), e.g. as defined in 3GPP TS 38.423. XnAP may allow one gNB 110 to request another gNB 110 to obtain UL location measurements for a target UE 102 and to return the UL location measurements. XnAP may also enable a gNB 110 to request another gNB 110 to transmit a downlink (DL) Reference Signal (RS) or PRS to enable a target UE 102 to obtain DL location measurements of the transmitted DL RS or PRS.

A gNB (e.g. gNB 110-1) may communicate with a target UE 102 using a Radio Resource Control (RRC) protocol, e.g. as defined in 3GPP TS 38.331. RRC may allow a gNB (e.g. gNB 110-1) to request location measurements from the target UE 102 of DL RS s or DL PRSs transmitted by the gNB 110-1 and/or by other gNBs 110-2, 110-3, or ng-eNB 114 and to return some or all of the location measurements. RRC may also enable a gNB (e.g. gNB 110-1) to request the target UE 102 to transmit an UL RS, PRS or SRS to enable the gNB 110-1 or other gNBs 110-2, 110-3, or ng-eNB 114 to obtain UL location measurements of the transmitted UL RS, PRS or SRS.

With a UE assisted position method, UE 102 may obtain location measurements (e.g. measurements of RSSI, Rx-Tx, RTT, AOA, RSTD, RSRP and/or RSRQ for gNBs 110-1, 110-2, 110-3, or ng-eNB 114 or WLAN APs, or measurements of GNSS pseudorange, code phase and/or carrier phase for SVs 190) and send the measurements to an entity performing a location server function, e.g., LMF 152, or SLP 162, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or SLP 162). With a network based position method, one or more base stations (e.g. gNBs 110-1, 110-2) or APs may obtain location measurements (e.g. measurements of RSSI, RTT, AOA, RSRP, RSRQ, Rx-Tx or TOA for signals transmitted by UE 102) and/or may receive measurements obtained by UE 102, and may send the measurements to a location server, e.g., LMF 152, for computation of a location estimate for UE 102.

Information provided by the gNBs 110-2, 110-3, or ng-eNB 114 to the gNB 110-1 using XnAP may include timing and configuration information for PRS transmission and location coordinates of the gNBs 110-2, 110-3, or ng-eNB 114. The gNB 110-1 can then provide some or all of this information to the UE 102 as assistance data in an RRC message. An RRC message sent from gNB 110-1 to UE 102 may include an embedded LPP message in some implementations.

An RRC message sent from the gNB 110-1 to the UE 102 may instruct the UE 102 to do any of a variety of things, depending on desired functionality. For example, the RRC message could contain an instruction for the UE 102 to obtain measurements for GNSS (or A-GNSS), WLAN, and/or DL-TDOA (or some other position method) or to transmit uplink (UL) signals, such as Positioning Reference Signals (PRSs), Sounding Reference Signals (SRSs), or both. In the case of DL-TDOA, the RRC message may instruct the UE 102 to obtain one or more measurements (e.g. RSTD measurements) of PRS signals transmitted within particular cells supported by particular gNBs 110. The UE 102 may use the measurements to determine the position of UE 102, e.g., using DL-TDOA.

A gNB 110 in NG-RAN 112 may also broadcast positioning assistance data to UEs such as UE 102.

As illustrated, a Session Management Function (SMF) 156 connects the AMF 154 and the UPF 158. SMF 156 may manage the establishment, modification, and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using the SUPL location solution defined by the Open Mobile Alliance (OMA). SLP 162 may be further connected to or accessible from external client 130.

It should be understood that while FIG. 1 shows a network architecture for a non-roaming UE 102, with suitable, well-known, changes, a corresponding network architecture may be provided for a roaming UE 102.

In a 5G network supporting NR, a UE 102 may be in an RRC connected state (also referred to as a "connected state"), an RRC idle state (also referred to as an "idle state"), or an RRC inactive state (also referred to as an "inactive state"). The serving gNB 110-1 in the NG-RAN 112 may move the UE 102 to the inactive state (from the connected state), where a UE connection context is saved by the gNB 110-1 and the UE 102. The functionality of the UE 102 in the inactive state is primarily the same as in the idle state, where UE 102 will monitor for paging in a paging Discontinuous Reception (DRX) cycle. However, while in the inactive state, the UE 102 may also perform RAN-based notification area updates, e.g., periodically, and when moving outside a configured RAN-based notification area, may acquire system information, and may send System Information (SI) requests (if configured). When the RRC connection is resumed (i.e. when the UE 102 moves back into the connected state), since the UE connection context is already stored by the gNB 110 and the UE 102, the data activity resumption can be fast compared to establishing an RRC connection from the idle state after the RRC connection is released. Thus, with use of the inactive state, the UE 102 can move back into the connected state with reduced power consumption and lower latency than moving into the connected state from the idle state. Additionally, the UE 102 may be able to perform limited communication with the 5G network (e.g. with the AMF 154 or LMF 152) while in the inactive state without needing to transition back into the connected state. As shown further down herein, this capability can be used to support positioning of UE 102 with reduced power consumption by UE 102 and/or with reduced latency. It is noted that only the serving gNB 110 can suspend an RRC connection to move the UE 102 into the inactive state, but the resumption back into the connected state may be triggered by either the UE 102 or by a gNB 110.

Figure 2:
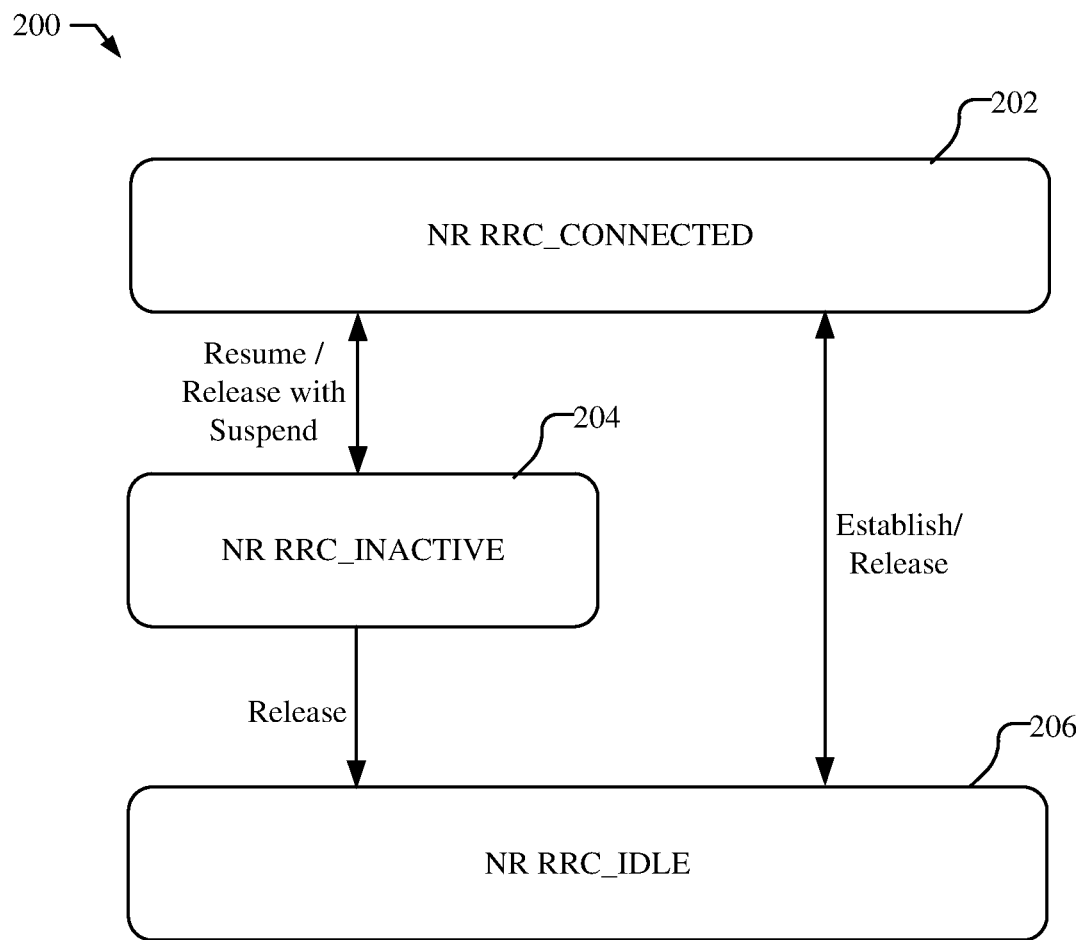
FIG. 2 illustrates a Radio Resource Control (RRC) connection state machine and state transitions.

FIG. 2, by way of example, illustrates a simple UE RRC state machine 200 and state transitions in NR, e.g., as described in 3GPP TS 38.331. A UE 102 may have only one RRC state in NR at one time. As illustrated, the UE 102 may have an NR RRC_CONNECTED state 202, an NR RRC_INACTIVE state 204, or an NR RRC_IDLE state 206. A UE 102 may be in either the RRC_CONNECTED state 202 or the RRC_INACTIVE state 204 when an RRC connection has been established. If this is not the case, i.e. no RRC connection has been established, the UE 102 is in RRC_IDLE state 206.

In the RRC_IDLE state 206, a UE specific DRX may be configured by upper layers and UE controlled mobility may be based on network configuration. While in RRC_IDLE state 206, the UE 102 may monitor Short Messages transmitted with Paging Radio Network Temporary Identifier (P-RNTI) over Downlink Control Information (DCI), monitor a Paging channel for Core Network (CN) paging using 5G-Serving Temporary Mobile Subscriber Identity (S-TMSI), performs neighboring cell measurements and cell (re-)selection, acquire system information and send SI request (if configured), and perform logging of available measurements together with location and time for logged measurement configured UEs.

In the RRC_INACTIVE state 204, a UE specific DRX may be configured by upper layers or by RRC layer, and UE controlled mobility may be based on network configuration. Additionally, the UE 102 stores the UE Inactive Access Stratum (AS) context, and a RAN-based notification area is configured by RRC layer. While in RRC_INACTIVE state 204, the UE 102 may monitor short messages transmitted with P-RNTI over DCI, monitor a Paging channel for CN paging using 5G-S-TMSI and RAN paging using full Inactive-RNTI (I-RNTI); perform neighboring cell measurements and cell (re-)selection. Additionally, the UE 102 may perform RAN-based notification area updates periodically and when moving outside a configured RAN-based notification area, acquire system information and send SI request (if configured), and performs logging of available measurements together with location and time for logged measurement configured UEs.

In the RRC_CONNECTED state 202, the UE 102 stores the AS context, is configured for transfer of unicast data to/from UE 102, and at lower layers, the UE 102 may be configured with a UE specific DRX. A UE 102 configured for supporting carrier aggregation (CA), may use of one or more secondary cells (Scells), aggregated with the serving primary cell (SpCell), for increased bandwidth. A UE 102 configured for supporting Dual Connectivity (DC), may use one Secondary Cell Group (SCG), aggregated with the Master Cell Group (MCG), for increased bandwidth. Further, the RRC_Connected state 202 includes network controlled mobility within NR and to/from E-UTRA. While in RRC_CONNECTED state 202, the UE 102 may monitor short messages transmitted with P-RNTI over DCI, if configured, monitor control channels associated with the shared data channel to determine if data is scheduled for it, provide channel quality and feedback information, performs neighboring cell measurements and measurement reporting, and may acquire system information.

As illustrated in FIG. 2, from the NR RRC_CONNECTED state 202, the UE 102 may transition to the NR RRC_IDLE state 206 by being released by a serving gNB 110. The UE 102 may transition from the NR RRC IDLE state 206 to the NR RRC CONNECTED state 202 by establishing an RRC connection to a serving gNB 110.

Additionally, from the NR RRC_CONNECTED state 202, the UE 102 may transition to the NR RRC_INACTIVE state 204 by being released with a suspend indication (sometimes referred to simply as being suspended) by the serving gNB 110. From the NR RRC_INACTIVE state 204, the UE 102 may transition back to the NR RRC CONNECTED state 202 by resuming the RRC connection. Because the serving gNB 110 (also referred to as an anchor gNB after the UE 102 enters the inactive state) and the UE 102 both store UE connection context, including the AS context, resuming the NR RRC_CONNECTED state 202 from the NR RRC_INACTIVE state 204 can be significantly faster and require less messaging than establishing the NR RRC_CONNECTED state 202 from the NR RRC_IDLE state 206. Additionally, as illustrated, while in the NR RRC_INACTIVE state 204, the UE 102 may transition to the NR RRC_IDLE state 206 by being released by a gNB 110.

Figure 3:
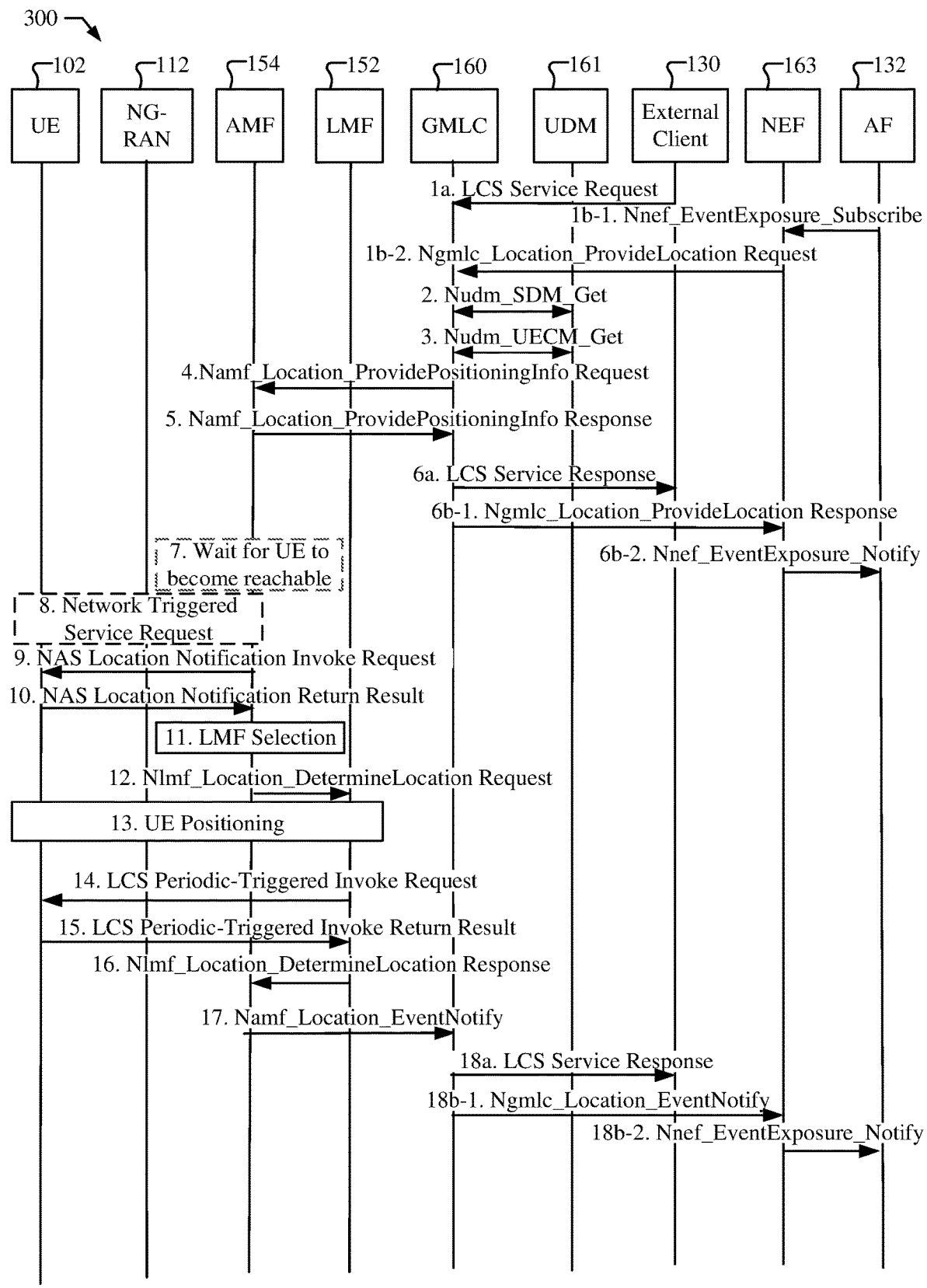
FIG. 3 shows a signaling flow that illustrates various messages sent between components of a communication system during a location preparation procedure for a deferred Mobile Terminated Location Request (MT-LR).

FIG. 3 shows a signaling flow 300 that illustrates various messages sent between components of the communication system 100 depicted in FIG. 1, during a location preparation procedure for a periodic triggered deferred location request for a Mobile Terminated Location Request (MT-LR).

At stage 1, including stages 1a, 1b-1 and 1b-2, the external LCS client 130 or the AF 132 (via NEF 163) sends a request to the GMLC 160 for location reporting for periodic, triggered or UE available location events. The external LCS client 130, for example, sends an LCS Service Request message to the GMLC 160 at stage 1a, or the AF 132 sends an Nnef_EventExposure_Subscribe message to NEF 163 at stage 1b-1 and the NEF 163 sends an Ngmlc_Location_ProvideLocation Request message at stage 1b-2. The request sent at stage 1 indicates a request for either periodic location estimates for UE 102 (e.g. at fixed periodic intervals) or triggered location reports (e.g. location estimates) for UE 102 to be returned to external LCS client 130 or AF 132 whenever a trigger event occurs at UE 102. For example, a trigger event may occur when UE 102 has moved by more than a defined threshold distance from a previous location at which a location report (e.g. location estimate) was sent to external LCS client 130 or AF 132, or may occur when UE 102 moves out of or into some defined geographic area. The GMLC 160 may typically be a Home GMLC (H-GMLC) for UE 102.

At stage 2, the GMLC 160 may verify UE privacy requirements via Nudm_SDM_Get messages with the UDM 161.

At stage 3, the GMLC 160 queries the UDM 161 for the AMF address (and, in the case of roaming, a VGMLC address) via Nudm_UECM_Get messages.

At stage 4, the GMLC 160 sends the location request to the serving AMF 154 (via a visited GMLC (V-GMLC) (not shown) in case of roaming), via an Namf_Location_ProvidePositioningInfo Request message.

At stages 5, the AMF 154 returns an acknowledgment (Namf_Location_ProvidePositioningInfo Response message) to the GMLC 160 indicating that the request was accepted.

At stage 6, including stages 6a, and 6b-1 and 6b-2, the GMLC 160 returns an acknowledgement to the external LCS client 130 or AF 132 indicating that the request was accepted. The GMLC 160, for example, sends an LCS Service Response message to the external LCS client 130 at stage 6a, or the GMLC 160 sends an Ngmlc_Location_ProvideLocation Response message to the NEF 163 at stage 6b-1 and the NEF 163 sends an Nnef_EventExposure_Notify message to AF 132 at stage 6b-2.

At stage 7, if the UE 102 is not currently reachable (e.g., is using extended discontinuous reception (eDRX) or is in power saving mode (PSM)), the AMF 154 waits for the UE 102 to become reachable.

At stage 8, if the UE 102 is then in a connection management (CM) IDLE state, the AMF 154 initiates a network triggered Service Request procedure to establish a signaling connection with the UE 102.

At stages 9 and 10, the AMF 154 may notify the UE 102 of the location request and may verify privacy requirements if required via Location Notification Invoke Request and Location Notification Return Result messages transferred using NAS.

At stage 11, the AMF 154 selects an LMF 152.

At stage 12, the AMF 154 initiates a request for deferred UE location (periodic or triggered location) with the LMF 152, via an Nlmf Location_DetermineLocation Request message. The request sent by AMF 154 to LMF 152 can include all or at least some of the information included in the original request at stage 1, including information for the periodic or triggered location request and may further include an identity of UE 102, an identity or address for GMLC 160 and some label or reference for the location session being established by signaling flow 300.

At stage 13, the LMF 152 may perform a positioning procedure with the UE 102. During this stage, the LMF 152 may obtain the UE 102 positioning capabilities and may also obtain an (initial) UE 102 location, e.g. by exchanging LPP messages with UE 102. The UE 102 positioning capabilities may indicate UE 102 support for at least one of uplink positioning, downlink positioning, uplink and downlink positioning, or a combination thereof while in an RRC Inactive state. The LMF 152 may then determine whether to enable, at stages 14 and 16, uplink positioning, downlink positioning and/or uplink and downlink positioning in an RRC Inactive state, based on the UE 102 positioning capabilities.

At stage 14, since periodic or triggered location was requested, the LMF 152 sends a Supplementary Services (SS) LCS Periodic-Triggered Invoke Request message to the UE 102 including deferred MT-LR information, which may include information about the requested periodic or triggered location, such as a type of event, positioning method requested (e.g. an UL, DL or UL+DL positioning method), and reporting interval, and an identity or address for the GMLC 160, a label or reference to the location session being established by signaling flow 300, and/or an embedded LPP Packet Data Unit (PDU) which indicates certain allowed or required location measurements. The LMF 152 may indicate that the UE 102 may send an event report in an RRC Inactive state (e.g. as discussed in FIGS. 4A, 4B, 4C, 4D and 4E). If the request at stage 14 can be supported, the UE 102 returns an acknowledgment to the LMF 152 in an SS LCS Periodic-Triggered Invoke Return Result message (stage 15).

At stages 16-18, the LMF 152 provides a response to the external LCS client 130 or AF 132 (via the NEF 163), via intermediate network entities. For example, at stage 16, the LMF 152 provides the response in an Nlmf_Location_DetermineLocation Response message to the AMF 154. At stage 17, the AMF 154 provides the response in an Namf_Location_EventNotify message to the GMLC 160. At stage 18, including stages 18a, and 18b-1 and 18b-2, the GMLC 160 sends the response to the external LCS client 130 or AF 132. The GMLC 160, for example, sends an LCS Service Response message to the external LCS client 130 at stage 18a, or the GMLC 160 sends an Ngmlc_Location_EventNotify message to the NEF 163 at stage 18b-1 and the NEF 163 sends an Nnef_EventExposure_Notify message to AF 132 at stage 18b-2. The response indicates whether periodic or triggered location was successfully activated in the UE 102.

Figure 4A:
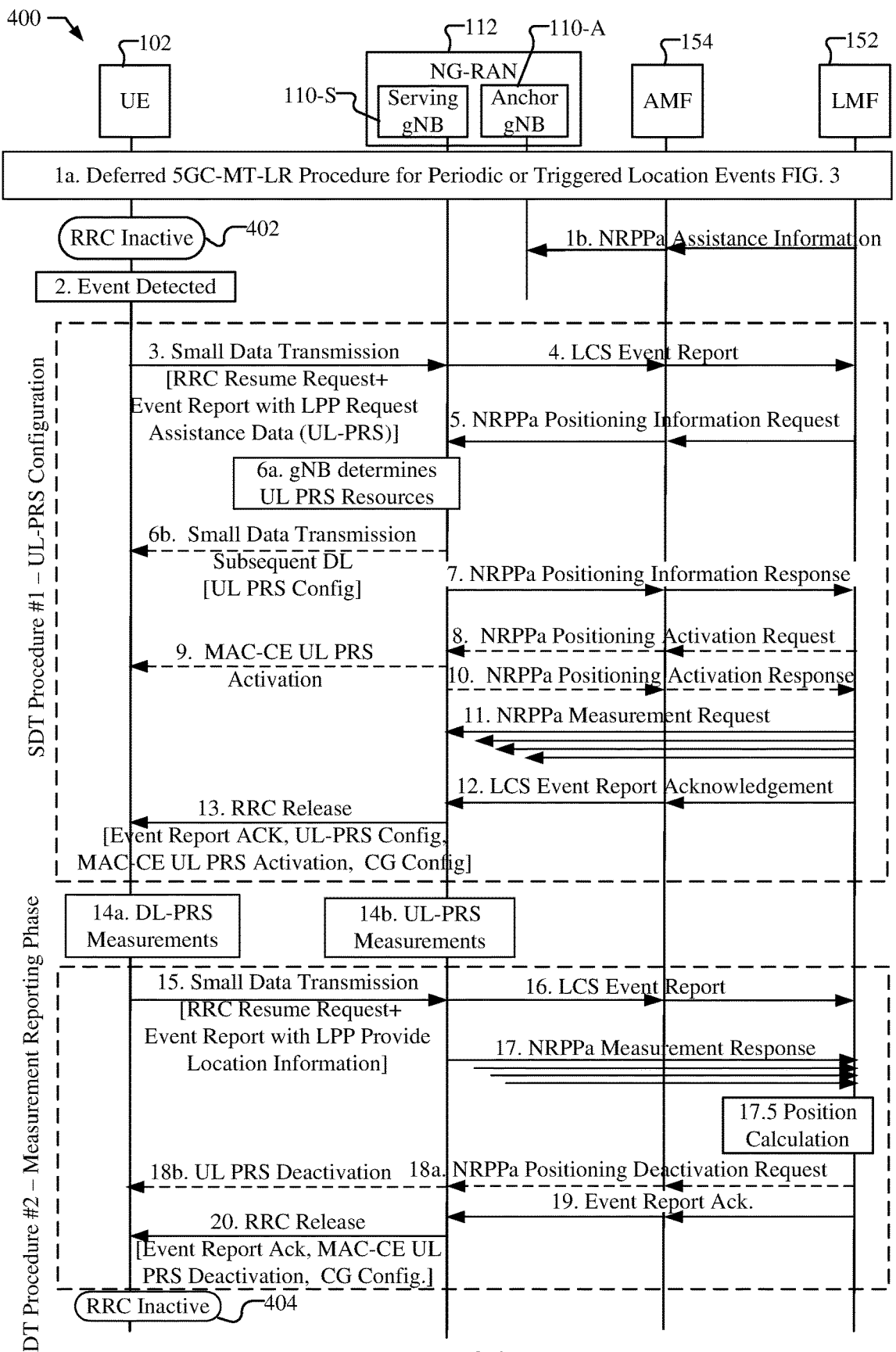
FIG. 4A shows a signaling flow that illustrates various messages sent between components of a communication system for event reporting for a deferred MT-LR request for uplink or uplink plus downlink positioning while a UE is in an RRC Inactive state.

FIG. 4A shows a signaling flow 400 that illustrates various messages sent between components of the communication system 100 depicted in FIG. 1, for event reporting for a periodic triggered deferred MT-LR procedure with SDT for UL or UL+DL positioning of the UE 102 while the UE 102 is in an RRC Inactive state. Signaling flow 400 may be a continuation of the signaling flow 300 shown in FIG. 3, as illustrated by stage 1a in FIG. 4A. Thus, stages 1-18 in FIG. 3 may have occurred prior to the events and stages described for FIG. 4A. Note that this would normally be the case except where a location server located in the NG-RAN 112 is used, in which case signaling may have previously occurred similar to FIG. 3 but using a location server in the NG-RAN 112 instead of or in addition to the LMF 152. Signaling flow 400 makes use of two event reports sent by UE 102 to LMF 152 in the case of UL+DL position methods, where the first event report supports the UL positioning portion and the second event report supports the DL positioning portion. LMF 152 sends an event report acknowledgment to UE 102 after receiving each event report. This can help keep the UE 102 in RRC INACTIVE state and avoid the need for gNB 110-S to place UE 102 in a CONNECTED state which would generate additional delay and signaling.

FIG. 4A illustrates the presence of a serving gNB 110-S and an anchor gNB 110-A in the NG-RAN 112, which may in some cases be the same gNB 110. The serving gNB 110-S interacts with the UE 102, while the anchor gNB 110-A maintains a connection with the AMF 154 on behalf of the UE 102. The anchor gNB 110-A represents a previous serving gNB 110 for the UE 102, e.g., from before the UE 102 entered an RRC Inactive state. For example, before entering an RRC Inactive state, the UE 102 was in a connected state with a serving gNB 110 and a serving AMF 154. At some point, the serving gNB 110 may have sent an RRC Release message with a suspend indication to the UE 102. The UE 102 would then have entered the RRC Inactive state and the serving gNB 110 may have then become the anchor gNB 110-A (though, in some cases, the anchor gNB 110-A may have both been and remained different from the last serving gNB 110, as described in 3GPP TS 38.300). After entering the RRC Inactive state, the UE 102 may move. If the UE 102 is to report a periodic or triggered event for periodic or triggered location, the movement of the UE 102 may require that the UE 102 use a different serving gNB 110, illustrated in FIG. 4A as the serving gNB 110-S, while an earlier serving gNB 110 serves as the anchor gNB 110-A. In some implementations, e.g., where the UE 102 has not moved significantly, the serving gNB 110-S and the anchor gNB 110-A may be the same entity. The NG-RAN 112 may also include other gNBs 110 (not shown in FIG. 4A), which may be referred to collectively as gNBs 110.

FIG. 4A illustrates the use of LMF 152, which is in the 5GCN 150, as illustrated in FIG. 1. Communications between the gNBs 110 and the LMF 152 may be transmitted via the AMF 154. In some implementations, the location server may be located in the NG-RAN 112, e.g., sometimes referred to as a location server surrogate (LSS) or Location Management Component (LMC). For all stages in signaling flow 400, the gNB 110 to LMF 152 NRPPa messages are not needed with an LSS or LMC, which may be located, e.g., in the anchor gNB 110-A.

As illustrated by stage 1a, a deferred 5GC-MT-LR procedure for periodic or triggered location events, such as illustrated in FIG. 3, or as specified in 3GPP TS 23.273 is performed. The UE 102 may receive with the periodic or triggered invoke request message deferred MT-LR information, e.g., including information about the requested periodic or triggered location, such as a type of event, positioning method(s) requested, and reporting interval. The UE 102 or the LMF 152 may provide some of the deferred MT-LR information to an initial serving gNB 110 for the UE 102 (e.g. which may be the gNB 110-A), along with positioning capabilities information of the UE 102, and the initial serving gNB 110 may use the deferred MT-LR information and the positioning capabilities of the UE 102 to transition the UE 102 to RRC Inactive state. The LMF 152 may perform one or more positioning procedures at stage 13 of FIG. 3 (or Step 15 of 3GPP TS 23.273, clause 6.3.1) to request and obtain the UE 102 positioning capabilities or provide any necessary assistance data to the UE 102. For UL+DL positioning using Multi-RTT, the LCS Periodic-Triggered Location Invoke at stage 14 of FIG. 3 (or Step 16 of 3GPP TS 23.273, clause 6.3.1) may include an embedded LPP Request Location Information message which indicates the allowed or required Multi-RTT location measurements for each location event reported. The UE 102 is released by the initial serving gNB 110 from RRC_CONNECTED to RRC_INACTIVE by an RRC Release with SuspendConfig (not shown in FIG. 4A). The UE 102 may be configured with CG-SDT or RA-SDT for small data transmission.

At stage 1b, the initial serving gNB 110 (shown here as gNB 110-A) may receive NRPPa Assistance Information from the LMF 152, such as the UE 102 capability for UL+DL positioning in RRC_INACTIVE or information for the configured deferred MT-LR in the UE 102. The initial serving gNB 110 may use this information for transferring the RRC state of the UE to RRC_INACTIVE instead of RRC_IDLE. For periodic events, the initial serving gNB 110 may then also be aware when to normally expect Event Reports from the UE 102.

As illustrated by block 402, the UE 102 is subsequently in an RRC Inactive state. For example, the UE 102 may have entered the RRC Inactive state as described above. The UE 102 then has no active RRC connection with the NG-RAN 112, but still has a Non-Access Stratum (NAS) signaling connecting with the serving AMF 154 via the anchor gNB 110-A. Thus, while in RRC Inactive state, there is a signaling connection between the AMF 154 and anchor gNB 110-A, on behalf of the UE 102, but that signaling connection does not actively extend to the UE 102.

At stage 2, the UE 102 monitors for occurrence of the trigger or periodic event requested during stage 1. The UE 102 may detect an event for the periodic or triggered deferred MT-LR that was instigated in the UE 102 at stages 14 and 15 in FIG. 3. The event may be a periodic event or a triggered event, e.g. as described for stage 1 of FIG. 3. Immediately after (or sometime before) the event is detected, the UE 102 may determine which position method(s) will be used for the detected event from the request in stage 14 of FIG. 3. The determined position method(s) may be based on: (i) position methods included in an LPP Request Location Information message carried in the LCS Periodic-Triggered Invoke Request at stage 14 of FIG. 3; and/or (ii) position method(s) used for the last event report sent by UE 102. The UE 102 may also determine whether event reporting using SDT is allowed in RRC Inactive state based on: (i) an indication received at stage 14; or (ii) an indication received earlier from a previous serving gNB 110 (e.g. received when the UE 102 first entered or previously entered RRC Inactive state). When event reporting using SDT is allowed in RRC Inactive state and after the event is detected at stage 2, the UE 102 performs only stages for SDT Procedure #1 (as described below) for UL position methods, the UE 102 performs only stages for SDT Procedure #2 (as described below) plus stage 14a and without stage 18b for DL position methods, or the UE 102 performs stages for SDT Procedures #1 and #2 (plus stage 14a) for UL+DL position methods. When event reporting is not allowed in RRC Inactive state, the UE 102 may send an RRC Resume Request to the current serving gNB which is gNB 110-S (as described above) to enter RRC Connected state and then reports the event using the solution for a periodic or triggered deferred MT-LR described in 3GPP TS 23.273 and 3GPP TS 38.305. In that case, the rest of signaling flow 400 is not performed. Otherwise, when event reporting is allowed in RRC Inactive state, the UE 102 performs the stages described below for signaling flow 400.

SDT Procedure #1 includes stages 3-13 in FIG. 4A and may be performed for UL-PRS (SRS) configuration, which may be used for UL only or UL+DL positioning methods (but not for DL only positioning methods).

At stage 3, when an event is detected (or slightly before), the UE 102 performs a 2-step or 4-step Random Access Channel (RACH) procedure. In the case of a 2-step RACH, the UE 102 includes an RRC Resume Request message in the PUSCH payload for MsgA; in the case of a 4-step RACH, the UE 102 sends an RRC Resume Request message in msg3 to the gNB 110-S. Otherwise, if configured grant (CG)-SDT resources are configured on the selected UL carrier and are valid, the UE 102 sends an RRC Resume Request message in the CG transmission to the gNB 110-S. The UE 102 sends an RRC UL Information Transfer message containing an UL NAS Transport message along with the RRC Resume Request with SDT. The UE 102 includes an LCS Event Report in the payload container of the UL NAS Transport message, and a Deferred Routing Identifier (received during stage 1a) in an Additional Information parameter of the UL NAS Transport message (e.g. as defined in 3GPP TS 24.501). For UL+DL Positioning (Multi-RTT), the LCS Event Report includes an embedded LPP Request Assistance Data message with Information Element (IE) NR-Multi-RTT-RequestAssistanceData and nr-AdType set to 'ul-srs' to request an UL-PRS for Multi-RTT positioning, e.g., as specified in 3GPP TS 37.355. For UL-only positioning, no LPP Request Assistance Data message is currently defined in the LPP protocol. UL-only positioning is a network-based positioning method which does not require assistance data or location measurement reports from a UE. Therefore, the LPP Request/Provide Assistance Data and LPP Request/Provide Location Information procedures are not applicable to UL-only positioning. For UL-only positioning, a new LPP Request Assistance Data message could be used to allow a request for UL PRS in the case of UL-only positioning or the LPP Request Assistance Data message for Multi-RTT may be extended or generalized to support UL-only positioning as well. Alternatively, for UL-only positioning, the LCS Event Report at Stage 3 does not include an embedded LPP Request Assistance Data message. The LMF 152 may then infer from the absence of an LPP message in the LCS Event Report that UL-only positioning is being performed and may then also infer that that no second SDT procedure will be performed by the UE 102. I.e., the LMF 152 may then not wait for a second LCS Event Report before performing Stage 17.5. For UL+DL Positioning (Multi-RTT), the LCS Event Report may in addition include an embedded LPP Provide Location Information message with (E)CID measurements. The Cell-IDs in the embedded LPP Request Assistance Data and/or LPP Provide Location Information may help the LMF 152 to determine whether additional DL-PRS assistance data are required at the UE 102 or additional TRPs should be instructed for UL measurements at stage 11 (i.e., because of potential UE 102 movement after stage 1). For example, if the UE 102 observes cells for which no DL-PRS assistance data has been provided for Multi-RTT (e.g., during stage 1a), the UE 102 may request additional DL-PRS assistance data in the LPP Request Assistance Data message in the LCS Event Report, in addition to the UL-PRS request. The cell-IDs the UE 102 observes may be provided in a LPP Provide Location Information message for E-CID. The LMF 152 may also use the UE reported cell-IDs to determine the cells whose DL-PRS the UE 102 will measure at stage 14a, and, at stage 11, may instruct the gNBs 110/TRPs corresponding to these cells to measure the UL PRS (transmitted by UE 102), thereby helping ensure that the LMF 152 will obtain UL measurements for the same cells for which the UE 102 will obtain DL measurements and thereby enable an RTT to be determined by LMF 152 for each of these cells at stage 17.5.

At stage 4, the serving gNB 110-S sends the LCS Event Report with the LPP Request Assistance Data message (when included in stage 3) in an NGAP Uplink NAS Transport message to the serving AMF 154. The AMF determines the LMF 152 from the Deferred Routing Identifier received in the Additional Information IE of the UL NAS TRANSPORT message and forwards the LCS Event Report with embedded LPP message via triggering Namf_Communication_N1MessageNotify service operation towards the LMF 152. The AMF 154 also includes the Payload Container Type and the Correlation Identifier set to the Deferred Routing Identifier. The serving gNB 110-S may send the LCS Event Report to the AMF 154 and LMF 152 via the anchor gNB 110-A when the gNB 110-S is not the same as the gNB 110-A.

At stage 5, the LMF 152 sends a NRPPa Positioning Information Request message to the serving gNB 110-S (e.g. via the gNB 110-A) to request UL-PRS for the UE 102. The NRPPa Positioning Information Request PDU is first provided to the AMF 154 using a Namf_Communication_N1N2MessageTransfer service operation towards the AMF 154 to request the transfer of the NRPPa PDU to the serving gNB 110-S for the UE. The AMF 154 then forwards the NRPPa PDU to the serving gNB-110-5 in an NGAP Downlink UE Associated NRPPa Transport message (and possibly via the gNB 110-A).

At stage 6, including stage 6a, the serving gNB 110-S determines the resources available for UL-PRS. In some implementations, the serving gNB 110-S may provide the UL-PRS-configuration to the UE 102 via subsequent DL SDT at stage 6b (e.g., in the case of semi-persistent UL-PRS).

At stage 7, the serving gNB 110-S provides the UL-PRS configuration information to the LMF 152 in a NRPPa Positioning Information Response message. The NRPPa Positioning Information Response PDU is first provided (e.g. via the gNB 110-A) to the AMF 154 in an NGAP Uplink UE Associated NRPPa Transport message. The AMF 154 then forwards the NRPPa PDU to the LMF 152 by invoking the Namf_Communication_N2InfoNotify service operation towards the LMF 152.

At stage 8, in the case of semi-persistent UL-PRS, the LMF 152 requests activation of the UL-PRS transmission by sending a NRPPa Positioning Activation Request message to the serving gNB 110-S of the UE 102 (e.g. via the gNB 110-A).

At stage 9, in the case of semi-persistent UL-PRS, the serving gNB 110-S activates the UL-PRS transmission in the UE 102 via a MAC-CE UL PRS Activation Request.

At stage 10, in the case of semi-persistent UL-PRS, the serving gNB 110-S sends a NRPPa Positioning Activation Response message to the LMF 152 (e.g. via the gNB 110-A) indicating successful UL-PRS activation at the UE 102.

At stage 11, the LMF 152 sends a NRPPa Measurement Request to one or more gNBs 110 including the UL-PRS measurement configuration.

At stage 12, the LMF 152 sends a Supplementary Services LCS Event Report Acknowledgement to the serving gNB 110-S (e.g. via the gNB 110-A).

At stage 13, the serving gNB 110-S sends a RRC Release message with suspendConfig to keep the UE 102 in RRC_INACTIVE state. The serving gNB 110-S may use the NRPPa Assistance Information from stage 1b to assist in this step. For example, if the NRPPa Assistance Information from stage 1b was received by the anchor gNB 110-A, the gNB 110-A may direct the gNB 110-S to keep the UE 102 in RRC INACTIVE state. The RRC Release message includes a RRC DL Information Transfer including the Event Report Acknowledgement received at stage 12. If stage 6b did not occur (e.g., in the case of periodic UL-PRS), the RRC Release message includes the UL-PRS Configuration. If stage 9 did not occur (e.g. in the case of semi-persistent UL-PRS), the RRC Release message includes the MAC-CE UL PRS Activation.

SDT Procedure #2 includes stages 15-20 and may be performed for measurement reporting, e.g., for DL only or UL+DL positioning methods. Stages 14a, 15, 16, 18-20 are not performed for UL-only positioning methods.

At stage 14a, the UE 102 may receive DL PRS from one or more gNBs 110 and perform DL positioning measurements if DL only or UL+DL positioning is performed. The UE 102 may also or instead perform DL position measurements for other position methods, e.g. such as A-GNSS or WLAN, e.g., if requested during stage 1a.

At stage 14b, the UE 102 may transmit UL PRS (e.g. UL SRS) as per the UL PRS configuration received at stage 6b or stage 13. Each gNB 110, that was configured at stage 11, performs UL-PRS (e.g. UL SRS) measurements.

At stage 15, the UE 102 sends an RRC UL Information Transfer message containing an UL NAS Transport message along with the RRC Resume Request with SDT. The UE 102 includes an LCS Event Report and LPP Provide Location Information message in the payload container of the UL NAS Transport message, and the Deferred Routing Identifier (received during stage 1a) in the Additional Information of the UL NAS Transport message as defined in 3GPP TS 24.501.

At stage 16, the serving gNB 110-S sends the LCS Event Report with the LPP Provide Location Information message in an NGAP Uplink NAS Transport message to the serving AMF 154 (e.g. via the gNB 110-A). The AMF 154 determines the LMF 152 from the Deferred Routing Identifier received in the Additional Information IE of the UL NAS TRANSPORT message and forwards the LCS Event Report with embedded LPP message via triggering Namf_Communication_N1MessageNotify service operation towards the LMF 152. The AMF 154 also includes the Payload Container Type and the Correlation Identifier set to the Deferred Routing Identifier.

At stage 17, after performing the UL-PRS (e.g. UL SRS) measurements, the gNBs 110 each provide the UL measurements to the LMF 152 in a NRPPa Measurement Response message.

At stage 17.5, the LMF 152 may perform a position determination for UE 102 using the DL PRS measurements (and/or other DL measurements) obtained at stage 16 and/or the UL PRS measurements obtained at stage 17. The LMF 152 may then send an event report containing the determined position for the UE 102 to external client 130 or AF 132 via GMLC 160 (in the case of external client 130) or via GMLC 160 and NEF 163 (in the case of AF 132), e.g. as described in 3GPP TS 23.273, though not shown in FIG. 4A.

At stage 18, for semi-persistent UL-PRS, the LMF 152 may send in stage 18a, a NRPPa Positioning Deactivation Request to the serving gNB 110-S (e.g. via the gNB 110-A) to request deactivation of UL-PRS transmission at the UE 102. The serving gNB 110-S deactivates the UL-PRS transmission via MAC-CE PRS Deactivation sent in stage 18b.

At stage 19, the LMF 152 sends an LCS Event Report Acknowledgement to the serving gNB 110-S (e.g. via the gNB 110-A).

At stage 20, the serving gNB 110-S sends a RRC Release message with suspendConfig to keep the UE 102 in RRC_INACTIVE state. For example, the gNB 110-A may direct the gNB 110-S to keep the UE 102 in RRC INACTIVE state. The RRC Release message includes a RRC DL Information Transfer including the Event Report Acknowledgement received at stage 19. If stage 18b did not occur (in the case of semi-persistent UL-PRS), the RRC Release message includes the MAC-CE UL PRS Deactivation.

As illustrated, at block 404, the UE 102 may remain in the RRC Inactive state, and the procedure may be repeated.

The signaling flow 400 allows for the anchor gNB 110-A to remain the anchor gNB for the UE 102 at block 404 after the event reporting has occurred. However, it is also possible for the serving gNB 110-S to become a new anchor gNB for the UE 102 during stage 13 or during stage 20. For example (e.g. and as described in 3GPP TS 38.300), the serving gNB 110-S may request and obtain the UE 102 context from the anchor gNB 110-A (not shown in FIG. 4A) and may then perform a path switch with the serving AMF 154 for the UE 102 and send a context release indication the anchor gNB 110-A (not shown in FIG. 4A). The serving gNB 110-S then becomes the new anchor gNB 110-A for the UE 102 which avoids the need to send messages to LMF 152 and receive messages from LMF 152 via the anchor gNB 110-A. Becoming the new anchor gNB 110-A may add additional signaling and delay but can also reduce delay by avoiding further signaling between the serving gNB 110-S and the anchor gNB 110-A. In particular, if UE 102 continues to access the same serving gNB 110-S for later event reports, the reduction in delay for the later event reports may be beneficial.

Figures 1, 4B:
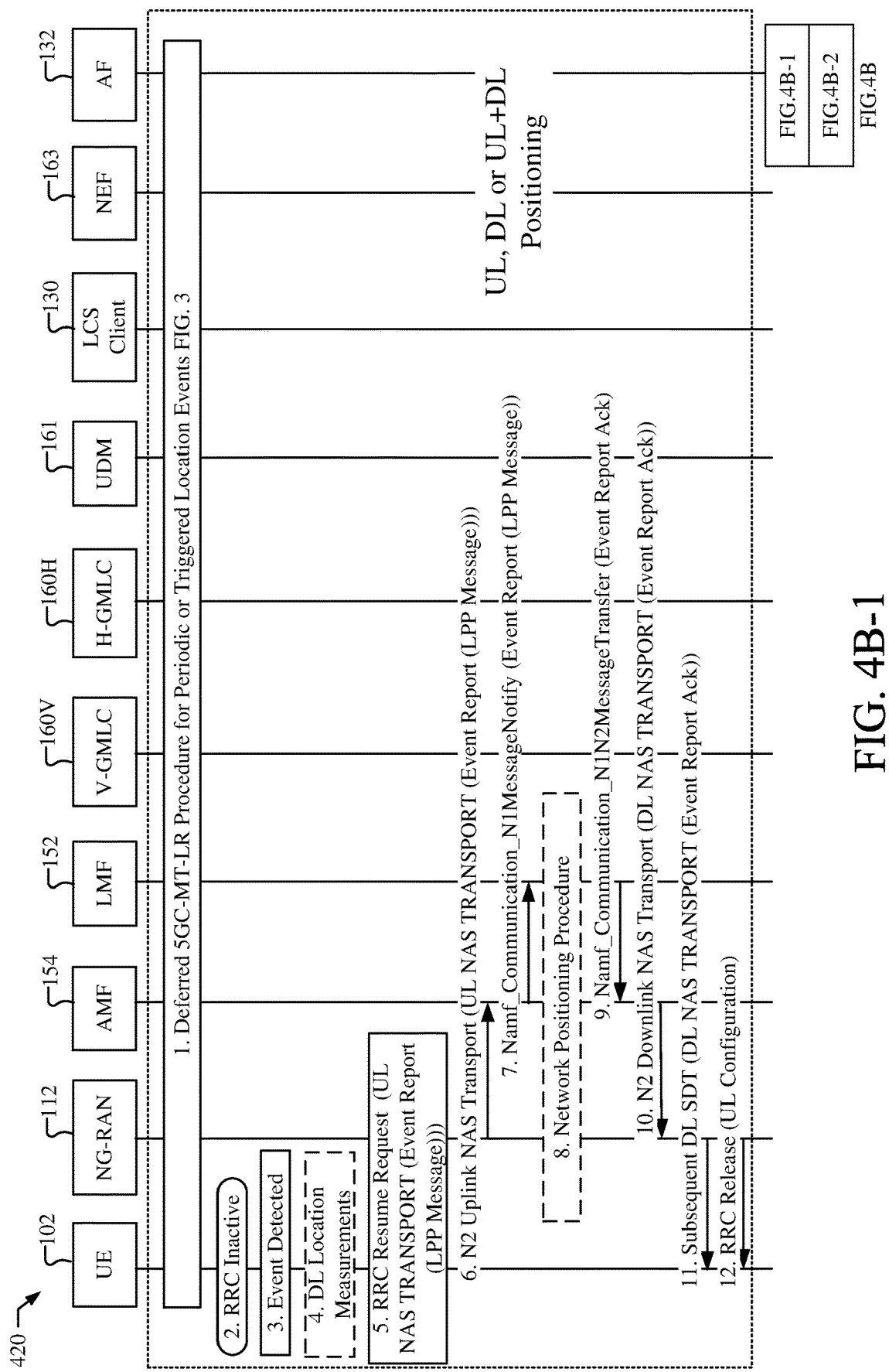
FIG. 4B, which includes
Figures 2, 4B:
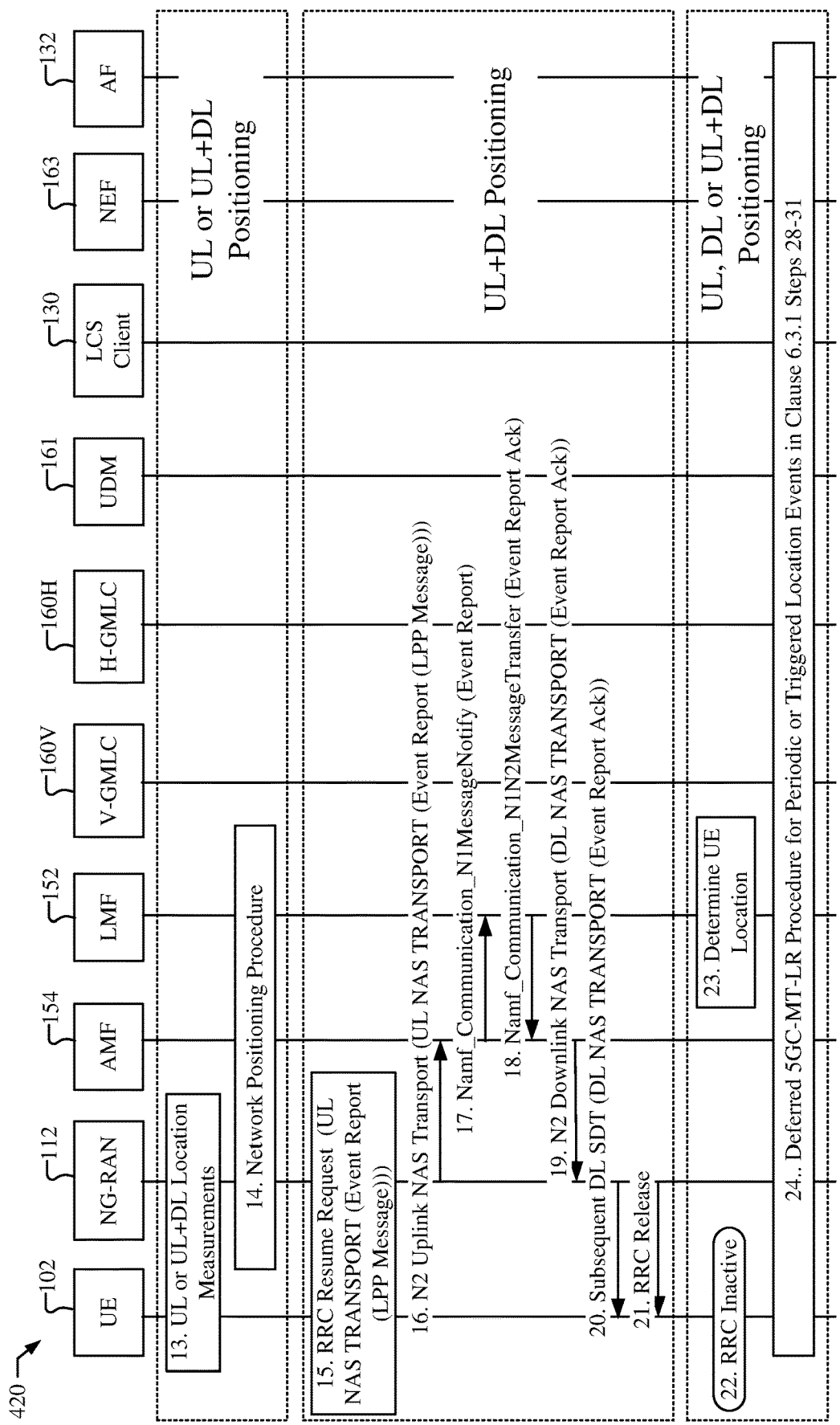

FIG. 4B, which includes FIG. 4B-1 and FIG. 4B-2, illustrates the initiation and reporting of location events for a deferred 5GC-MT-LR procedure for Periodic or Triggered Location Events when a UE 102 is in RRC INACTIVE state. This procedure may be applicable to a UE 102 with NR access to 5GC. FIG. 4B illustrates a similar procedure to FIG. 4A with UE 102 sending one or two event reports as in FIG. 4A. The serving gNB 110-S and anchor gNB 110-A for UE 102 are not shown in FIG. 4B but may still be present in NG-RAN 112 and then behave as described in FIG. 4A in terms of supporting signaling between UE 102 and AMF 154 and LMF 152.

At stage 1 in FIG. 4B, a deferred 5GC-MT-LR procedure for periodic or triggered location events, such as illustrated in FIG. 3, or as specified in 3GPP TS 23.273, is performed with the following differences.

At stage 14 in FIG. 3, or as specified in step 16 of 3GPP TS 23.273, clause 6.3.1, the LMF 152 indicates to the UE 102 whether UL, DL or UL+DL positioning will be used for subsequent location reporting events when the UE 102 is in RRC INACTIVE state. For example, the LMF 152 may include an indication in the LCS Periodic-Triggered Invoke Request sent to the UE 102 at stage 14 in FIG. 3 indicating which type of positioning may be used or may include an LPP message in the LCS Periodic-Triggered Invoke Request sent to the UE 102 at stage 14 in FIG. 3 (or step 16 in 3GPP TS 23.273 clause 6.3.1), with such an indication. If UL positioning will be used, the LMF 152 does not include an LPP positioning message in the LCS Periodic-Triggered Invoke Request sent to the UE 102 at stage 14 in FIG. 3. If DL positioning will be used, the LMF 152 includes an LPP positioning message in the LCS Periodic-Triggered Invoke Request sent to the UE 102 at stage 14 in FIG. 3, where the LPP positioning message (e.g. an LPP Request Location Information message) requests DL location measurements or a location estimate based on DL location measurements. If UL+DL positioning will be used, the LMF 152 includes an LPP positioning message in the LCS Periodic-Triggered Invoke Request sent to the UE 102 at stage 14, where the LPP positioning message (e.g. an LPP Request Location Information message) identifies an UL+DL positioning method and requests DL location measurements for this positioning method. The LMF 152 also includes a deferred routing identifier in the LCS Periodic-Triggered Location Invoke which is an identification of the LMF 152. If no location of the UE 102 is needed for event reporting or if a location based on a Cell ID will suffice for the location Quality of Service (QoS), the LMF 152 follows the procedure for DL positioning but does not include an LPP positioning message in the LCS Periodic-Triggered Invoke Request sent to the UE 102 at stage 14. The UE 102 will then not obtain DL location measurements at stage 4 or include an LPP positioning message in the supplementary services event report message sent at stage 5.

A deferred routing identifier indicating a default LMF 152 may not be included in the LCS Periodic-Triggered Location Invoke sent at stage 14 in FIG. 3 (step 16 of 3GPP TS 23.273 clause 6.3.1), because for event reporting at stages 5-21 below, the LMF 152 needs to know which type of positioning was indicated at stage 1 in order to correctly support these subsequent stages. However, a default LMF 152 may not know which type of positioning had been indicated at stage 1.

At stage 2 in FIG. 4B, the UE 102 enters RRC INACTIVE state some time before an event is detected. For example, a previous serving gNB 110 for UE 102 may have sent an RRC Release message with a suspend indication to the UE 102. The UE 102 would then have entered the RRC Inactive state and the previous serving gNB 110 may have then become an anchor gNB 110-A for the UE 102 (though, in some cases, an anchor gNB 110-A for UE 102 may have both been and remained different from the last serving gNB 110 for UE 102, as described in 3GPP TS 38.300). If the UE 102 is not in RRC INACTIVE state when an event is detected (e.g. at stage 3), then the UE 102 may follow the procedure described for steps 22-31 in 3GPP TS 23.273 clause 6.3.1 to report the event to the LMF 152 and to the LCS Client 130 or AF 132, depending on the type of LPP message or lack of an LPP message received at stage 1 (e.g., stage 14 in FIG. 3). The LMF 152 may not be aware of whether the UE 102 is in RRC INACTIVE state. This allows the LMF 152 to follow the procedure described here or the procedure described in 3GPP TS 23.273 clause 6.3.1 for event reporting. With the procedure described here in FIG. 4B, a UE 102 that was initially in RRC INACTIVE state can remain in RRC INACTIVE state after the procedure is complete. With the procedure in 3GPP TS 23.273 clause 6.3.1, a UE 102 that was initially in RRC INACTIVE state could be moved into RRC CONNECTED state during the procedure in 3GPP TS 23.273 clause 6.3.1.

At stage 3, the UE 102 monitors for and detects a trigger event as requested during stage 1.

At stage 4, if DL positioning was indicated at stage 1, the UE 102 obtains the DL location measurements or location estimate requested in the LPP message received in stage 1. If UL positioning or UL+DL positioning was indicated at stage 1, stage 4 is skipped.

At stage 5, the UE 102 sends an RRC Resume Request with small data transmission (SDT) to a serving gNB 110 (e.g. gNB 110-S) in the NG-RAN 112. The RRC Resume Request includes an RRC UL Information Transfer message containing an UL NAS TRANSPORT message that includes a supplementary services event report message. If DL positioning was indicated at stage 1, the UE 102 includes an LPP positioning message (e.g. an LPP Provide Location Information message) in the supplementary services event report message that includes the DL location measurements or location estimate obtained at stage 4. If UL+DL positioning was indicated at stage 1, the UE 102 includes an LPP positioning message (e.g. an LPP Request Assistance Data message) in the supplementary services event report message that includes a request for an UL Configuration to support the UL+DL positioning method indicated to the UE 102 at stage 1. If UL+DL positioning was indicated at stage 1, the event report message may also include an identifier (e.g. a numeric identifier) which may identify the event report message. If UL positioning was indicated at stage 1, the UE 102 does not include an LPP positioning message in the supplementary services event report message. The event report message may also include other information described in TS 23.273 step 25 in clause 6.3.1 (e.g. the type of event being reported). The UL NAS TRANSPORT message also includes the deferred routing identifier received in stage 14 in FIG. 3.

At stage 6, the serving gNB 110 forwards the UL NAS TRANSPORT message to the serving AMF 154 in an N2 Uplink NAS Transport message. If the serving gNB 110 is not the anchor gNB 110 (e.g. is not the gNB 110-A) for the UE 102, the UL NAS TRANSPORT message may be forwarded to the serving AMF 154 via the anchor gNB 110.

At stage 7, the AMF 154 checks the integrity of the NAS message and deciphers its contents. The AMF 154 then invokes an Namf_Communication_N1MessageNotify service operation to forward the event report to the serving LMF 152.

At stage 8, if UL or UL+DL positioning was indicated to the UE 102 at stage 1, the LMF 152 uses a Network Assisted Positioning Procedure as described in stages 5, 6a, 7, 8, 10 in FIG. 4A or as described in 3GPP TS 23.273 clause 6.11.2 to request the serving gNB 110 to provide an UL configuration (e.g. an UL SRS or UL PRS configuration) to the UE 102 at stage 12. The serving gNB 110 then determines an UL configuration (e.g. an UL SRS or UL PRS configuration as at stage 6a in FIG. 4A) and provides details of the determined UL Configuration back to the LMF 152 (e.g., as at stage 7 in FIG. 4A). The LMF 152 also uses a Non-UE Associated Network Assistance Data procedure to request UL location measurements of the UE 102 by NG-RAN 112 gNB 110 nodes (e.g., as at stage 11 in FIG. 4A). Because the UE 102 is in RRC INACTIVE state and thus in CM CONNECTED state, AMF 154 would not perform a Network Triggered Service Request to support UL or UL+DL positioning. This avoids a transition of the UE 102 into RRC CONNECTED state.

At stage 9, the LMF 152 invokes an Namf_Communication_N1N2MessageTransfer operation to return an acknowledgment for the event report. If there is a change of LMF 152, the acknowledgment may include a deferred routing identifier for the new LMF 152.

At stage 10, the AMF 154 forwards the acknowledgment to the serving gNB 110 in a DL NAS TRANSPORT message which is encapsulated in an N2 Downlink NAS Transport message. If the serving gNB 110 is not the anchor gNB 110 for the UE 102, the DL NAS TRANSPORT message may be forwarded to the serving gNB 110 via the anchor gNB 110.

At stage 11, the serving gNB 110 sends a Subsequent DL SDT message to the UE 102 and includes the NAS message received in stage 10.

At stage 12, the serving gNB 110 sends an RRC Release message to the UE 102 to keep the UE 102 in RRC INACTIVE state and includes any UL Configuration requested by the LMF 152 at stage 8 and/or determined by the serving gNB 110 at stage 8 to support UL or UL+DL positioning. In some implementations (e.g., in the case of semi-persistent UL-PRS), stage 6b and/or stage 9 of FIG. 4A may also be performed by the serving gNB 110 prior to stages 11 and 12. If DL positioning was indicated to the UE 102 at stage 1, the LMF 152 and UE 102 skip stages 13 to 21 and proceed to stage 22.

At stage 13, if UL or UL+DL positioning was indicated at stage 1, the UE 102 transmits UL positioning signals according to the UL Configuration received at stage 12. If UL+DL positioning was indicated at stage 1, the UE 102 also obtains DL location measurements as requested at stage 1. The NG-RAN 112 gNB 110 nodes that were requested to obtain UL location measurements at stage 8 obtain the UL location measurements of the UL positioning signals transmitted by the UE 102.

At stage 14, the NG-RAN 112 gNB nodes transfer the UL location measurements obtained at stage 13 to the LMF 152 using a Non-UE 102 Associated Network Assistance Data Procedure in 3GPP TS 23.273 clause 6.11.3 or as shown at stage 17 in FIG. 4A. If UL positioning was indicated to the UE 102 at stage 1, the LMF 152 and UE 102 skip stages 15 to 21 and proceed to stage 22. If UL+DL positioning was indicated to the UE 102 at stage 1, the LMF 152 and UE 102 continue with stages 15 to 21.

At stage 15, the UE 102 sends an RRC Resume Request with small data transmission to the serving gNB 110. The RRC Resume Request includes an RRC UL Information Transfer message containing an UL NAS TRANSPORT message that includes a supplementary services event report message. The event report message may indicate that this is a second event report associated with the first event report sent at stage 5 and includes an LPP positioning message (e.g. an LPP Provide Location Information message) that includes the DL location measurements obtained at stage 13. For example, the event report message may include an event type parameter that indicates this is a second event report associated with a previous event report already sent to the LMF 152 (at stages 5-7). The event report message may also or instead include an identifier (e.g. a numeric identifier) in the event report message that is the same as the identifier included in the first event report sent at stage 5. The UL NAS TRANSPORT message also includes the deferred routing identifier received in either stage 14 of FIG. 3 (or step 16 in 3GPP TS 23.273 clause 6.3.1) or stage 11 in this procedure if there was a change of LMF 152.

At stage 16, the serving gNB 110 forwards the UL NAS TRANSPORT message to the serving AMF 154 in an N2 Uplink NAS Transport message. If the serving gNB 110 is not the anchor gNB 110-A for the UE 102, the UL NAS TRANSPORT message may be forwarded to the serving AMF 154 via the anchor gNB 110-A.

At stage 17, the AMF 154 checks the integrity of the NAS message and deciphers its contents. The AMF 154 then invokes an Namf_Communication_N1MessageNotify service operation to forward the event report to the serving LMF 152.

At stage 18, the LMF 152 invokes an Namf_Communication_N1N2MessageTransfer operation to return an acknowledgment for the event report. The LMF 152 may use the indication of a second event report associated with the first event report received at stage 7 to treat the event report received from the AMF 154 at stage 17 as a continuation of the first event report and not as a separate unassociated event report. The LMF 152 may also or instead use an identifier in the second event report that is the same as an identifier received in the first event report at stage 7 to treat the event report received at stage 17 as a continuation of the first event report and not as a separate unassociated event report. For example, the LMF 152 does not treat the second event report received at stage 17 the same as the first event report received at stage 7.

At stage 19, the AMF 154 forwards the acknowledgment to the serving gNB 110 in a DL NAS TRANSPORT message which is encapsulated in an N2 Downlink NAS Transport message. If the serving gNB 110 is not the anchor gNB 110-A for the UE 102, the DL NAS TRANSPORT message may be forwarded to the serving gNB 110 via the anchor gNB 110-A.

At stage 20, the serving gNB 110 sends a Subsequent DL SDT message to the UE 102 and includes the NAS message received in stage 19.

At stage 21, the serving gNB 110 sends an RRC Release message to the UE 102 to keep the UE 102 in RRC INACTIVE state.

At stage 22, and following one of stage 21 when UL+DL positioning was indicated at stage 1, stage 14 when UL positioning was indicated at stage 1, or stage 12 when DL positioning was indicated at stage 1, the UE 102 remains in RRC INACTIVE state.

At stage 23, if a location estimate is needed for event reporting, the LMF 152 determines the UE 102 location using one of the following: for DL positioning, the LMF 152 uses the DL location measurements or location estimate received at stage 7 or the cell ID provided by the AMF 154 at stage 7; for UL positioning, the LMF 152 uses the UL location measurements received at stage 14; and for UL+DL positioning, the LMF 152 uses the UL location measurements received at stage 14 and the DL location measurements received at stage 17. The LMF 152 may not attempt to obtain additional location measurements from the UE 102 or from the NG-RAN 112, e.g. since this might otherwise cause the UE 102 to enter an RRC CONNECTED state, which would increase UE 102 power consumption.

At stage 24, steps 28-31 for 3GPP TS 23.273 clause 6.3.1 are performed to send an event report from the LMF 152 to the LCS Client 130 or AF 132 including any location obtained at stage 23 and to monitor for the next periodic or triggered event at the UE 102.

Figure 4C:
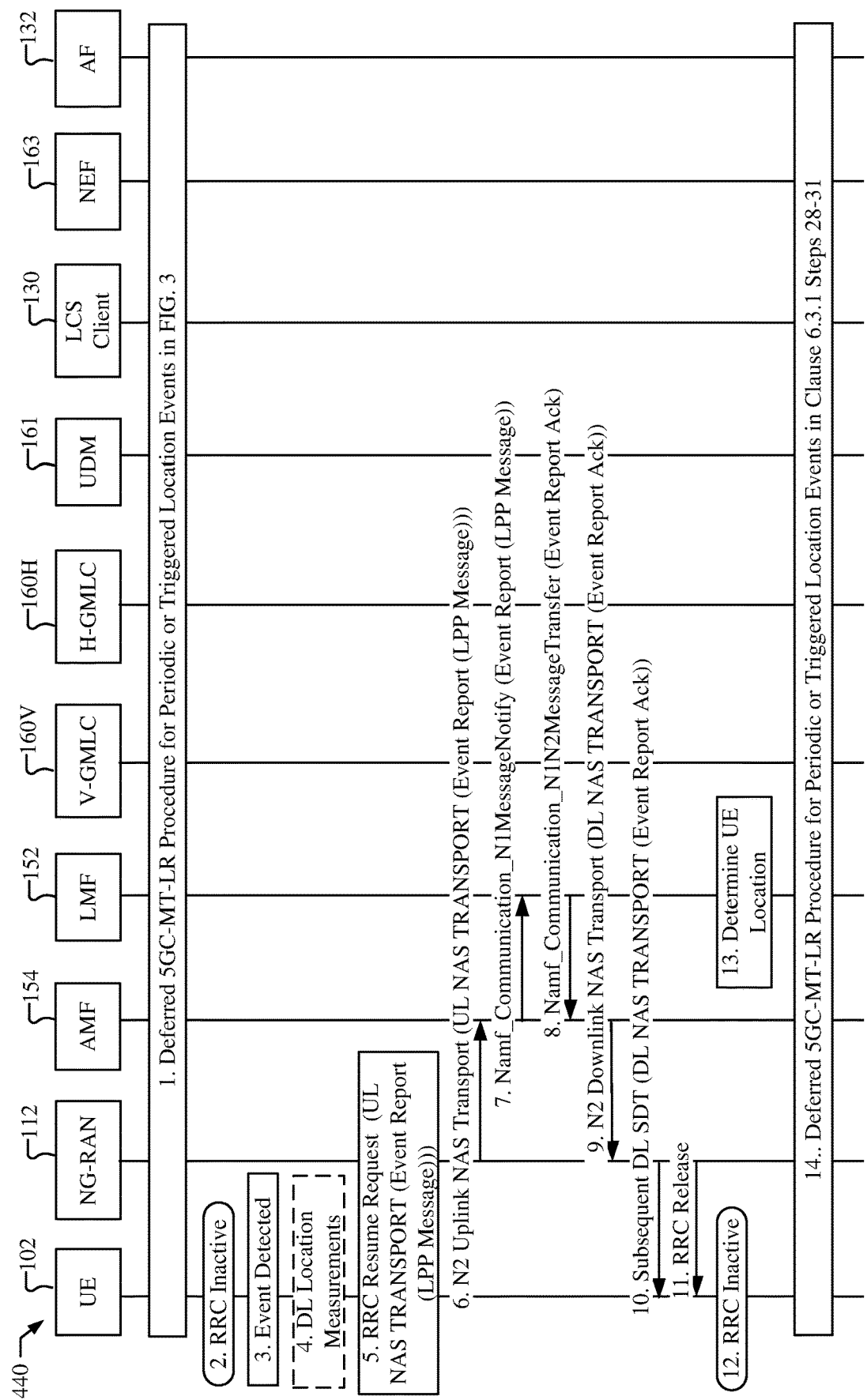
FIG. 4C shows a signaling flow that illustrates various messages sent between components of a communication system for initiation and reporting of location events for a deferred MT-LR procedure for periodic or triggered location events while a UE is in an RRC Inactive state and when downlink positioning or no positioning is used for event reporting.

FIG. 4C illustrates the initiation and reporting of location events for a deferred 5GC-MT-LR procedure for Periodic or Triggered Location Events when a UE 102 is in RRC INACTIVE state and when DL positioning or no positioning is used for event reporting. This procedure may be applicable to a UE 102 with NR access to 5GC. FIG. 4C illustrates a similar procedure to FIG. 4A and FIG. 4B but limited to DL positioning or no positioning of UE 102. The serving gNB 110-S and anchor gNB 110-A for UE 102 are not shown in FIG. 4C but may still be present in NG-RAN 112 and then behave as described in FIG. 4A in terms of supporting signaling between UE 102 and AMF 154 and LMF 152.

At stage 1 in FIG. 4C, a deferred 5GC-MT-LR procedure for periodic or triggered location events, such as illustrated in FIG. 3, or as specified in 3GPP TS 23.273, is performed with the following differences.

At stage 14 in FIG. 3, or as specified in step 16 of 3GPP TS 23.273, clause 6.3.1, the LMF 152 indicates to the UE 102 that DL positioning or no positioning will be used for subsequent location reporting events when the UE 102 is in RRC INACTIVE state. If DL positioning will be used, the LMF 152 includes an LPP positioning message (e.g. an LPP Request Location Information message) in the LCS Periodic-Triggered Invoke Request sent to the UE 102 at stage 14 in FIG. 3, where the LPP positioning message requests DL location measurements or a location estimate based on DL location measurements. If no location of the UE 102 is needed for event reporting or if a location based on a Cell ID will suffice for the location QoS, the LMF 152 does not include an LPP positioning message in the LCS Periodic-Triggered Invoke Request sent to the UE 102 at stage 14 in FIG. 3. A deferred routing identifier indicating a default LMF 152 may not be included in the LCS Periodic-Triggered Location Invoke sent at stage 14 in FIG. 3 (or in step 16 of 3GPP TS 23.273 clause 6.3.1) because for event reporting at stages 5-11 below, the LMF 152 needs to know which type of positioning was indicated at stage 1 in order to correctly support these subsequent stages. However, a default LMF 152 would not normally know which type of positioning had been indicated at stage 1.

At stage 2 in FIG. 4C, the UE 102 enters RRC INACTIVE state some time before an event is detected, e.g. as described for stage 2 in FIG. 4B. If the UE 102 is not in RRC INACTIVE state when an event is detected, then the UE 102 may follow the procedure described for steps 22-31 in 3GPP TS 23.273 clause 6.3.1 to report the event to the LMF 152 and to the LCS Client 130 or AF 132. The LMF 152 may not be aware of whether the UE 102 is in RRC INACTIVE state. This allows the LMF 152 to follow the procedure described here for FIG. 4C or the procedure described in 3GPP TS 23.273 clause 6.3.1 for event reporting. With the procedure described here for FIG. 4C, a UE 102 that was initially in RRC INACTIVE state can remain in RRC INACTIVE state after the procedure is complete. With the procedure in 3GPP TS 23.273 clause 6.3.1, a UE 102 that was initially in RRC INACTIVE state could be moved into RRC CONNECTED state during the procedure in 3GPP TS 23.273 clause 6.3.1.

At stage 3, the UE 102 monitors for and detects a trigger event as requested during stage 1.

At stage 4, if DL positioning was indicated at stage 1, the UE 102 obtains the DL location measurements or location estimate requested in the LPP message received in stage 1. If DL positioning was not indicated at stage 1, stage 4 is skipped.

At stage 5, the UE 102 sends an RRC Resume Request with small data transmission (SDT) to a serving gNB 110 in the NG-RAN 112. The RRC Resume Request includes an RRC UL Information Transfer message containing an UL NAS TRANSPORT message that includes a supplementary services event report message. If DL positioning was indicated at stage 1, the UE 102 includes an LPP positioning message (e.g. an LPP Provide Location Information message) in the supplementary services event report message that includes the DL location measurements or location estimate obtained at stage 4. If DL positioning was not indicated at stage 1, the UE 102 does not include an LPP positioning message in the supplementary services event report message. The event report message may also include other information as described in TS 23.273 step 25 in clause 6.3.1 (e.g. the type of event being reported). The UL NAS TRANSPORT message also includes the deferred routing identifier received in stage 14 in FIG. 3.

At stage 6, the serving gNB 110 forwards the UL NAS TRANSPORT message to the serving AMF 154 in an N2 Uplink NAS Transport message. If the serving gNB 110 is not the anchor gNB 110-A for the UE 102, the UL NAS TRANSPORT message may be forwarded to the serving AMF 154 via the anchor gNB 110-A.

At stage 7, the AMF 154 checks the integrity of the NAS message and deciphers its contents. The AMF 154 then invokes an Namf_Communication_N1MessageNotify service operation to forward the event report to the serving LMF 152.

At stage 8, the LMF 152 invokes an Namf_Communication_N1N2MessageTransfer operation to return an acknowledgment for the event report. If there is a change of LMF 152, the acknowledgment may include a deferred routing identifier for the new LMF 152.

At stage 9, the AMF 154 forwards the acknowledgment to the serving gNB 110 in a DL NAS TRANSPORT message which is encapsulated in an N2 Downlink NAS Transport message. If the serving gNB 110 is not the anchor gNB 110-A for the UE 102, the DL NAS TRANSPORT message may be forwarded to the serving gNB 110 via the anchor gNB 110-A.

At stage 10, the serving gNB 110 sends a Subsequent DL SDT message to the UE 102 and includes the NAS message received at stage 9.

At stage 11, the serving gNB 110 sends an RRC Release message to the UE 102 to keep the UE 102 in RRC INACTIVE state.

At stage 12, following stage 11, the UE 102 remains in RRC INACTIVE state.

At stage 13, if a location estimate is needed for event reporting, the LMF 152 determines the UE 102 location using the DL location measurements or location estimate received at stage 7 or a Cell ID provided by the AMF 154 at stage 7. The LMF 152 may not attempt to obtain additional location measurements from the UE 102 or from the NG-RAN 112, e.g. since this might otherwise cause the UE 102 to enter an RRC CONNECTED state, which would increase UE 102 power consumption.

At stage 14, steps 28-31 for clause 6.3.1 are performed to send an event report from the LMF 152 to the LCS Client 130 or AF 132 including any location obtained at stage 13 and to monitor for the next periodic or triggered event at the UE 102.

Figure 4D:
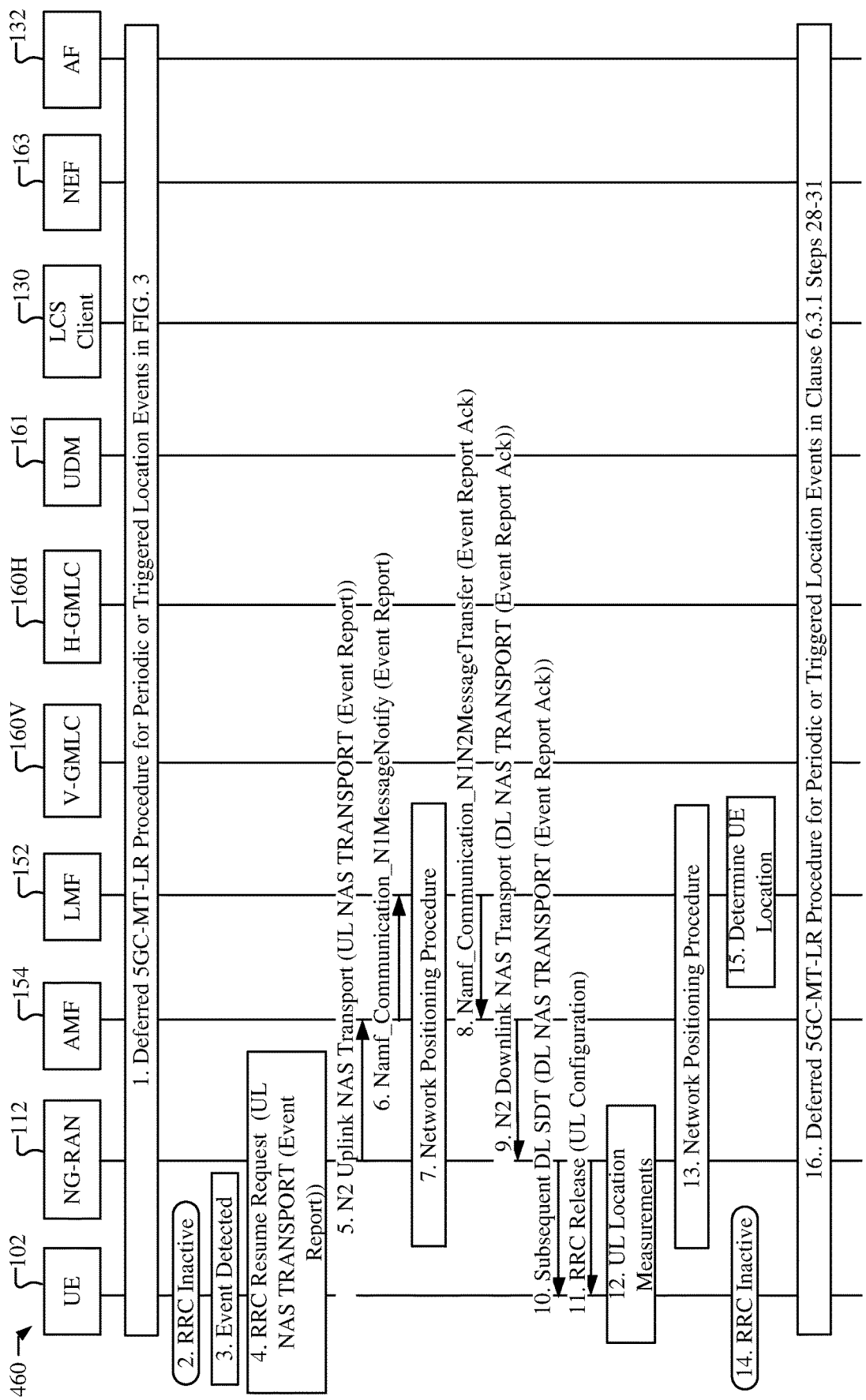
FIG. 4D shows a signaling flow that illustrates various messages sent between components of a communication system for initiation and reporting of location events for a deferred MT-LR procedure for periodic or triggered location events while a UE is in an RRC Inactive state and when UL positioning is used for event reporting.

FIG. 4D illustrates the initiation and reporting of location events for a deferred 5GC-MT-LR procedure for Periodic or Triggered Location Events when a UE 102 is in RRC INACTIVE state and when UL positioning is used for event reporting. This procedure may be applicable to a UE 102 with NR access to 5GC. FIG. 4D illustrates a similar procedure to FIG. 4A and FIG. 4B but limited to UL positioning of UE 102. The serving gNB 110-S and anchor gNB 110-A for UE 102 are not shown in FIG. 4D but may still be present in NG-RAN 112 and then behave as described in FIG. 4A in terms of supporting signaling between UE 102 and AMF 154 and LMF 152.

At stage 1 in FIG. 4D, a deferred 5GC-MT-LR procedure for periodic or triggered location events, such as illustrated in FIG. 3, or as specified in 3GPP TS 23.273, is performed with the following differences.

At stage 14 in FIG. 3, or as specified in step 16 of 3GPP TS 23.273 clause 6.3.1, the LMF 152 indicates to the UE 102 that UL positioning may be used for subsequent location reporting events when the UE 102 is in RRC INACTIVE state, for example, by not including an LPP positioning message in the LCS Periodic-Triggered Invoke Request sent to the UE 102 at stage 14. A deferred routing identifier indicating a default LMF 152 may not be included in the LCS Periodic-Triggered Location Invoke sent at stage 14 in FIG. 3 (or step 16 in 3GPP TS 23.273 clause 6.3.1) because for event reporting at stages 4-11 below, the LMF 152 needs to know which type of positioning was indicated at stage 1 in order to correctly support these subsequent stages. However, a default LMF 152 may not normally know which type of positioning had been indicated at stage 1.

At stage 2 in FIG. 4D, the UE 102 enters RRC INACTIVE state some time before an event is detected, e.g. as described for stage 2 in FIG. 4B. If the UE 102 is not in RRC INACTIVE state when an event is detected, then the UE 102 may follow the procedure described for steps 22-31 in 3GPP TS 23.273 clause 6.3.1 to report the event to the LMF 152 and to the LCS Client 130 or AF 132. The LMF 152 may not be aware of whether the UE 102 is in RRC INACTIVE state. This allows the LMF 152 to follow the procedure described here for FIG. 4D or the procedure described in 3GPP TS 23.273 clause 6.3.1 for event reporting. With the procedure described here for FIG. 4D, a UE 102 that was initially in RRC INACTIVE state can remain in RRC INACTIVE state after the procedure is complete. With the procedure in 3GPP TS 23.273 clause 6.3.1, a UE that was initially in RRC INACTIVE state could be moved into RRC CONNECTED state during the procedure in 3GPP TS 23.273 clause 6.3.1.

At stage 3 in FIG. 4D, the UE 102 monitors for and detects a trigger event as requested during stage 1.

At stage 4, the UE 102 sends an RRC Resume Request with small data transmission (SDT) to a serving gNB 110 in the NG-RAN 112. The RRC Resume Request includes an RRC UL Information Transfer message containing an UL NAS TRANSPORT message that includes a supplementary services event report message. The UE 102 may not include an LPP positioning message in the supplementary services event report message. The event report message may include other information as described in TS 23.273 step 25 in clause 6.3.1 (e.g. the type of event being reported). The UL NAS TRANSPORT message also includes the deferred routing identifier received at stage 14 in FIG. 3.

At stage 5, the serving gNB 110 forwards the UL NAS TRANSPORT message to the serving AMF 154 in an N2 Uplink NAS Transport message. If the serving gNB 110 is not the anchor gNB 110-A for the UE 102, the UL NAS TRANSPORT message may be forwarded to the serving AMF 154 via the anchor gNB 110-A.

At stage 6, the AMF 154 checks the integrity of the NAS message and deciphers its contents. The AMF 154 then invokes an Namf_Communication_N1MessageNotify service operation to forward the event report to the serving LMF 152.

At stage 7, the LMF 152 uses a Network Assisted Positioning Procedure as described in stages 5, 6a, 7, 8, 10 in FIG. 4A or as described in 3GPP TS 23.273 clause 6.11.2 to request the serving gNB 110 to provide an UL configuration (e.g. an UL SRS or UL PRS configuration) to the UE 102 at stage 11. The serving gNB 110 then determines an UL configuration (e.g. an UL SRS or UL PRS configuration as at stage 6a in FIG. 4A) and provides details of the determined UL Configuration back to the LMF 152 (e.g., as at stage 7 in FIG. 4A). The LMF 152 also uses a Non-UE Associated Network Assistance Data procedure to request UL location measurements of the UE 102 by NG-RAN 112 gNB 110 nodes (e.g., at stage 11 in FIG. 4A). Because the UE 102 is in RRC INACTIVE state and thus in CM CONNECTED state, AMF 154 would not perform a Network Triggered Service Request to support UL positioning. This avoids a transition of the UE 102 into RRC CONNECTED state.

At stage 8, the LMF 152 invokes an Namf_Communication_N1N2MessageTransfer operation to return an acknowledgment for the event report. If there is a change of LMF 152, the acknowledgment may include a deferred routing identifier for the new LMF 152.

At stage 9, the AMF 154 forwards the acknowledgment to the serving gNB 110 in a DL NAS TRANSPORT message which is encapsulated in an N2 Downlink NAS Transport message. If the serving gNB 110 is not the anchor gNB 110-A for the UE 102, the DL NAS TRANSPORT message may be forwarded to the serving gNB 110 via the anchor gNB 110-A.

At stage 10, the receiving gNB node sends a Subsequent DL SDT message to the UE 102 and includes the NAS message received at stage 9.

At stage 11, the serving gNB 110 sends an RRC Release message to the UE 102 to keep the UE 102 in RRC INACTIVE state and includes the UL Configuration requested by the LMF 152 at stage 7 and/or determined by the serving gNB 110 at stage 7 to support UL positioning. In some implementations (e.g., in the case of semi-persistent UL-PRS), stage 6b and/or stage 9 of FIG. 4A may also be performed by the serving gNB 110 prior to stages 10 and 11.

At stage 12, the UE 102 transmits UL positioning signals according to the UL Configuration received at stage 11. The NG-RAN 112 gNB 110 nodes that were requested to obtain UL location measurements at stage 7 obtain the UL location measurements of the UL positioning signals transmitted by the UE 102.

At stage 13, the NG-RAN 112 gNB 110 nodes transfer the UL location measurements obtained at stage 12 to the LMF 152 using a Non-UE 102 Associated Network Assistance Data Procedure in 3GPP TS 23.273 clause 6.11.3 or as shown at stage 17 in FIG. 4A.

At stage 14, following stage 13, the UE 102 remains in RRC INACTIVE state.

At stage 15, the LMF 152 determines the UE 102 location using the UL location measurements received at stage 13. The LMF 152 may not attempt to obtain additional location measurements from the UE 102 or from the NG-RAN 112, e.g. since this might otherwise cause the UE 102 to enter an RRC CONNECTED state, which would increase UE 102 power consumption.

At stage 16, steps 28-31 for clause 6.3.1 are performed to send the event report from the LMF 152 to the LCS Client 130 or AF 132 including any location obtained at stage 15 and to monitor for the next periodic or triggered event at the UE 102.

Figures 1, 4E:
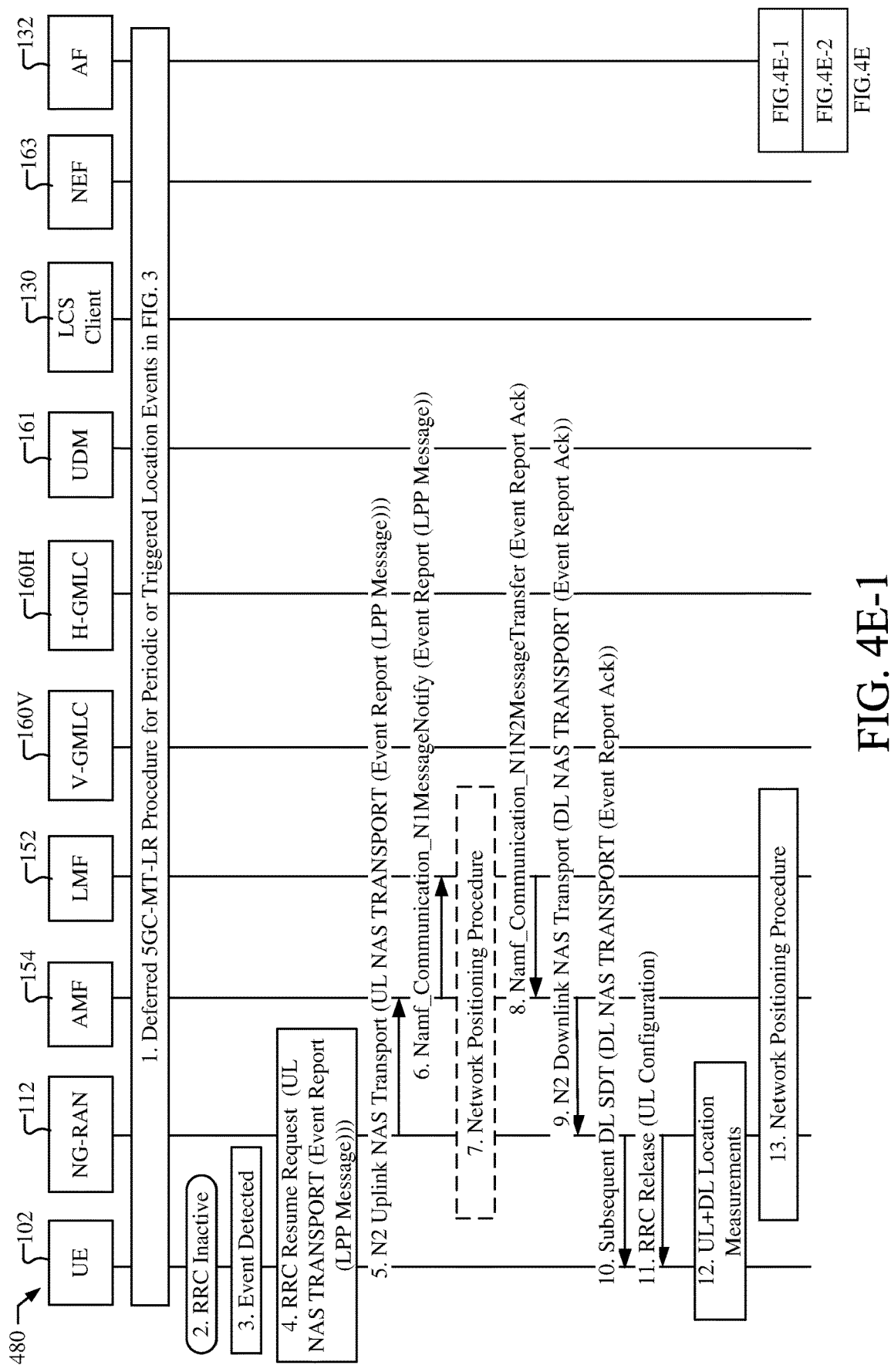
FIG. 4E, which includes
Figures 2, 4E:
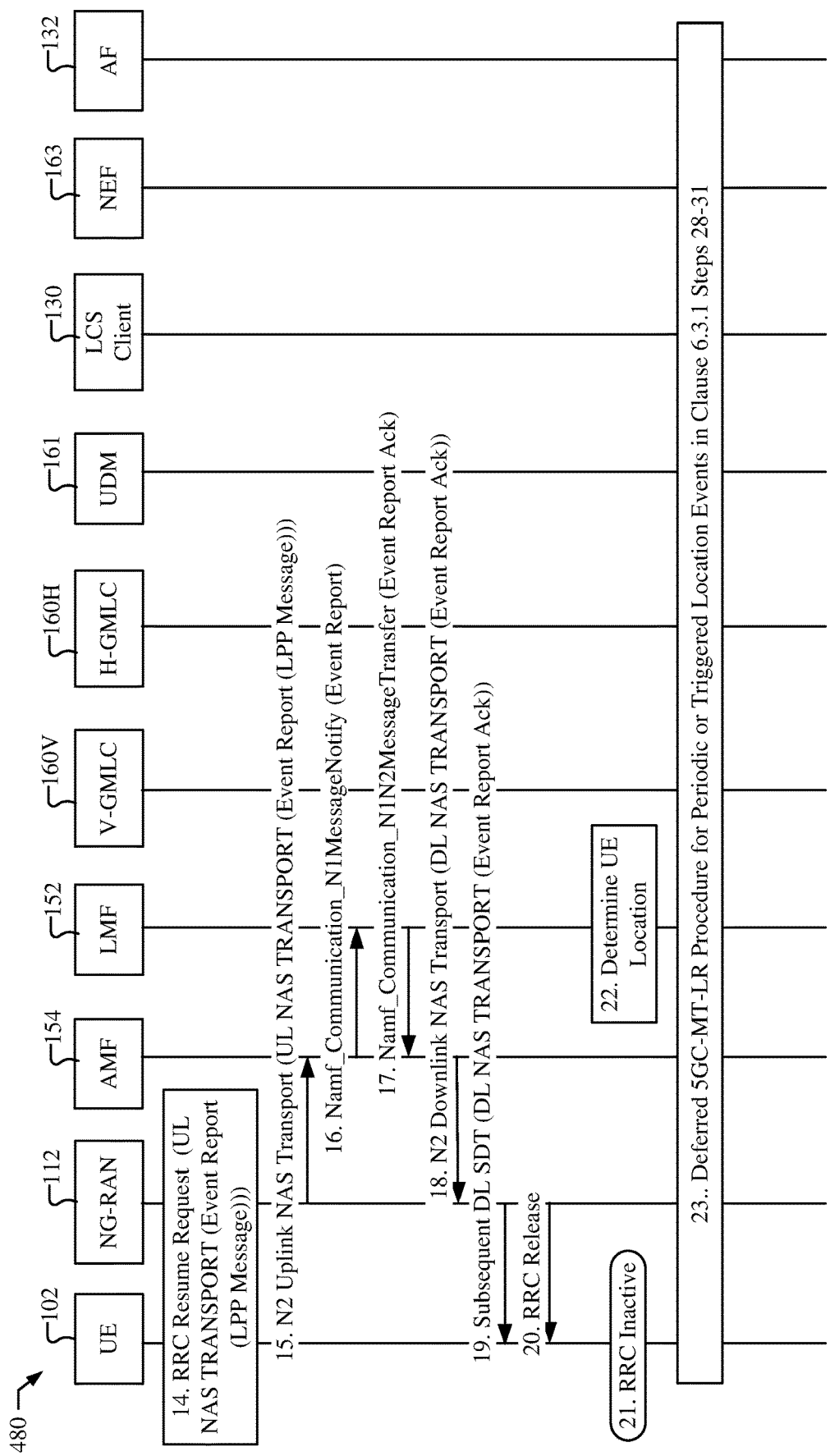

FIG. 4E, including FIG. 4E-1 and FIG. 4E-2, illustrates the initiation and reporting of location events for a deferred 5GC-MT-LR procedure for Periodic or Triggered Location Events when a UE 102 is in RRC INACTIVE state and when UL+DL positioning is used for event reporting. This procedure may be applicable to a UE 102 with NR access to 5GC. FIG. 4E illustrates a similar procedure to FIG. 4A and FIG. 4B but limited to UL+DL positioning of UE 102. The serving gNB 110-S and anchor gNB 110-A for UE 102 are not shown in FIG. 4E but may still be present in NG-RAN 112 and then behave as described in FIG. 4A in terms of supporting signaling between UE 102 and AMF 154 and LMF 152.

At stage 1 in FIG. 4E, a deferred 5GC-MT-LR procedure for periodic or triggered location events, such as illustrated in FIG. 3, or as specified in 3GPP TS 23.273 in clause 6.3.1, are performed with the following differences.

At stage 14 in FIG. 3, or as specified in step 16 in 3GPP TS 23.273 clause 6.3.1, the LMF 152 indicates to the UE 102 that UL+DL positioning will be used for subsequent location reporting events when the UE 102 is in RRC INACTIVE state by including an LPP positioning message (e.g. an LPP Request Location Information message) in the LCS Periodic-Triggered Invoke Request sent to the UE 102 at stage 14 in FIG. 3, where the LPP positioning message identifies an UL+DL positioning method and requests DL location measurements for this positioning method. The LMF 152 also includes a deferred routing identifier in the LCS Periodic-Triggered Location Invoke which is an identification of the LMF 152. A deferred routing identifier indicating a default LMF 152 may not be included in the LCS Periodic-Triggered Location Invoke sent at stage 14 of FIG. 3 (or step 16 in 3GPP TS 23.273 clause 6.3.1) because for event reporting at stages 4-20 below, the LMF 152 needs to know which type of positioning was indicated at stage 1 in order to correctly support these subsequent stages. However, a default LMF 152 may not normally know which type of positioning had been indicated at stage 1.

At stage 2, the UE 102 enters RRC INACTIVE state some time before an event is detected. e.g. as described for stage 2 in FIG. 4B. If the UE 102 is not in RRC INACTIVE state when an event is detected at step 3, then the UE 102 may follow the procedure described for steps 22-31 in 3GPP TS 23.273 clause 6.3.1 to report the event to the LMF 152 and to the LCS Client 130 or AF 132. The LMF 152 may not be aware of whether the UE 102 is in RRC INACTIVE state. This allows the LMF 152 to follow the procedure described here for FIG. 4E or the procedure described in clause 6.3.1 for event reporting. With the procedure described here for FIG. 4E, a UE 102 that was initially in RRC INACTIVE state can remain in RRC INACTIVE state after the procedure is complete. With the procedure in 3GPP TS 23.273 clause 6.3.1, a UE that was initially in RRC INACTIVE state could be moved into RRC CONNECTED state during the procedure in 3GPP TS 23.273 clause 6.3.1.

At stage 3, the UE 102 monitors for and detects a trigger event as requested during stage 1.

At stage 4, the UE 102 sends an RRC Resume Request with small data transmission (SDT) to a serving gNB 110 in the NG-RAN 112. The RRC Resume Request includes an RRC UL Information Transfer message containing an UL NAS TRANSPORT message that includes a supplementary services event report message. The UE 102 includes an LPP positioning message (e.g. an LPP Request Assistance Data message) in the supplementary services event report message that includes a request for an UL Configuration to support the UL+DL positioning method indicated to the UE 102 at stage 1. The event report message may also include other information as described in 3GPP TS 23.273 step 25 in clause 6.3.1 (e.g. the type of event being reported). The event report message may further include an identifier (e.g. a numeric identifier) which may identify the event report message. The UL NAS TRANSPORT message also includes the deferred routing identifier received in stage 14 in FIG. 3.

At stage 5, the serving gNB 110 forwards the UL NAS TRANSPORT message to the serving AMF 154 in an N2 Uplink NAS Transport message. If the serving gNB 110 is not the anchor gNB 110-A for the UE 102, the UL NAS TRANSPORT message may be forwarded to the serving AMF 154 via the anchor gNB 110A.

At stage 6, the AMF 154 checks the integrity of the NAS message and deciphers its contents. The AMF 154 then invokes an Namf_Communication_N1MessageNotify service operation to forward the event report to the serving LMF 152.

At stage 7, the LMF 152 uses the Network Assisted Positioning Procedure as described in stages 5, 6a, 7, 8, 10 in FIG. 4A or as described in 3GPP TS 23.273 clause 6.11.2 to request the serving gNB 110 to provide an UL configuration (e.g. an UL SRS or UL PRS configuration) to the UE 102 at stage 11. The serving gNB 110 then determines an UL configuration (e.g. an UL SRS or UL PRS configuration as at stage 6a in FIG. 4A) and provides details of the determined UL Configuration back to the LMF 152 (e.g., as at stage 7 in FIG. 4A). The LMF 152 also uses a Non-UE 102 Associated Network Assistance Data procedure to request UL location measurements of the UE 102 by NG-RAN 112 gNB 110 nodes (e.g., as at stage 11 in FIG. 4A). Because the UE 102 is in RRC INACTIVE state and thus in CM CONNECTED state, the AMF 154 would not perform a Network Triggered Service Request to support UL+DL positioning. This avoids a transition of the UE 102 into RRC CONNECTED state.

At stage 8, the LMF 152 invokes an Namf_Communication_N1N2MessageTransfer operation to return an acknowledgment for the event report. If there is a change of LMF 152, the acknowledgment may include a deferred routing identifier for the new LMF 152.

At stage 9, the AMF 154 forwards the acknowledgment to the serving gNB 110 in a DL NAS TRANSPORT message which is encapsulated in an N2 Downlink NAS Transport message. If the serving gNB 110 is not the anchor gNB 110-A for the UE 102, the DL NAS TRANSPORT message may be forwarded to the serving gNB 110 via the anchor gNB 110-A.

At stage 10, the serving gNB 110 sends a Subsequent DL SDT message to the UE 102 and includes the NAS message received at stage 9.

At stage 11, the serving gNB 110 sends an RRC Release message to the UE 102 to keep the UE 102 in RRC INACTIVE state and includes any UL Configuration requested by the LMF 152 at stage 7 and/or determined by the serving gNB 110 at stage 7 to support UL+DL positioning. In some implementations (e.g., in the case of semi-persistent UL-PRS), stage 6b and/or stage 9 of FIG. 4A may also be performed by the serving gNB 110 prior to stages 10 and 11.

At stage 12, the UE 102 transmits UL positioning signals according to the UL Configuration received at stage 11. The UE 102 also obtains DL location measurements as requested at stage 1. The NG-RAN 112 gNB 110 nodes that were requested to obtain UL location measurements at stage 7 obtain the UL location measurements of the UL positioning signals transmitted by the UE 102.

At stage 13, the NG-RAN 112 gNB 110 nodes transfer the UL location measurements obtained at stage 12 to the LMF 152 using a Non-UE 102 Associated Network Assistance Data Procedure in 3GPP TS 23.273 clause 6.11.3 or as shown at stage 17 in FIG. 4A.

At stage 14, the UE 102 sends an RRC Resume Request with small data transmission to the serving gNB 110. The RRC Resume Request includes an RRC UL Information Transfer message containing an UL NAS TRANSPORT message that includes a supplementary services event report message. The event report message may indicate that this is a second event report associated with the first event report sent at stage 4 and includes an LPP positioning message (e.g. an LPP Provide Location Information message) that includes the DL location measurements obtained at stage 12. For example, the event report message may include an event type parameter that indicates this is a second event report associated with a previous event report already sent to the LMF 152 (at stages 4-6). The event report message may also or instead include an identifier (e.g. a numeric identifier) in the event report message that is the same as the identifier included in the first event report sent at stage 4. The UL NAS TRANSPORT message also includes the deferred routing identifier received at either stage 14 of FIG. 3 (or step 16 in 3GPP TS 23.273 clause 6.3.1) or stage 10 in this procedure if there was a change of LMF 152.

At stage 15, the serving gNB 110 forwards the UL NAS TRANSPORT message to the serving AMF 154 in an N2 Uplink NAS Transport message. If the serving gNB 110 is not the anchor gNB 110-A for the UE 102, the UL NAS TRANSPORT message may be forwarded to the serving AMF 154 via the anchor gNB 110-A.

At stage 16, the AMF 154 checks the integrity of the NAS message and deciphers its contents. The AMF 154 then invokes an Namf_Communication_N1MessageNotify service operation to forward the event report to the serving LMF 152.

At stage 17, the LMF 152 invokes an Namf_Communication_N1N2MessageTransfer operation to return an acknowledgment for the event report. The LMF 152 may use the indication of a second event report associated with the first event report received at stage 6 to treat the event report received from the AMF 154 at stage 16 as a continuation of the first event report and not as a separate unassociated event report. The LMF 152 may also or instead use an identifier in the second event report that is the same as an identifier received in the first event report at stage 6 to treat the event report received at stage 16 as a continuation of the first event report and not as a separate unassociated event report. For example, the LMF 152 does not treat the second event report received at stage 16 the same as the first event report received at stage 6.

At stage 18, the AMF 154 forwards the acknowledgment to the serving gNB 110 in a DL NAS TRANSPORT message which is encapsulated in an N2 Downlink NAS Transport message. If the serving gNB 110 is not the anchor gNB 110-A for the UE 102, the DL NAS TRANSPORT message may be forwarded to the serving gNB 110 via the anchor gNB 110-A.

At stage 19, the serving gNB 110 sends a Subsequent DL SDT message to the UE 102 and includes the NAS message received at stage 18.

At stage 20, the serving gNB 110 sends an RRC Release message to the UE 102 to keep the UE 102 in RRC INACTIVE state.

At stage 21, following stage 20, the UE 102 remains in RRC INACTIVE state.

At stage 22, the LMF 152 determines the UE 102 location using the UL location measurements received at stage 13 and the DL location measurements received at stage 16. The LMF 152 may not attempt to obtain additional location measurements from the UE 102 or from the NG-RAN 112, e.g. since this might otherwise cause the UE 102 to enter an RRC CONNECTED state, which would increase UE 102 power consumption.

At stage 23, steps 28-31 for clause 6.3.1 are performed to send the event report from the LMF 152 to the LCS Client 130 or AF 132 including any location obtained at stage 22 and to monitor for the next periodic or triggered event at the UE 102.

Figure 5:
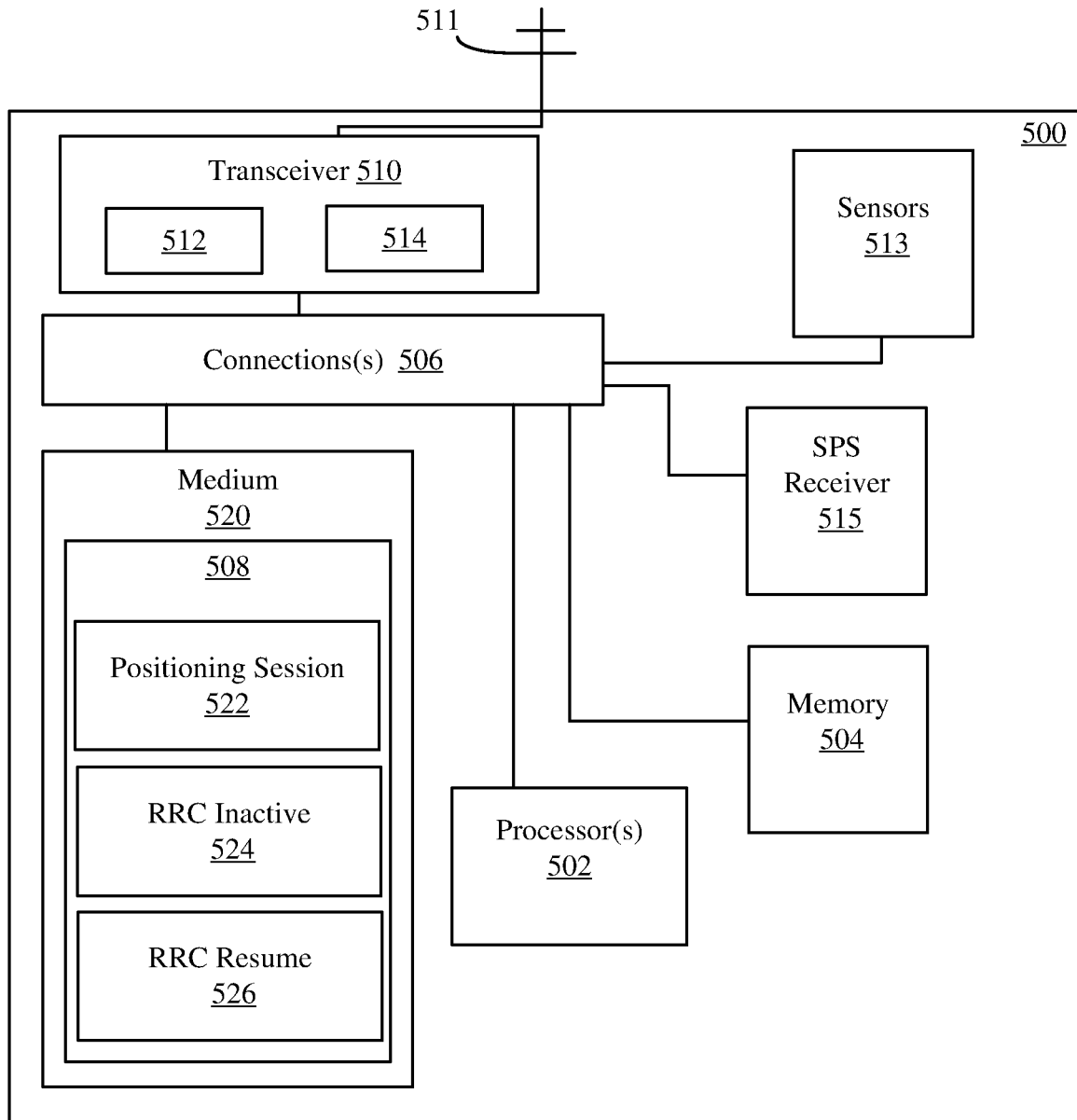
FIG. 5 shows a schematic block diagram illustrating certain exemplary features of a UE configured for event reporting for a deferred MT-LR while in an RRC Inactive state.

FIG. 5 shows a schematic block diagram illustrating certain exemplary features of a UE 500, e.g., which may be the UE 102 shown in FIG. 1, that is configured for supporting location of the UE 500 while in an RRC Inactive state, e.g., as discussed herein. The UE 500, for example, may perform the signaling flows of FIG. 4A, 4B, 4C, 4D, and/or 4E, the process flow shown in FIG. 8, and accompanying algorithms disclosed herein. The UE 500 may, for example, include one or more processors 502, memory 504, an external interface such as at least one wireless transceiver 510 (e.g., wireless network interface), SPS receiver 515, and one or more sensors 513, which may be operatively coupled with one or more connections 506 (e.g., buses, lines, fibers, links, etc.) to non-transitory computer readable medium 520 and memory 504. The SPS receiver 515, for example, may receive and process SPS signals from SVs 190 shown in FIG. 1. The one or more sensors 513, for example, may be an inertial measurement unit (IMU) that may include one or more accelerometers, one or more gyroscopes, a magnetometer, etc. The UE 500 may further include additional items, which are not shown, such as a user interface that may include e.g., a display, a keypad or other input device, such as virtual keypad on the display, through which a user may interface with the UE. In certain example implementations, all or part of UE 500 may take the form of a chipset, and/or the like.

The at least one wireless transceiver 510 may be a transceiver for both a WWAN communication system and a WLAN communication system, or may include separate transceivers for WWAN and WLAN. The wireless transceiver 510 may include a transmitter 512 and receiver 514 coupled to one or more antennas 511 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. Thus, the transmitter 512 may include multiple transmitters that may be discrete components or combined/integrated components, and/or the receiver 514 may include multiple receivers that may be discrete components or combined/ integrated components. The wireless transceiver 510 may be configured to communicate signals (e.g., with base stations and access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wireless transceiver 510 may be communicatively coupled to a transceiver interface, e.g., by optical and/or electrical connection, which may be at least partially integrated with the wireless transceiver 510.

In some embodiments, UE 500 may include antenna 511, which may be internal or external. UE antenna 511 may be used to transmit and/or receive signals processed by wireless transceiver 510. In some embodiments, UE antenna 511 may be coupled to wireless transceiver 510. In some embodiments, measurements of signals received (transmitted) by UE 500 may be performed at the point of connection of the UE antenna 511 and wireless transceiver 510. For example, the measurement point of reference for received (transmitted) RF signal measurements may be an input (output) terminal of the receiver 514 (transmitter 512) and an output (input) terminal of the UE antenna 511. In a UE 500 with multiple UE antennas 511 or antenna arrays, the antenna connector may be viewed as a virtual point representing the aggregate output (input) of multiple UE antennas. In some embodiments, UE 500 may measure received signals including signal strength and TOA measurements and the raw measurements may be processed by the one or more processors 502.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include positioning session module 522 that when implemented by the one or more processors 502 configures the one or more processors 502 to engage in a positioning session with a location server through a serving base station, via the wireless transceiver 510, including receiving location service requests, including periodic or triggered location, receiving a request for positioning capabilities, and a request of location information, such as positioning measurements, e.g., for a UE-assisted positioning process, or a position estimate, e.g., for a UE based positioning process. The one or more processors 502 are configured to send a response to the location service requests, e.g. by providing positioning capabilities and the requested location information. The one or more processors 502 may be configured to monitor for events, e.g., periodic or triggered events. The one or more processors 502 may be configured to generate and send an event report in an SDT, with an RRC Resume request, which may include a request for assistance data (e.g., for UL PRS configuration), e.g., as discussed at stage 3 of FIG. 4A. The one or more processors 502 may be further configured to receive assistance data and other information, e.g., for receiving and measuring DL PRS and for transmitting UL PRS. For example, the one or more processors 502 may be configured to receive one or more UL PRS configurations, which may be provided in a subsequent DL SDT or in an RRC message, such as an RRC Release message, such as described in stages 6b or stage 13 FIG. 4A. The one or more processors 502 may be configured to receive a MAC-CE UL PRS activation, e.g., at a MAC-CE level or in a RRC message, such as the RRC Release message, such as described in stages 9 and 13 of FIG. 4A. The one or more processors 502 may be configured to perform the positioning related procedures, such as transmitting UL PRS, and/or receiving and measuring DL PRS, for positioning measurements such as, e.g., Rx-Tx, AOA, AOD, TOA, RSRP, etc. The one or more processors 502 may be configured to generate and send position location information, e.g., including the DL PRS measurements and/or a position estimate if generated, to an LMF in an event report in an SDT, with an RRC Resume request, e.g., as discussed at stage 15 of FIG. 4A. The one or more processors 502 may be configured to receive a MAC-CE UL-PRS deactivation, e.g., at a MAC-CE level or in a RRC message, such as the RRC Release message, such as described in stages 18b and 20 of FIG. 4A.

The medium 520 and/or memory 504 may include an RRC Inactive module 524 that when implemented by the one or more processors 502 configures the one or more processors 502 to send and receive messages with a gNB to enter an RRC Inactive state.

The medium 520 and/or memory 504 may include an RRC Resume module 526 that when implemented by the one or more processors 502 configures the one or more processors 502 send and receive messages related to RRC Resume Requests to and from a gNB. For example, the one or more processors 502 may be configured to send an SDT with a RRC Resume Request message to a serving gNB, and may be configured to include an LPP Request Assistance Data message requesting UL PRS configuration, and/or position location information, e.g., including DL PRS measurements and/or a position estimate if generated. The one or more processors 502 may be configured to receive subsequent DL SDT messages from the serving gNB, which may include the UL PRS configuration. The one or more processors 502 may be configured to receive an RRC Release message from a serving gNB, which may include an event report acknowledgement, and may be configured to receive in the RRC Release message the UL PRS configuration.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support location of the UE in a RRC Inactive state in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a wireless transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or in part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
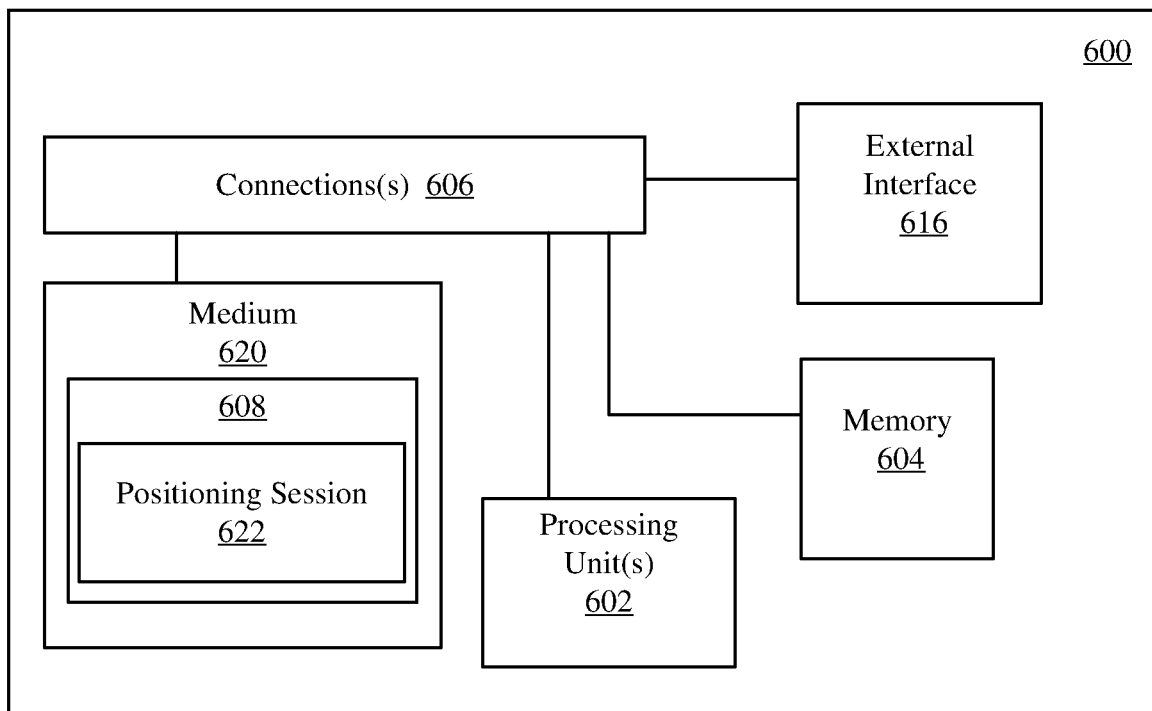
FIG. 6 shows a schematic block diagram illustrating certain exemplary features of a location server that is configured for UE event reporting for a deferred MT-LR while in an RRC Inactive state.

FIG. 6 shows a schematic block diagram illustrating certain exemplary features of a location server 600, e.g., the LMF 152 or SLP 162, shown in FIG. 1 or an LMC or LSS located in NG-RAN 112, that is configured to support positioning of a UE (e.g. a UE 102) in an RRC Inactive state, as discussed herein. The location server 600 may perform the signaling flows of FIG. 4A, 4B, 4C, 4D, and/or 4E, the process flow, e.g., shown in FIG. 9 and algorithms disclosed herein. Location server 600 may, for example, include one or more processors 602, memory 604, an external interface 616 (e.g., wireline or wireless network interface to base stations and/or entities in the core network), which may be operatively coupled with one or more connections 606 (e.g., buses, lines, fibers, links, etc.) to non-transitory computer readable medium 620 and memory 604. In certain example implementations, all or part of location server 600 may take the form of a chipset, and/or the like.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a positioning session module 622 that when implemented by the one or more processors 602 configures the one or more processors 602 to engage in a positioning session with a UE through a serving base station via the external interface 616, e.g., as discussed herein, including sending location service requests, such as a request for positioning capabilities, and a request of location information, such as positioning measurements, e.g., for a UE-assisted positioning process, or a position estimate, e.g., for a UE based positioning process. The one or more processors 602 are configured to receive responses to the location service requests, e.g. including receiving positioning capabilities and the requested location information from a UE. The one or more processors 602 may be configured to send and receive messages for a periodic location session. The one or more processors 402 may be configured to receive an event report from a UE in the RRC Inactive state, the event report including an LPP Request Assistance Data message indicating a request for UL PRS configuration. The one or more processors 602 may be further configured to send an NRPPa Positioning Information Request to a serving base station for the UE to request a UL Positioning Reference Signal for the UE while the UE is in an RRC Inactive state. The one or more processors 602 may be further configured to receive the UL Positioning Reference Signal configuration from the serving base station and to send an UL measurement request to at least one base station, including the UL Positioning Reference Signal configuration. The one or more processors 602 may be further configured to send an event report acknowledgement to the UE in the RRC Inactive state. The one or more processors 602 may be further configured to receive a measurement response from the at least one base station including measurements of UL PRS transmitted by the UE in the RRC Inactive state and to determine a location of the UE based at least in part on the measurement response from the at least one base station. The one or more processors 602 may be further configured to receive an event report from the UE in the RRC Inactive state, that includes a LPP Provide Location Information message including location measurements performed by the UE in the RRC Inactive state, such as Rx-Tx, AOA, TOA, RSRP, etc., or other types of measurements, such as using WiFi or SPS measurements. The one or more processors 602 may be further configured to determine a location of the UE based at least in part on the location measurements in the LPP Provide Location Information message.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support suspension of an RRC connection between the UE and a base station during a positioning session in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface 616 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
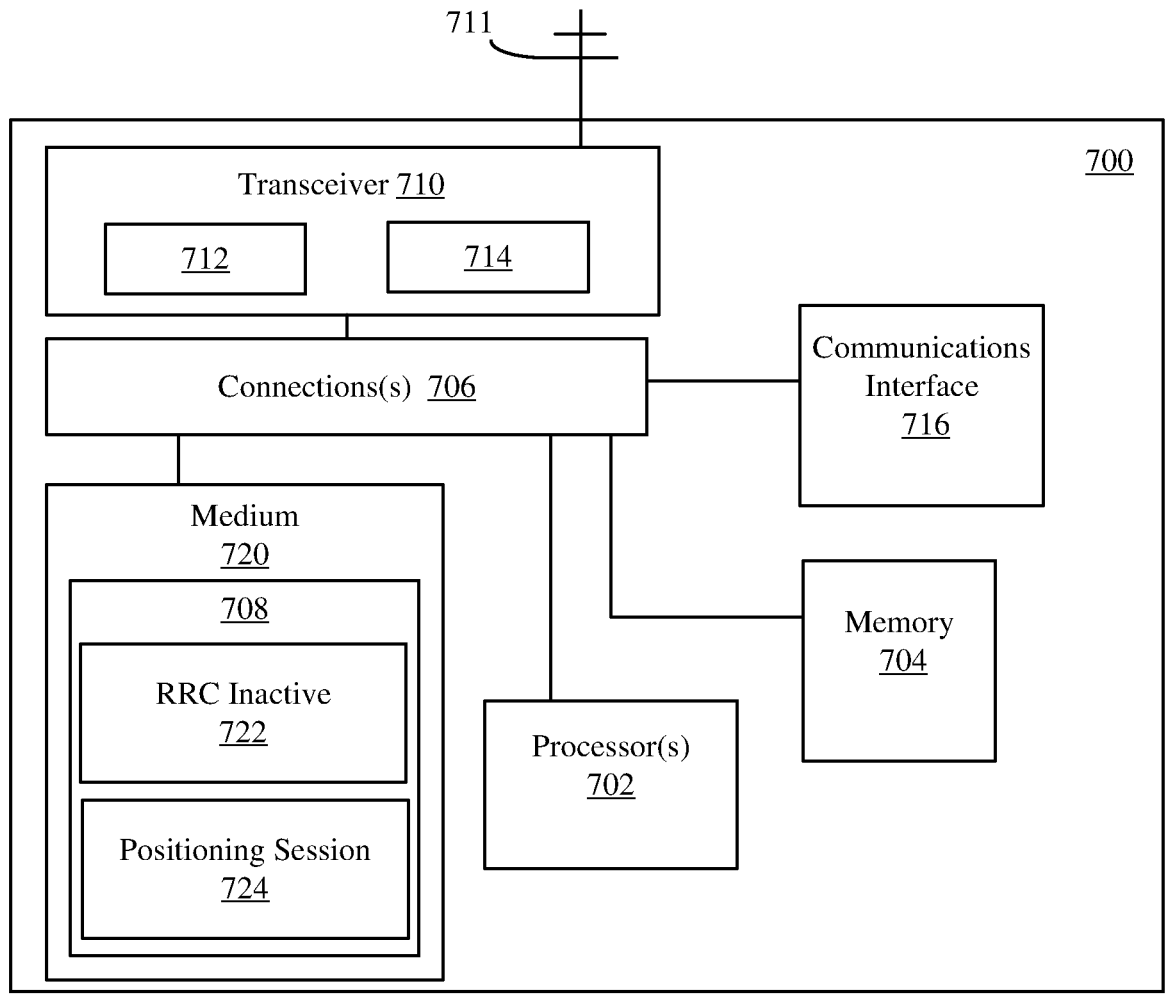
FIG. 7 shows a schematic block diagram illustrating certain exemplary features of a base station that is configured for UE event reporting for a deferred MT-LR while in an RRC Inactive state.

FIG. 7 shows a schematic block diagram illustrating certain exemplary features of a base station 700, e.g., a gNB 110 in FIG. 1, enabled to support location of a UE (e.g. a UE 102) in an RRC Inactive state, as discussed herein. The base station 700 may be an eNB, a gNB 110 or an ng-eNB 114. The base station 700 may perform the signaling flows of FIG. 4A, 4B, 4C, 4D, and/or 4E. Base station 700 may, for example, include one or more processors 702, memory 704, an external interface, which may include a transceiver 710 (e.g., wireless network interface) and a communications interface 716 (e.g., wireline or wireless network interface to other base stations and/or entities in the core network such as a location server directly or via one or more intervening entities), which may be operatively coupled with one or more connections 706 (e.g., buses, lines, fibers, links, etc.) to non-transitory computer readable medium 720 and memory 704. The base station 700 may further include additional items, which are not shown, such as a user interface that may include e.g., a display, a keypad or other input device, such as virtual keypad on the display, through which a user may interface with the base station. In certain example implementations, all or part of base station 700 may take the form of a chipset, and/or the like. Transceiver 710 may, for example, include a transmitter 712 enabled to transmit one or more signals over one or more types of wireless communication networks and a receiver 714 to receive one or more signals transmitted over the one or more types of wireless communication networks. The communications interface 716 may be a wired or wireless transceiver capable of connecting to other base stations in the RAN or network entities, such as a location server, e.g., LMF 152 or SLP 162 through various entities such as AMF 154 or UPF 158, shown in FIG. 1.

In some embodiments, base station 700 may include antenna 711, which may be internal or external. Antenna 711 may be used to transmit and/or receive signals processed by transceiver 710. In some embodiments, antenna 711 may be coupled to transceiver 710. In some embodiments, measurements of signals received (transmitted) by base station 700 may be performed at the point of connection of the antenna 711 and transceiver 710. For example, the measurement point of reference for received (transmitted) RF signal measurements may be an input (output) terminal of the receiver 714 (transmitter 712) and an output (input) terminal of the antenna 711. In a base station 700 with multiple antennas 711 or antenna arrays, the antenna connector may be viewed as a virtual point representing the aggregate output (input) of multiple antennas. In some embodiments, base station 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of base station 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in base station 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors. A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in base station 700 is merely exemplary, and as such the functionality of the modules and/or data structures may be combined, separated, and/or be structured in different ways depending upon the implementation of the base station 700.

The medium 720 and/or memory 704 may include a RRC Inactive module 722 that when implemented by the one or more processors 702 configures the one or more processors 702 to send and receive messages related to RRC Inactive state, including SDT messages with Resume Requests and RRC release messages from and to the UE. The one or more processors 702 may be configured to receive an SDT with an event report and an RRC Resume Request message from the UE while the UE is in an RRC Inactive state, via the transceiver 710 and to forward the event report to a location server (LMF), e.g., as discussed at stages 3, 4, and 15, 16 of FIG. 4A. The one or more processors 702 may be configured to send an RRC Release message from the UE, wherein the UE remains in the RRC Inactive state, via the transceiver 710. The RRC Release message, for example, may include an event report acknowledgement from an LMF as part of positioning of the UE and may include UL PRS configuration or UL PRS deactivation.

The medium 720 and/or memory 704 may include a positioning session module 724 that when implemented by the one or more processors 702 configures the one or more processors 702 to engage in a positioning session with a UE and a location server (e.g., LMF), via the external interface (transceiver 710 and communications interface 716). For example, the one or more processors 702 may be configured to receive an event report after (or before) an event is detected by the UE, e.g., in a received SDT with an RRC Resume message, and to send an indication of the event to an LMF, via the external interface. The one or more processors 702 may be configured to receive an NRPPa Positioning Information Request from the location server to and determine UL PRS configuration for the UE, which may be provided to the UE while in RRC Inactive state via a subsequent DL SDT or an RRC Release message. Moreover, the one or more processors 702 may be configured to provide position location information received from the UE in an SDT with an RRC Resume message to the LMF. The one or more processors 702 may be configured to send a MAC-CE UL PRS activation, e.g., at a MAC-CE level or in a RRC message, such as the RRC Release message, such as described in stages 9 and 13 of FIG. 4A. The one or more processors 702 may be configured to send a MAC-CE UL-PRS deactivation, e.g., at a MAC-CE level or in a RRC message, such as the RRC Release message, such as described in stages 18b and 20 of FIG. 4A.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support suspension of an RRC connection between the UE and a base station during a positioning session in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
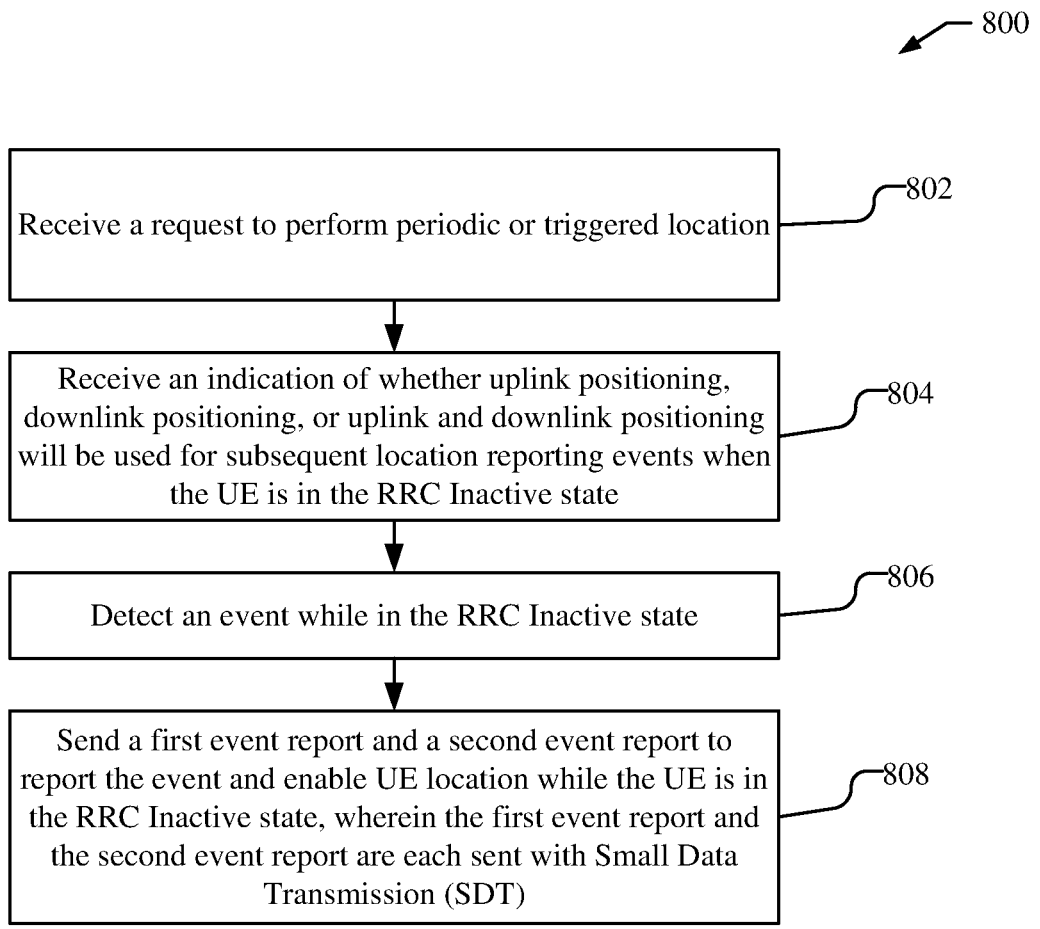
FIG. 8 shows a flowchart for an exemplary method for supporting location services for a UE performed by the UE.

FIG. 8 shows a flowchart for an exemplary method 800 for supporting location of a User Equipment (UE) in a Radio Resource Control (RRC) Inactive state, performed by the UE, such as the UE 102 shown in FIG. 1 or UE 500 shown in FIG. 5, in a manner consistent with disclosed implementations.

At block 802, the UE receives a request to perform periodic or triggered location, e.g., as discussed at stage 14 of FIG. 3. The request to perform periodic or triggered location, for example, may be received from a first location server, such as a Location Management Function (e.g. an LMF 152). A means for receiving a request to perform periodic or triggered location may include, e.g., the wireless transceiver 510 and one or more processors 502 with dedicated hardware or implementing executable code or software instructions in memory 504 and/or medium 520 in UE 500, such as the positioning session module 522, shown in FIG. 5.

At block 804, the UE receives an indication of whether uplink positioning, downlink positioning, or uplink and downlink positioning will be used for subsequent location reporting events when the UE is in the RRC Inactive state, e.g., as discussed in stage 14 of FIG. 3 and stage 1 of FIGS. 4B, 4C, 4D, and 4E. In one implementation, the request to perform periodic or triggered location includes the indication of whether uplink positioning, downlink positioning, or uplink and downlink positioning will be used for subsequent location reporting events when the UE is in the RRC Inactive state, e.g., as discussed in stage 14 of FIG. 3 and stage 1 of FIGS. 4B, 4C, 4D, and 4E. A means for receiving an indication of whether uplink positioning, downlink positioning, or uplink and downlink positioning will be used for subsequent location reporting events when the UE is in the RRC Inactive state may include, e.g., the wireless transceiver 510 and one or more processors 502 with dedicated hardware or implementing executable code or software instructions in memory 504 and/or medium 520 in UE 500, such as the positioning session module 522, shown in FIG. 5.

At block 806, the UE detects an event while in the RRC Inactive state, e.g., as discussed at block 402 and stage 2 of FIG. 4A, and stages 2 and 3 of FIGS. 4B, 4C, 4D, and 4E. A means for detecting an event while in the RRC Inactive state may include, e.g., the wireless transceiver 510 and one or more processors 502 with dedicated hardware or implementing executable code or software instructions in memory 504 and/or medium 520 in UE 500, such as the RRC Inactive module 524 and the positioning session module 522, shown in FIG. 5.

At block 808, the UE sends a first event report and a second event report to report the event and enable UE location while the UE is in the RRC Inactive state, wherein the first event report and the second event report are each sent with Small Data Transmission (SDT), e.g., as discussed at stages 3 and 15 of FIG. 4A, stages 5 and 15 of FIG. 4B, stages 4 and 14 of FIG. 4E. The first event report and the second event report may be sent, for example, to a second location server, such as a Location Management Function (e.g. an LMF 152), which may be the same as the first location server. A means for sending a first event report and a second event report to report the event and enable UE location while the UE is in the RRC Inactive state, wherein the first event report and the second event report are each sent with Small Data Transmission (SDT) may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In some implementations, each of the first event report and the second event report are sent, e.g., by the UE, in an RRC Resume Request message, e.g., as discussed at stages 3 and 15 of FIG. 4A, stages 5 and 15 of FIG. 4B, stages 4 and 14 of FIG. 4E. A means for sending each of the first event report and the second event report in an RRC Resume Request message may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In some implementations, the second event report includes an indication that the second event report is associated with the first event report, e.g., as discussed in stage 15 of FIG. 4B and stage 14 of FIG. 4E. In one implementation, the indication that the second event report is associated with the first event report includes an event type parameter, e.g., as discussed in stage 15 of FIG. 4B and stage 14 of FIG. 4E. In one implementation, the first event report and the second event report each include a common identifier, wherein the indication that the second event report is associated with the first event report comprises the common identifier, e.g., as discussed in stages 5 and 15 of FIG. 4B and stages 4 and 14 of FIG. 4E. In one implementation, the indication that the second event report is associated with the first event report enables treatment (e.g. by the second location server) of the second event report as a continuation of the first event report, e.g., as discussed for stage 18 of FIG. 4B and stage 17 of FIG. 4E.

In certain implementations, referred to here as UL+DL implementations, the indication that uplink and downlink positioning will be used for subsequent location reporting events is received (e.g. by the UE) when the UE is in the RRC Inactive state, e.g., as discussed in stage 14 of FIG. 3 and stage 1 of FIGS. 4B and 4E. The first event report may include a Long Term Evolution (LTE) Positioning Protocol (LPP) Request Assistance Data message indicating a request for an uplink (UL) Positioning Reference Signal (PRS) configuration, e.g., included by the UE, as discussed at stage 3 of FIG. 4A, stage 5 of FIG. 4B and stage 4 of FIG. 4E. The UE may then receive from a serving base station the UL PRS configuration, e.g., as discussed at stages 6b and 13 of FIG.

4A, stage 12 of FIG. 4B and stage 11 of FIG. 4E. In one implementation, the UL PRS configuration is received in a subsequent downlink (DL) SDT, e.g., as discussed at stage 6b of FIG. 4A. In one implementation, the UL PRS configuration is received in an RRC Release message, e.g., as discussed at stage 13 of FIG. 4A, stage 12 of FIG. 4B, and stage 11 of FIG. 4E. In another implementation, the UL PRS configuration is received in a subsequent downlink (DL) SDT, e.g., as discussed at stage 6b of FIG. 4A. A means for receiving the indication that uplink and downlink positioning will be used for subsequent location reporting events when the UE is in the RRC Inactive state may include, e.g., the wireless transceiver 510 and one or more processors 502 with dedicated hardware or implementing executable code or software instructions in memory 504 and/or medium 520 in UE 500, such as the positioning session module 522, shown in FIG. 5. A means for including in the first event report a Long Term Evolution (LTE) Positioning Protocol (LPP) Request Assistance Data message indicating a request for an uplink (UL) Positioning Reference Signal (PRS) configuration may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5. A means for receiving from a base station the UL Positioning Reference Signal configuration may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In some implementations (e.g. in a DL implementation or some of the UL+DL implementations), the second event report includes an LPP Provide Location Information message (e.g. included by the UE) including location measurements generated by the UE, e.g., as discussed at stage 15 of FIGS. 4A, 4B, and stage 14 of FIG. 4E. The UE may receive downlink (DL) PRSs from one or more base stations (e.g. one or more gNBs 110), e.g., as discussed at stage 14a of FIG. 4A, stage 13 of FIG. 4B, and stage 12 of FIG. 4E. The UE may then measure the DL PRSs while in the RRC Inactive state to generate the location measurements, e.g., as discussed at stage 14a of FIG. 4A, stage 13 of FIG. 4B, and stage 12 of FIG. 4E. A means for including in the second event report an LPP Provide Location Information message including location measurements generated by the UE may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5. A means for receiving downlink (DL) PRSs from one or more base stations may include, e.g., the wireless transceiver 510 and one or more processors 502 with dedicated hardware or implementing executable code or software instructions in memory 504 and/or medium 520 in UE 500, such as the positioning session module 522, shown in FIG. 5. A means for measuring the DL PRSs while in the RRC Inactive state to generate the location measurements may include, e.g., the wireless transceiver 510 and one or more processors 502 with dedicated hardware or implementing executable code or software instructions in memory 504 and/or medium 520 in UE 500, such as the positioning session module 522, shown in FIG. 5.

In some of the UL+DL implementations, the UE may further transmit UL PRSs while in the RRC Inactive state, based on the UL PRS configuration, that may enable UL PRS measurements by a plurality of base stations (e.g. gNBs 110), wherein a location of the UE is determined, e.g., by the second location server, based at least in part on the UL PRS measurements, e.g., as discussed at stages 14b, 17 and 17.5 of FIG. 4A, stages 13, 14 and 23 of FIG. 4B, and stages 12, 13 and 22 of FIG. 4E. For example, the plurality of base stations may obtain the UL PRS measurements based on the transmitted UL PRSs and may send the UL PRS measurements to the second location server. A means for transmitting UL PRSs while in RRC Inactive state, based on the UL PRS configuration, that may enable UL PRS measurements by a plurality of base stations, wherein a location of the UE is determined based at least in part on the UL PRS measurements may include, e.g., the wireless transceiver 510 and one or more processors 502 with dedicated hardware or implementing executable code or software instructions in memory 504 and/or medium 520 in UE 500, such as the positioning session module 522, shown in FIG. 5.

In some implementations (e.g. some of the UL+DL implementations), the UE may receive a Medium Access Control-Control Element (MAC-CE) UL PRS activation from the serving base station (e.g. serving gNB 110) in one of a subsequent downlink (DL) SDT or an RRC Release message, e.g., as discussed in stages 9 and 13 of FIG. 4A. The UE may later receive a MAC-CE UL PRS deactivation from the serving base station in one of a subsequent downlink (DL) SDT or an RRC Release message, e.g., as discussed in stages 18b and 20 of FIG. 4A. A means for receiving a Medium Access Control-Control Element (MAC-CE) UL PRS activation from the serving base station in one of a subsequent downlink (DL) SDT or an RRC Release message and receiving a MAC-CE UL PRS deactivation from the serving base station in one of a subsequent downlink (DL) SDT or an RRC Release message may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In some implementations, the UE may provide positioning capabilities of the UE to a serving base station, a location server (e.g. the first or second location server) or both, the positioning capabilities indicating support, while in the RRC Inactive state, for at least one of uplink positioning, downlink positioning, uplink and downlink positioning, or a combination thereof, e.g., as discussed at stage 13 of FIG. 3 and stage 1a of FIG. 4A. A means for providing positioning capabilities of the UE to a serving base station, a location server or both, the positioning capabilities indicating support for at least one of uplink positioning, downlink positioning, uplink and downlink positioning, or a combination thereof while in the RRC Inactive state may include, e.g., the wireless transceiver 510 and one or more processors 502 with dedicated hardware or implementing executable code or software instructions in memory 504 and/or medium 520 in UE 500, such as the positioning session module 522, shown in FIG. 5.

In some implementations, for example, the request to perform periodic or triggered location, which may be received from the first location server, includes deferred MT-LR information for the UE, and the UE may provide the deferred MT-LR information for the UE and positioning capabilities of the UE to a serving base station (e.g. a serving gNB 110), where the deferred MT-LR information includes one or more of a type of event, positioning methods requested, reporting interval, and wherein the deferred MT-LR information and the positioning capabilities of the UE enable transitioning the UE (e.g. by the serving base station) to the RRC Inactive state, e.g., as discussed in stage 14 of FIG. 3 and stage 1a and block 402 of FIG. 4A. A means for providing the deferred MT-LR information for the UE and positioning capabilities of the UE to the serving base station may include, e.g., the wireless transceiver 510 and one or more processors 502 with dedicated hardware or implementing executable code or software instructions in memory 504 and/or medium 520 in UE 500, such as the positioning session module 522, shown in FIG. 5.

Figure 9:
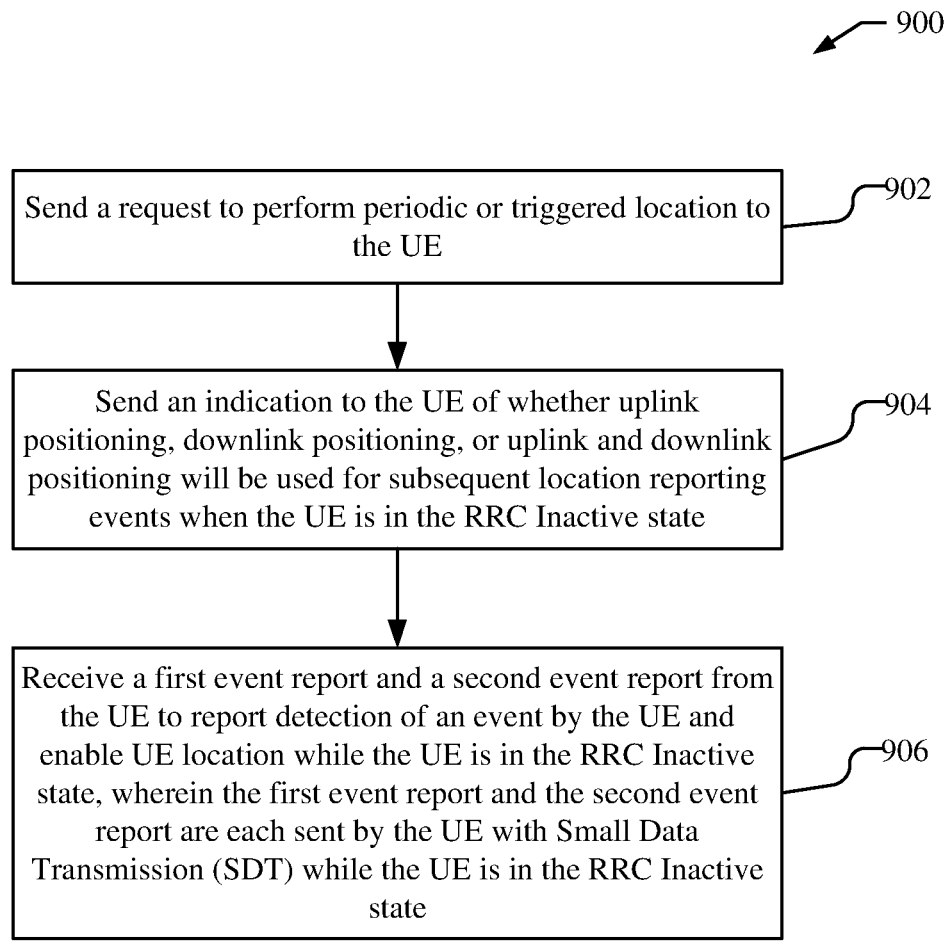
FIG. 9 shows a flowchart for an exemplary method for supporting location services for a UE performed by a location server.

FIG. 9 shows a flowchart for an exemplary method 900 for supporting location of a User Equipment (e.g. a UE 102) in a Radio Resource Control (RRC) Inactive state, performed by a location server, such as LMF 152 shown in FIG. 1 or location server 600 shown in FIG. 6, in a manner consistent with disclosed implementations.

At block 902, the location server sends a request to perform periodic or triggered location to the UE, e.g., as discussed at stage 14 of FIG. 3. A means for sending a request to perform periodic or triggered location to the UE may include, e.g., the external interface 616 and one or more processors 602 with dedicated hardware or implementing executable code or software instructions in memory 604 and/or medium 620 in location server 600, such as the positioning session module 622, shown in FIG. 6.

At block 904, the location server sends an indication to the UE of whether uplink positioning, downlink positioning, or uplink and downlink positioning will be used for subsequent location reporting events when the UE is in the RRC Inactive state, e.g., as discussed in stage 14 of FIG. 3 and stage 1 of FIGS. 4B, 4C, 4D, and 4E. A means for sending an indication to the UE of whether uplink positioning, downlink positioning, or uplink and downlink positioning will be used for subsequent location reporting events when the UE is in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6.

At block 906, the location server receives a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state, e.g., as discussed at stages 3, 4 and 15, 16 of FIG. 4A, stages 5-7 and 15-17 of FIG. 4B, and stages 4-6 and 14-16 of FIG. 4E. A means for receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the second event report includes an indication that the second event report is associated with the first event report, e.g., as discussed in stages 15-18 of FIG. 4B and stages 14-17 of FIG. 4E. In one implementation, the indication that the second event report is associated with the first event report includes an event type parameter, e.g., as discussed in stages 15-18 of FIG. 4B and stages 14-17 of FIG. 4E. In one implementation, the first event report and the second event report each include a common identifier, wherein the indication that the second event report is associated with the first event report includes the common identifier, e.g., as discussed in stages 5 and 15-18 of FIG. 4B and stages 4 and 14-17 of FIG. 4E. The location server may treat the second event report as a continuation of the first event report based on the indication that the second event report is associated with the first event report, e.g., as discussed in stage 18 of FIG. 4B and stage 17 of FIG. 4E. A means for treating the second event report as a continuation of the first event report based on the indication that the second event report is associated with the first event report may include, e.g., the external interface 616 and one or more processors 602 with dedicated hardware or implementing executable code or software instructions in memory 604 and/or medium 620 in location server 600, such as the positioning session module 622, shown in FIG. 6.

In some implementations, referred to here as UL+DL implementations, the indication that uplink and downlink positioning will be used for subsequent location reporting events is sent (e.g. by the location server) when the UE is in the RRC Inactive state, e.g., as discussed in stage 14 of FIG. 3 and stage 1 of FIGS. 4B and 4E. The first event report may then include a Long Term Evolution (LTE) Positioning Protocol (LPP) Request Assistance Data message indicating a request for an uplink (UL) Positioning Reference Signal (PRS) configuration, e.g., as discussed at stage 3 of FIG. 4A, stage 5 of FIG. 4B, and stage 4 of FIG. 4E. The location server may then send a request for an UL PRS configuration to a serving base station (e.g. a serving gNB 110) for the UE while the UE is in the RRC Inactive state, e.g., as discussed at stage 5 of FIG. 4A, stage 8 of FIG. 4B, and stage 7 of FIG. 4E. The location server may then receive the UL PRS configuration from the serving base station, wherein the serving base station sends the UL PRS configuration to the UE, e.g., as discussed at stages 6b, 7 and 13 of FIG. 4A, stages 8 and 12 of FIG. 4B, and stages 7 and 11 of FIG. 4E. A means for sending the indication that uplink and downlink positioning will be used for subsequent location reporting events when the UE is in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6. A means for sending a request for an UL Positioning Reference Signal to a serving base station for the UE while the UE is in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6. A means for receiving the UL Positioning Reference Signal configuration from the serving base station may include, e.g., the external interface 616 and one or more processors 602 with dedicated hardware or implementing executable code or software instructions in memory 604 and/or medium 620 in location server 600, such as the positioning session module 622, shown in FIG. 6.

In some of the UL+DL implementations, the location server sends an UL measurement request to at least one base station (e.g. gNB 110), including the UL PRS configuration, e.g., as discussed at stage 11 of FIG. 4A, stage 8 of FIG. 4B, and stage 7 of FIG. 4E. A means for sending an UL measurement request to at least one base station, including the UL PRS configuration, e.g., the external interface 616 and one or more processors 602 with dedicated hardware or implementing executable code or software instructions in memory 604 and/or medium 620 in location server 600, such as the positioning session module 622, shown in FIG. 6.

In the some of the UL+DL implementations, the second event report may include an LPP Provide Location Information message including location measurements performed by the UE in the RRC Inactive state, e.g., as discussed at stages 15 and 16 of FIG. 4A, stages 15-17 of FIG. 4B and stages 14-16 of FIG. 4E. The location server may then determine a location of the UE based at least in part on the location measurements in the LPP Provide Location Information message, e.g., as discussed at stage 17.5 of FIG. 4A, stage 23 of FIG. 4B and stage 22 of FIG. 4E. A means for determining a location of the UE based at least in part on the location measurements in the LPP Provide Location Information message may include, e.g., the external interface 616 and one or more processors 602 with dedicated hardware or implementing executable code or software instructions in memory 604 and/or medium 620 in location server 600, such as the positioning session module 622, shown in FIG. 6.

In the some of the UL+DL implementations, the location server may receive a measurement response from at least one base station including measurements of UL PRS transmitted by the UE in the RRC Inactive state, e.g., as discussed at stage 17 of FIG. 4A, stage 14 of FIG. 4B, and stage 13 of FIG. 4E. The location server may then determine the location of the UE based further on the measurement response from the at least one base station, e.g., as discussed at stage 17.5 of FIG. 4A, stage 23 of FIG. 4B and stage 22 of FIG. 4E. A means for receiving a measurement response from at least one base station including measurements of UL Positioning Reference Signals transmitted by the UE in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6. A means for determining a location of the UE based further on the measurement response from the at least one base station may include, e.g., the external interface 616 and one or more processors 602 with dedicated hardware or implementing executable code or software instructions in memory 604 and/or medium 620 in location server 600, such as the positioning session module 622, shown in FIG. 6.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

In view of this description embodiments may include different combinations of features. Implementation examples are described in the following numbered clauses:

Clause 1. A method performed by a User Equipment (UE) for supporting location of the UE in a Radio Resource Control (RRC) Inactive state, comprising: receiving a request to perform periodic or triggered location; receiving an indication of whether uplink positioning, downlink positioning, or uplink and downlink positioning will be used for subsequent location reporting events when the UE is in the RRC Inactive state; detecting an event while in the RRC Inactive state; and sending a first event report and a second event report to report the event and enable UE location while the UE is in the RRC Inactive state, wherein the first event report and the second event report are each sent with Small Data Transmission (SDT).

Clause 2. The method of clause 1, wherein the request to perform periodic or triggered location is received from a location server and the first event report and the second event report are sent to the location server.

Clause 3. The method of clause 2, wherein the location server comprises a Location Management Function (LMF).

Clause 4. The method of any of clauses 1-3, wherein each of the first event report and the second event report are sent in an RRC Resume Request message.

Clause 5. The method of any of clauses 1-4, wherein the second event report includes an indication that the second event report is associated with the first event report.

Clause 6. The method of clause 5, wherein the indication that the second event report is associated with the first event report comprises an event type parameter.

Clause 7. The method of any of clauses 5-6, wherein the first event report and the second event report each include a common identifier, wherein the indication that the second event report is associated with the first event report comprises the common identifier.

Clause 8. The method of any of clauses 5-7, wherein the indication that the second event report is associated with the first event report enables treatment of the second event report as a continuation of the first event report.

Clause 9. The method of any of clauses 1-8, wherein: the indication that uplink and downlink positioning will be used for subsequent location reporting events is received when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; and the method further comprises receiving from a serving base station the UL PRS configuration.

Clause 10. The method of clause 9, wherein the UL PRS configuration is received in a subsequent downlink (DL) SDT.

Clause 11. The method of any of clauses 9-10, wherein the UL PRS configuration is received in an RRC Release message.

Clause 12. The method of any of clauses 9-11, further comprising: transmitting UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

Clause 13. The method of any of clauses 9-12, further comprising: receiving a Medium Access Control-Control Element (MAC-CE) UL PRS activation from the serving base station in one of a subsequent downlink (DL) SDT or an RRC Release message; and receiving a MAC-CE UL PRS deactivation from the serving base station in one of a subsequent downlink (DL) SDT or an RRC Release message.

Clause 14. The method of any of clauses 1-13, wherein the second event report includes an LPP Provide Location Information message including location measurements generated by the UE.

Clause 15. The method of clause 14, further comprising: receiving downlink (DL) PRSs from one or more base stations; and measuring the DL PRSs while in the RRC Inactive state to generate the location measurements.

Clause 16. The method of any of clauses 1-15, further comprising providing positioning capabilities to a serving base station, a location server or both, the positioning capabilities indicating support while in the RRC Inactive state for at least one of uplink positioning, downlink positioning, uplink and downlink positioning, or a combination thereof.

Clause 17. The method of any of clauses 1-16, wherein the request to perform periodic or triggered location includes deferred MT-LR information for the UE, the method further comprising providing the deferred MT-LR information for the UE and positioning capabilities of the UE to a serving base station, wherein the deferred MT-LR information includes one or more of a type of event, positioning methods requested, reporting interval, and wherein the deferred MT-LR information and the positioning capabilities of the UE enable transitioning the UE to the RRC Inactive state.

Clause 18. The method of any of clauses 1-17, wherein the request to perform periodic or triggered location comprises the indication of whether uplink positioning, downlink positioning, or uplink and downlink positioning will be used for subsequent location reporting events when the UE is in the RRC Inactive state.

Clause 19. A User Equipment (UE) configured for supporting location of the UE in a Radio Resource Control (RRC) Inactive state, comprising: a wireless transceiver configured to wirelessly communicate with entities in a wireless network; at least one memory; at least one processor coupled to the wireless transceiver and the at least one memory, wherein the at least one processor is configured to: receive, via the wireless transceiver, a request to perform periodic or triggered location; receive, via the wireless transceiver, an indication of whether uplink positioning, downlink positioning, or uplink and downlink positioning will be used for subsequent location reporting events when the UE is in the RRC Inactive state; detect an event while in the RRC Inactive state; and send, via the wireless transceiver, a first event report and a second event report to report the event and enable UE location while the UE is in the RRC Inactive state, wherein the first event report and the second event report are each sent with Small Data Transmission (SDT).

Clause 20. The UE of clause 19, wherein the request to perform periodic or triggered location is received from a location server and the first event report and the second event report are sent to the location server.

Clause 21. The UE of clause 20, wherein the location server comprises a Location Management Function (LMF).

Clause 22. The UE of any of clauses 19-21, wherein each of the first event report and the second event report are sent in an RRC Resume Request message.

Clause 23. The UE of any of clauses 19-22, wherein the second event report includes an indication that the second event report is associated with the first event report.

Clause 24. The UE of clause 23, wherein the indication that the second event report is associated with the first event report comprises an event type parameter.

Clause 25. The UE of any of clauses 23-24, wherein the first event report and the second event report each include a common identifier, wherein the indication that the second event report is associated with the first event report comprises the common identifier.

Clause 26. The UE of any of clauses 23-25, wherein the indication that the second event report is associated with the first event report enables treatment of the second event report as a continuation of the first event report.

Clause 27. The UE of any of clauses 19-26, wherein: the indication that uplink and downlink positioning will be used for subsequent location reporting events is received when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; and the at least one processor is further configured to receive, via the wireless transceiver, from a serving base station the UL PRS configuration.

Clause 28. The UE of clause 27, wherein the UL PRS configuration is received in a subsequent downlink (DL) SDT.

Clause 29. The UE of any of clauses 27-28, wherein the UL PRS configuration is received in an RRC Release message.

Clause 30. The UE of any of clauses 27-29, wherein the at least one processor is further configured to: transmit, via the wireless transceiver, UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

Clause 31. The UE of any of clauses 27-30, wherein the at least one processor is further configured to receive, via the wireless transceiver, a Medium Access Control-Control Element (MAC-CE) UL PRS activation from the serving base station in one of a subsequent downlink (DL) SDT or an RRC Release message and receiving a MAC-CE UL PRS deactivation from the serving base station in one of a subsequent downlink (DL) SDT or an RRC Release message.

Clause 32. The UE of any of clauses 19-31, wherein the second event report includes an LPP Provide Location Information message including location measurements generated by the UE.

Clause 33. The UE of clause 32, wherein the at least one processor is further configured to: receive, via the wireless transceiver, downlink (DL) PRSs from one or more base stations; and measure the DL PRSs while in the RRC Inactive state to generate the location measurements.

Clause 34. The UE of any of clauses 19-33, provide positioning capabilities to a serving base station, a location server or both, the positioning capabilities indicating support while in the RRC Inactive state for at least one of uplink positioning, downlink positioning, uplink and downlink positioning, or a combination thereof.

Clause 35. The UE of any of clauses 19-34, wherein the request to perform periodic or triggered location includes deferred MT-LR information for the UE, the method further comprising providing the deferred MT-LR information for the UE and positioning capabilities of the UE to a serving base station, wherein the deferred MT-LR information includes one or more of a type of event, positioning methods requested, reporting interval, and wherein the deferred MT-LR information and the positioning capabilities of the UE enable transitioning the UE to the RRC Inactive state.

Clause 36. The UE of any of clauses 19-35, wherein the request to perform periodic or triggered location comprises the indication of whether uplink positioning, downlink positioning, or uplink and downlink positioning will be used for subsequent location reporting events when the UE is in the RRC Inactive state.

Clause 37. A User Equipment (UE) configured for supporting location of the UE in a Radio Resource Control (RRC) Inactive state, comprising: means for receiving a request to perform periodic or triggered location; means for receiving an indication of whether uplink positioning, downlink positioning, or uplink and downlink positioning will be used for subsequent location reporting events when the UE is in the RRC Inactive state; means for detecting an event while in the RRC Inactive state; and means for sending a first event report and a second event report to report the event and enable UE location while the UE is in the RRC Inactive state, wherein the first event report and the second event report are each sent with Small Data Transmission (SDT).

Clause 38. The UE of clause 37, wherein the request to perform periodic or triggered location is received from a location server and the first event report and the second event report are sent to the location server.

Clause 39. The UE of clause 38, wherein the location server comprises a Location Management Function (LMF).

Clause 40. The UE of any of clauses 37-39, wherein each of the first event report and the second event report are sent in an RRC Resume Request message.

Clause 41. The UE of any of clauses 37-40, wherein the second event report includes an indication that the second event report is associated with the first event report.

Clause 42. The UE of clause 41, wherein the indication that the second event report is associated with the first event report comprises an event type parameter.

Clause 43. The UE of any of clauses 41-42, wherein the first event report and the second event report each include a common identifier, wherein the indication that the second event report is associated with the first event report comprises the common identifier.

Clause 44. The UE of any of clauses 41-43, wherein the indication that the second event report is associated with the first event report enables treatment of the second event report as a continuation of the first event report.

Clause 45. The UE of any of clauses 37-44, wherein: the indication that uplink and downlink positioning will be used for subsequent location reporting events is received when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; and the UE further comprises means for receiving from a serving base station the UL PRS configuration.

Clause 46. The UE of clause 45, wherein the UL PRS configuration is received in a subsequent downlink (DL) SDT.

Clause 47. The UE of any of clauses 45-46, wherein the UL PRS configuration is received in an RRC Release message.

Clause 48. The UE of any of clauses 45-47, further comprising: means for transmitting UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

Clause 49. The UE of any of clauses 45-48, further comprising means for receiving a Medium Access Control-Control Element (MAC-CE) UL PRS activation from the serving base station in one of a subsequent downlink (DL) SDT or an RRC Release message and receiving a MAC-CE UL PRS deactivation from the serving base station in one of a subsequent downlink (DL) SDT or an RRC Release message.

Clause 50. The UE of any of clauses 37-49, wherein the second event report includes an LPP Provide Location Information message including location measurements performed by the UE.

Clause 51. The UE of clause 50, further comprising: means for receiving downlink (DL) PRSs from one or more base stations; and means for measuring the DL PRSs while in the RRC Inactive state to generate the location measurements.

Clause 52. The UE of any of clauses 37-51, further comprising means for providing positioning capabilities to a serving base station, a location server or both, the positioning capabilities indicating support for at least one of uplink positioning, downlink positioning, uplink and downlink positioning, or a combination thereof while in the RRC Inactive state.

Clause 53. The UE of any of clauses 37-52, wherein the request to perform periodic or triggered location includes deferred MT-LR information for the UE, the method further comprising providing the deferred MT-LR information for the UE to a serving base station, wherein the deferred MT-LR information includes one or more of a type of event, positioning methods requested, reporting interval, and wherein the deferred MT-LR information and positioning capabilities of the UE enable transitioning the UE to the RRC Inactive state.

Clause 54. The UE of any of clauses 37-53, wherein the request to perform periodic or triggered location comprises the indication of whether uplink positioning, downlink positioning, or uplink and downlink positioning will be used for subsequent location reporting events when the UE is in the RRC Inactive state.

Clause 55. A non-transitory storage medium including program code stored thereon, the program code is operable to configure at least one processor in a User Equipment (UE) for supporting location of the UE in a Radio Resource Control (RRC) Inactive state, the program code comprising instructions to: receive a request to perform periodic or triggered location; receive an indication of whether uplink positioning, downlink positioning, or uplink and downlink positioning will be used for subsequent location reporting events when the UE is in the RRC Inactive state; detect an event while in the RRC Inactive state; and send a first event report and a second event report to report the event and enable UE location while the UE is in the RRC Inactive state, wherein the first event report and the second event report are each sent with Small Data Transmission (SDT).

Clause 56. The non-transitory storage medium of clause 55, wherein the request to perform periodic or triggered location is received from a location server and the first event report and the second event report are sent to the location server.

Clause 57. The non-transitory storage medium of clause 56, wherein the location server comprises a Location Management Function (LMF).

Clause 58. The non-transitory storage medium of any of clauses 55-57, wherein each of the first event report and the second event report are sent in an RRC Resume Request message.

Clause 59. The non-transitory storage medium of any of clauses 55-58, wherein the second event report includes an indication that the second event report is associated with the first event report.

Clause 60. The non-transitory storage medium of clause 59, wherein the indication that the second event report is associated with the first event report comprises an event type parameter.

Clause 61. The non-transitory storage medium of any of clauses 59-60, wherein the first event report and the second event report each include a common identifier, wherein the indication that the second event report is associated with the first event report comprises the common identifier.

Clause 62. The non-transitory storage medium of any of clauses 59-61, wherein the indication that the second event report is associated with the first event report enables treatment of the second event report as a continuation of the first event report.

Clause 63. The non-transitory storage medium of any of clauses 55-62, wherein: the indication that uplink and downlink positioning will be used for subsequent location reporting events is received when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; and the program code further comprises instructions to receive from a serving base station the UL PRS configuration.

Clause 64. The non-transitory storage medium of clause 63, wherein the UL PRS configuration is received in a subsequent downlink (DL) SDT.

Clause 65. The non-transitory storage medium of any of clauses 63-64, wherein the UL PRS configuration is received in an RRC Release message.

Clause 66. The non-transitory storage medium of any of clauses 63-65, wherein the program code further comprises instructions to: transmit UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

Clause 67. The non-transitory storage medium of any of clauses 63-66, wherein the program code further comprises instructions to receive a Medium Access Control-Control Element (MAC-CE) UL PRS activation from the serving base station in one of a subsequent downlink (DL) SDT or an RRC Release message and receiving a MAC-CE UL PRS deactivation from the serving base station in one of a subsequent downlink (DL) SDT or an RRC Release message.

Clause 68. The non-transitory storage medium of any of clauses 55-67, wherein the second event report includes an LPP Provide Location Information message including location measurements performed by the UE.

Clause 69. The non-transitory storage medium of clause 68, wherein the program code further comprises instructions to: receive downlink (DL) PRSs from one or more base stations; and measure the DL PRSs while in the RRC Inactive state to generate the location measurements.

Clause 70. The non-transitory storage medium of any of clauses 55-69, provide positioning capabilities to a serving base station, a location server or both, the positioning capabilities indicating support for at least one of uplink positioning, downlink positioning, uplink and downlink positioning, or a combination thereof while in the RRC Inactive state.

Clause 71. The non-transitory storage medium of any of clauses 55-70, wherein the request to perform periodic or triggered location includes deferred MT-LR information for the UE, the method further comprising providing the deferred MT-LR information for the UE to a serving base station, wherein the deferred MT-LR information includes one or more of a type of event, positioning methods requested, reporting interval, and wherein the deferred MT-LR information and positioning capabilities of the UE enable transitioning the UE to the RRC Inactive state.

Clause 72. The non-transitory storage medium of any of clauses 55-71, wherein the request to perform periodic or triggered location comprises the indication of whether uplink positioning, downlink positioning, or uplink and downlink positioning will be used for subsequent location reporting events when the UE is in the RRC Inactive state.

Clause 73. A method performed by a location server for supporting location of a User Equipment (UE) in a Radio Resource Control (RRC) Inactive state, comprising: sending a request to perform periodic or triggered location to the UE; sending an indication to the UE of whether uplink positioning, downlink positioning, or uplink and downlink positioning will be used for subsequent location reporting events when the UE is in the RRC Inactive state; and receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

Clause 74. The method of clause 73, wherein the second event report includes an indication that the second event report is associated with the first event report.

Clause 75. The method of clause 74, wherein the indication that the second event report is associated with the first event report comprises an event type parameter.

Clause 76. The method of any of clauses 74-75, wherein the first event report and the second event report each include a common identifier, wherein the indication that the second event report is associated with the first event report comprises the common identifier.

Clause 77. The method of any of clauses 74-76, further comprising treating the second event report as a continuation of the first event report based on the indication that the second event report is associated with the first event report.

Clause 78. The method of any of clauses 73-77, wherein: the indication that uplink and downlink positioning will be used for subsequent location reporting events is sent when the UE is in the RRC Inactive state, the first event report includes a Long Term Evolution (LTE) Positioning Protocol (LPP) Request Assistance Data message indicating a request for an uplink (UL) Positioning Reference Signal (PRS) configuration; the method further comprises: sending a request for the UL PRS configuration to a serving base station for the UE while the UE is in the RRC Inactive state; and receiving the UL PRS configuration from the serving base station, wherein the serving base station sends the UL PRS configuration to the UE.

Clause 79. The method of clause 78, further comprising sending an UL measurement request to at least one base station, including the UL PRS configuration.

Clause 80. The method of any of clauses 78-79, wherein the second event report includes an LPP Provide Location Information message including location measurements performed by the UE in the RRC Inactive state, the method further comprising: determining a location of the UE based at least in part on the location measurements in the LPP Provide Location Information message.

Clause 81. The method of clause 80, further comprising: receiving a measurement response from at least one base station including measurements of UL PRSs transmitted by the UE in the RRC Inactive state; and determining the location based further on the measurement response from the at least one base station.

Clause 82. The method of any of clauses 73-81, wherein the location server comprises a Location Management Function (LMF).

Clause 83. A location server configured for supporting location of a User Equipment (UE) in a Radio Resource Control (RRC) Inactive state, comprising: an external interface configured to wirelessly communicate with entities in a wireless network; at least one memory; at least one processor coupled to the external interface and the at least one memory, wherein the at least one processor is configured to: send, via the external interface, a request to perform periodic or triggered location to the UE; send, via the external interface, an indication to the UE of whether uplink positioning, downlink positioning, or uplink and downlink positioning will be used for subsequent location reporting events when the UE is in the RRC Inactive state; and receive, via the external interface, a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

Clause 84. The location server of clause 83, wherein the second event report includes an indication that the second event report is associated with the first event report.

Clause 85. The location server of clause 84, wherein the indication that the second event report is associated with the first event report comprises an event type parameter.

Clause 86. The location server of any of clauses 84-85, wherein the first event report and the second event report each include a common identifier, wherein the indication that the second event report is associated with the first event report comprises the common identifier.

Clause 87. The location server of any of clauses 84-86, wherein the at least one processor is further configured to treat the second event report as a continuation of the first event report based on the indication that the second event report is associated with the first event report.

Clause 88. The location server of any of clauses 83-87, wherein: the indication that uplink and downlink positioning will be used for subsequent location reporting events is sent when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; the at least one processor is further configured to: send, via the external interface, a request for the UL PRS configuration to a serving base station for the UE while the UE is in the RRC Inactive state; and receive, via the external interface, the UL PRS configuration from the serving base station, wherein the serving base station sends the UL PRS configuration to the UE.

Clause 89. The location server of clause 88, wherein the at least one processor is further configured to send an UL measurement request to at least one base station, including the UL PRS configuration.

Clause 90. The location server of any of clauses 88-89, wherein the second event report includes an LPP Provide Location Information message including location measurements performed by the UE in the RRC Inactive state, wherein the at least one processor is further configured to: determine a location of the UE based at least in part on the location measurements in the LPP Provide Location Information message.

Clause 91. The location server of clause 90, wherein the at least one processor is further configured to: receive, via the external interface, a measurement response from at least one base station including measurements of UL PRSs transmitted by the UE in the RRC Inactive state; and determine the location based further on the measurement response from the at least one base station.

Clause 92. The location server of any of clauses 83-91, wherein the location server comprises a Location Management Function (LMF).

Clause 93. A location server configured for supporting location of a User Equipment (UE) in a Radio Resource Control (RRC) Inactive state, comprising: means for sending a request to perform periodic or triggered location to the UE; means for sending an indication to the UE of whether uplink positioning, downlink positioning, or uplink and downlink positioning will be used for subsequent location reporting events when the UE is in the RRC Inactive state; and means for receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

Clause 94. The location server of clause 93, wherein the second event report includes an indication that the second event report is associated with the first event report.

Clause 95. The location server of clause 94, wherein the indication that the second event report is associated with the first event report comprises an event type parameter.

Clause 96. The location server of any of clauses 94-95, wherein the first event report and the second event report each include a common identifier, wherein the indication that the second event report is associated with the first event report comprises the common identifier.

Clause 97. The location server of any of clauses 94-96, further comprising means for treating the second event report as a continuation of the first event report based on the indication that the second event report is associated with the first event report.

Clause 98. The location server of any of clauses 93-97, wherein: the indication that uplink and downlink positioning will be used for subsequent location reporting events is sent when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; the location server further comprises: means for sending a request for the UL PRS configuration to a serving base station for the UE while the UE is in the RRC Inactive state; and means for receiving the UL PRS configuration from the serving base station, wherein the serving base station sends the UL PRS configuration to the UE.

Clause 99. The location server of clause 98, further comprising means for sending an UL measurement request to at least one base station, including the UL PRS configuration.

Clause 100. The location server of any of clauses 98-99, wherein the second event report includes an LPP Provide Location Information message including location measurements performed by the UE in the RRC Inactive state, the method further comprising: means for determining a location of the UE based at least in part on the location measurements in the LPP Provide Location Information message.

Clause 101. The location server of clause 100, further comprising: means for receiving a measurement response from at least one base station including measurements of UL PRSs transmitted by the UE in the RRC Inactive state; and means for determining the location based further on the measurement response from the at least one base station.

Clause 102. The location server of any of clauses 93-101, wherein the location server comprises a Location Management Function (LMF).

Clause 103. A non-transitory storage medium including program code stored thereon, the program code is operable to configure at least one processor in a location server for supporting location of a User Equipment (UE) in a Radio Resource Control (RRC) Inactive state, the program code comprising instructions to: send a request to perform periodic or triggered location to the UE; send an indication to the UE of whether uplink positioning, downlink positioning, or uplink and downlink positioning will be used for subsequent location reporting events when the UE is in the RRC Inactive state; and receive a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

Clause 104. The non-transitory storage medium of clause 103, wherein the second event report includes an indication that the second event report is associated with the first event report.

Clause 105. The non-transitory storage medium of clause 104, wherein the indication that the second event report is associated with the first event report comprises an event type parameter.

Clause 106. The non-transitory storage medium of any of clauses 104-105, wherein the first event report and the second event report each include a common identifier, wherein the indication that the second event report is associated with the first event report comprises the common identifier.

Clause 107. The non-transitory storage medium of any of clauses 104-106, wherein the program further comprises instructions to treat the second event report as a continuation of the first event report based on the indication that the second event report is associated with the first event report.

Clause 108. The non-transitory storage medium of any of clauses 103-107, wherein: the indication that uplink and downlink positioning will be used for subsequent location reporting events is sent when the UE is in the RRC Inactive state; the first event report includes a Long Term Evolution (LTE) Positioning Protocol (LPP) Request Assistance Data message indicating a request for an uplink (UL) Positioning Reference Signal (PRS) configuration; the at least one processor is further configured to: send a request for the UL PRS configuration to a serving base station for the UE while the UE is in the RRC Inactive state; and receive the UL PRS configuration from the serving base station, wherein the serving base station sends the UL PRS configuration to the UE.

Clause 109. The non-transitory storage medium of clause 108, wherein the at least one processor is further configured to send an UL measurement request to at least one base station, including the UL PRS configuration.

Clause 110. The non-transitory storage medium of any of clauses 108-109, wherein the second event report includes an LPP Provide Location Information message including location measurements performed by the UE in the RRC Inactive state, wherein the at least one processor is further configured to: determine a location of the UE based at least in part on the location measurements in the LPP Provide Location Information message.

Clause 111. The non-transitory storage medium of clause 110, wherein the at least one processor is further configured to: receive a measurement response from at least one base station including measurements of UL PRSs transmitted by the UE in the RRC Inactive state; and determine the location based further on the measurement response from the at least one base station.

Clause 112. The non-transitory storage medium of any of clauses 103-111, wherein the location server comprises a Location Management Function (LMF).

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a User Equipment (UE) for supporting location of the UE in a Radio Resource Control (RRC) Inactive state, comprising:
   receiving a request to perform periodic or triggered location;
   receiving an indication of whether uplink positioning, downlink positioning, or uplink and downlink positioning will be used for subsequent location reporting events when the UE is in the RRC Inactive state;
   detecting an event while in the RRC Inactive state; and
   sending a first event report and a second event report to report the event and enable UE location while the UE is in the RRC Inactive state, wherein the first event report and the second event report are each sent with Small Data Transmission (SDT).

2. The method of claim 1, wherein the request to perform periodic or triggered location is received from a location server and the first event report and the second event report are sent to the location server.

3. The method of claim 2, wherein the location server comprises a Location Management Function (LMF).

4. The method of claim 1, wherein each of the first event report and the second event report are sent in an RRC Resume Request message.

5. The method of claim 1, wherein the second event report includes an indication that the second event report is associated with the first event report.

6. The method of claim 5, wherein the indication that the second event report is associated with the first event report comprises an event type parameter.

7. The method of claim 5, wherein the first event report and the second event report each include a common identifier, wherein the indication that the second event report is associated with the first event report comprises the common identifier.

8. The method of claim 5, wherein the indication that the second event report is associated with the first event report enables treatment of the second event report as a continuation of the first event report.

9. The method of claim 1, wherein:
   the indication indicates that uplink and downlink positioning will be used for subsequent location reporting events when the UE is in the RRC Inactive state;
   the first event report includes a Long Term Evolution (LTE) Positioning Protocol (LPP) Request Assistance Data message indicating a request for an uplink (UL) Positioning Reference Signal (PRS) configuration; and
   the method further comprises receiving from a serving base station the UL PRS configuration.

10. The method of claim 9, wherein the UL PRS configuration is received in a subsequent downlink (DL) SDT.

11. The method of claim 9, wherein the UL PRS configuration is received in an RRC Release message.

12. The method of claim 9, further comprising:
    transmitting UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

13. The method of claim 9, further comprising:
    receiving a Medium Access Control-Control Element (MAC-CE) UL PRS activation from the serving base station in one of a subsequent downlink (DL) SDT or an RRC Release message; and
    receiving a MAC-CE UL PRS deactivation from the serving base station in one of a subsequent downlink (DL) SDT or an RRC Release message.

14. The method of claim 1, wherein the second event report includes an LPP Provide Location Information message including location measurements generated by the UE.

15. The method of claim 14, further comprising:
    receiving downlink (DL) PRSs from one or more base stations; and
    measuring the DL PRSs while in the RRC Inactive state to generate the location measurements.

16. The method of claim 1, further comprising providing positioning capabilities to a serving base station, a location server or both, the positioning capabilities indicating support while in the RRC Inactive state for at least one of uplink positioning, downlink positioning, uplink and downlink positioning, or a combination thereof.

17. The method of claim 1, wherein the request to perform periodic or triggered location includes deferred MT-LR information for the UE, the method further comprising providing the deferred MT-LR information for the UE and positioning capabilities of the UE to a serving base station, wherein the deferred MT-LR information includes one or more of a type of event, positioning methods requested, reporting interval, and wherein the deferred MT-LR information and the positioning capabilities of the UE enable transitioning the UE to the RRC Inactive state.

18. The method of claim 1, wherein the request to perform periodic or triggered location comprises the indication of whether uplink positioning, downlink positioning, or uplink and downlink positioning will be used for subsequent location reporting events when the UE is in the RRC Inactive state.

19. A User Equipment (UE) configured for supporting location of the UE in a Radio Resource Control (RRC) Inactive state, comprising:
- a wireless transceiver configured to wirelessly communicate with entities in a wireless network;
- at least one memory;
- at least one processor coupled to the wireless transceiver and the at least one memory, wherein the at least one processor is configured to:
- receive, via the wireless transceiver, a request to perform periodic or triggered location;
- receive, via the wireless transceiver, an indication of whether uplink positioning, downlink positioning, or uplink and downlink positioning will be used for subsequent location reporting events when the UE is in the RRC Inactive state;
- detect an event while in the RRC Inactive state; and
- send, via the wireless transceiver, a first event report and a second event report to report the event and enable UE location while the UE is in the RRC Inactive state, wherein the first event report and the second event report are each sent with Small Data Transmission (SDT).

20. The UE of claim 19, wherein the request to perform periodic or triggered location is received from a location server and the first event report and the second event report are sent to the location server.

21. The UE of claim 20, wherein the location server comprises a Location Management Function (LMF).

22. The UE of claim 19, wherein each of the first event report and the second event report are sent in an RRC Resume Request message.

23. The UE of claim 19, wherein the second event report includes an indication that the second event report is associated with the first event report.

24. The UE of claim 23, wherein the indication that the second event report is associated with the first event report comprises an event type parameter.

25. The UE of claim 23, wherein the first event report and the second event report each include a common identifier, wherein the indication that the second event report is associated with the first event report comprises the common identifier.

26. The UE of claim 23, wherein the indication that the second event report is associated with the first event report enables treatment of the second event report as a continuation of the first event report.

27. The UE of claim 19, wherein:
- the indication indicates that uplink and downlink positioning will be used for subsequent location reporting events when the UE is in the RRC Inactive state;
- the first event report includes a Long Term Evolution (LTE) Positioning Protocol (LPP) Request Assistance Data message indicating a request for an uplink (UL) Positioning Reference Signal (PRS) configuration; and
- the at least one processor is further configured to receive, via the wireless transceiver, from a serving base station the UL PRS configuration.

28. The UE of claim 27, wherein the UL PRS configuration is received in a subsequent downlink (DL) SDT.

29. The UE of claim 27, wherein the UL PRS configuration is received in an RRC Release message.

30. The UE of claim 27, wherein the at least one processor is further configured to:
- transmit, via the wireless transceiver, UL Positioning Reference Signals (PRSs) while in the RRC Inactive state based on the UL PRS configuration enabling UL PRS measurements by a plurality of base stations, wherein a location of the UE is determined based at least in part on the UL PRS measurements.

31. The UE of claim 27, wherein the at least one processor is further configured to receive, via the wireless transceiver, a Medium Access Control-Control Element (MAC-CE) UL PRS activation from the serving base station in one of a subsequent downlink (DL) SDT or an RRC Release message and receiving a MAC-CE UL PRS deactivation from the serving base station in one of a subsequent downlink (DL) SDT or an RRC Release message.

32. The UE of claim 19, wherein the second event report includes an LPP Provide Location Information message including location measurements generated by the UE.

33. The UE of claim 32, wherein the at least one processor is further configured to:
- receive, via the wireless transceiver, downlink (DL) PRSs from one or more base stations; and
- measure the DL PRSs while in the RRC Inactive state to generate the location measurements.

34. The UE of claim 19, provide positioning capabilities to a serving base station, a location server or both, the positioning capabilities indicating support while in the RRC Inactive state for at least one of uplink positioning, downlink positioning, uplink and downlink positioning, or a combination thereof.

35. The UE of claim 19, wherein at least one processor is further configured to, responsive to the request to perform periodic or triggered location including deferred MT-LR information for the UE, provide the deferred MT-LR information for the UE and positioning capabilities of the UE to a serving base station, wherein the deferred MT-LR information includes one or more of a type of event, positioning methods requested, reporting interval, and wherein the deferred MT-LR information and the positioning capabilities of the UE enable transitioning the UE to the RRC Inactive state.

36. The UE of claim 19, wherein the request to perform periodic or triggered location comprises the indication of whether uplink positioning, downlink positioning, or uplink and downlink positioning will be used for subsequent location reporting events when the UE is in the RRC Inactive state.

37. A method performed by a location server for supporting location of a User Equipment (UE) in a Radio Resource Control (RRC) Inactive state, comprising:
- sending a request to perform periodic or triggered location to the UE;
- sending an indication to the UE of whether uplink positioning, downlink positioning, or uplink and downlink positioning will be used for subsequent location reporting events when the UE is in the RRC Inactive state; and
- receiving a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

38. The method of claim 37, wherein the second event report includes an indication that the second event report is associated with the first event report.

39. The method of claim 38, wherein the indication that the second event report is associated with the first event report comprises an event type parameter.

40. The method of claim 38, wherein the first event report and the second event report each include a common identifier, wherein the indication that the second event report is associated with the first event report comprises the common identifier.

41. The method of claim 38, further comprising treating the second event report as a continuation of the first event report based on the indication that the second event report is associated with the first event report.

42. The method of claim 37, wherein:
the indication indicates that uplink and downlink positioning will be used for subsequent location reporting events when the UE is in the RRC Inactive state,
the first event report includes a Long Term Evolution (LTE) Positioning Protocol (LPP) Request Assistance Data message indicating a request for an uplink (UL) Positioning Reference Signal (PRS) configuration;
the method further comprises:
sending a request for the UL PRS configuration to a serving base station for the UE while the UE is in the RRC Inactive state; and
receiving the UL PRS configuration from the serving base station, wherein the serving base station sends the UL PRS configuration to the UE.

43. The method of claim 42, further comprising sending an UL measurement request to at least one base station, including the UL PRS configuration.

44. The method of claim 42, wherein the second event report includes an LPP Provide Location Information message including location measurements performed by the UE in the RRC Inactive state, the method further comprising:
determining a location of the UE based at least in part on the location measurements in the LPP Provide Location Information message.

45. The method of claim 44, further comprising:
receiving a measurement response from at least one base station including measurements of UL PRSs transmitted by the UE in the RRC Inactive state; and
determining the location based further on the measurement response from the at least one base station.

46. The method of claim 37, wherein the location server comprises a Location Management Function (LMF).

47. A location server configured for supporting location of a User Equipment (UE) in a Radio Resource Control (RRC) Inactive state, comprising:
an external interface configured to wirelessly communicate with entities in a wireless network;
at least one memory;
at least one processor coupled to the external interface and the at least one memory, wherein the at least one processor is configured to:
send, via the external interface, a request to perform periodic or triggered location to the UE;
send, via the external interface, an indication to the UE of whether uplink positioning, downlink positioning, or uplink and downlink positioning will be used for subsequent location reporting events when the UE is in the RRC Inactive state; and
receive, via the external interface, a first event report and a second event report from the UE to report detection of an event by the UE and enable UE location while the UE is in the RRC Inactive state, wherein the first event report and the second event report are each sent by the UE with Small Data Transmission (SDT) while the UE is in the RRC Inactive state.

48. The location server of claim 47, wherein the second event report includes an indication that the second event report is associated with the first event report.

49. The location server of claim 48, wherein the indication that the second event report is associated with the first event report comprises an event type parameter.

50. The location server of claim 48, wherein the first event report and the second event report each include a common identifier, wherein the indication that the second event report is associated with the first event report comprises the common identifier.

51. The location server of claim 48, wherein the at least one processor is further configured to treat the second event report as a continuation of the first event report based on the indication that the second event report is associated with the first event report.

52. The location server of claim 47, wherein:
the indication indicates that uplink and downlink positioning will be used for subsequent location reporting events when the UE is in the RRC Inactive state;
the first event report includes a Long Term Evolution (LTE) Positioning Protocol (LPP) Request Assistance Data message indicating a request for an uplink (UL) Positioning Reference Signal (PRS) configuration;
the at least one processor is further configured to:
send, via the external interface, a request for the UL PRS configuration to a serving base station for the UE while the UE is in the RRC Inactive state; and
receive, via the external interface, the UL PRS configuration from the serving base station, wherein the serving base station sends the UL PRS configuration to the UE.

53. The location server of claim 52, wherein the at least one processor is further configured to send an UL measurement request to at least one base station, including the UL PRS configuration.

54. The location server of claim 52, wherein the second event report includes an LPP Provide Location Information message including location measurements performed by the UE in the RRC Inactive state, wherein the at least one processor is further configured to:
determine a location of the UE based at least in part on the location measurements in the LPP Provide Location Information message.

55. The location server of claim 54, wherein the at least one processor is further configured to:
receive, via the external interface, a measurement response from at least one base station including measurements of UL PRSs transmitted by the UE in the RRC Inactive state; and
determine the location based further on the measurement response from the at least one base station.

56. The location server of claim 47, wherein the location server comprises a Location Management Function (LMF).

* * * * *